US011358337B2

(12) United States Patent
Czinger et al.

(10) Patent No.: US 11,358,337 B2
(45) Date of Patent: Jun. 14, 2022

(54) ROBOTIC ASSEMBLY OF TRANSPORT STRUCTURES USING ON-SITE ADDITIVE MANUFACTURING

(71) Applicant: DIVERGENT TECHNOLOGIES, INC., Los Angeles, CA (US)

(72) Inventors: Kevin Robert Czinger, Santa Monica, CA (US); Broc William TenHouten, Rancho Palos Verdes, CA (US); David Charles O'Connell, Huntington Beach, CA (US); Jon Paul Gunner, Palos Verdes Estates, CA (US); John Russell Bucknell, El Segundo, CA (US); Alex James Hamade, Redondo Beach, CA (US); David Brian TenHouten, Los Angeles, CA (US)

(73) Assignee: DIVERGENT TECHNOLOGIES, INC., Los Angeles, CA (US)

(*) Notice: Subject to any disclaimer, the term of this patent is extended or adjusted under 35 U.S.C. 154(b) by 568 days.

(21) Appl. No.: 15/604,037

(22) Filed: May 24, 2017

(65) Prior Publication Data

US 2018/0339456 A1 Nov. 29, 2018

(51) Int. Cl.
*B29C 64/379* (2017.01)
*B33Y 40/00* (2020.01)
(Continued)

(52) U.S. Cl.
CPC .......... *B29C 64/379* (2017.08); *B29C 70/205* (2013.01); *B33Y 10/00* (2014.12);
(Continued)

(58) Field of Classification Search
CPC .................................................. B29C 64/379
See application file for complete search history.

(56) References Cited

U.S. PATENT DOCUMENTS 4,893,398 A 1/1990 Zimmer
4,993,139 A 2/1991 Burry et al.
(Continued)

FOREIGN PATENT DOCUMENTS

JP 2015-520011 A 7/2015
WO 1996036455 A1 11/1996
(Continued)

OTHER PUBLICATIONS

US 9,202,136 B2, 12/2015, Schmidt et al. (withdrawn)
(Continued)

*Primary Examiner* — Alison L Hindenlang
*Assistant Examiner* — Asha A Thomas
(74) *Attorney, Agent, or Firm* — Arentfox Schiff LLP

(57) ABSTRACT

Techniques for flexible, on-site additive manufacturing of components or portions thereof for transport structures are disclosed. An automated assembly system for a transport structure may include a plurality of automated constructors to assemble the transport structure. In one aspect, the assembly system may span the full vertically integrated production process, from powder production to recycling. At least some of the automated constructors are able to move in an automated fashion between the station under the guidance of a control system. A first of the automated constructors may include a 3-D printer to print at least a portion of a component and to transfer the component to a second one of the automated constructors for installation during the assembly of the transport structure. The automated constructors may also be adapted to perform a variety of different tasks utilizing sensors for enabling machine-learning.

25 Claims, 29 Drawing Sheets

(51) Int. Cl.
  *G05B 19/418* (2006.01)
  *B33Y 10/00* (2015.01)
  *B33Y 30/00* (2015.01)
  *B29C 70/20* (2006.01)
  *B23P 21/00* (2006.01)
  *B29K 105/06* (2006.01)

(52) U.S. Cl.
  CPC ............... *B33Y 30/00* (2014.12); *B33Y 40/00* (2014.12); *G05B 19/418* (2013.01); *B23P 21/004* (2013.01); *B29K 2105/06* (2013.01)

(56) References Cited

U.S. PATENT DOCUMENTS

| | | | |
|---|---|---|---|
| 5,203,226 | A | 4/1993 | Hongou et al. |
| 5,742,385 | A | 4/1998 | Champa |
| 5,990,444 | A | 11/1999 | Costin |
| 6,010,155 | A | 1/2000 | Rinehart |
| 6,096,249 | A | 8/2000 | Yamaguchi |
| 6,140,602 | A | 10/2000 | Costin |
| 6,250,533 | B1 | 6/2001 | Otterbein et al. |
| 6,252,196 | B1 | 6/2001 | Costin et al. |
| 6,318,642 | B1 | 11/2001 | Goenka et al. |
| 6,365,057 | B1 | 4/2002 | Whitehurst et al. |
| 6,391,251 | B1 | 5/2002 | Keicher et al. |
| 6,409,930 | B1 | 6/2002 | Whitehurst et al. |
| 6,468,439 | B1 | 10/2002 | Whitehurst et al. |
| 6,554,345 | B2 | 4/2003 | Jonsson |
| 6,585,151 | B1 | 7/2003 | Ghosh |
| 6,644,721 | B1 | 11/2003 | Miskech et al. |
| 6,811,744 | B2 | 11/2004 | Keicher et al. |
| 6,866,497 | B2 | 3/2005 | Saiki |
| 6,919,035 | B1 | 7/2005 | Clough |
| 6,926,970 | B2 | 8/2005 | James et al. |
| 7,152,292 | B2 | 12/2006 | Hohmann et al. |
| 7,344,186 | B1 | 3/2008 | Hausler et al. |
| 7,500,373 | B2 | 3/2009 | Quell |
| 7,586,062 | B2 | 9/2009 | Heberer |
| 7,637,134 | B2 | 12/2009 | Burzlaff et al. |
| 7,710,347 | B2 | 5/2010 | Gentilman et al. |
| 7,716,802 | B2 | 5/2010 | Stern et al. |
| 7,745,293 | B2 | 6/2010 | Yamazaki et al. |
| 7,766,123 | B2 | 8/2010 | Sakurai et al. |
| 7,852,388 | B2 | 12/2010 | Shimizu et al. |
| 7,908,922 | B2 | 3/2011 | Zarabadi et al. |
| 7,951,324 | B2 | 5/2011 | Naruse et al. |
| 8,094,036 | B2 | 1/2012 | Heberer |
| 8,163,077 | B2 | 4/2012 | Eron et al. |
| 8,286,236 | B2 | 10/2012 | Jung et al. |
| 8,289,352 | B2 | 10/2012 | Vartanian et al. |
| 8,297,096 | B2 | 10/2012 | Mizumura et al. |
| 8,354,170 | B1 | 1/2013 | Henry et al. |
| 8,383,028 | B2 | 2/2013 | Lyons |
| 8,408,036 | B2 | 4/2013 | Reith et al. |
| 8,429,754 | B2 | 4/2013 | Jung et al. |
| 8,437,513 | B1 | 5/2013 | Derakhshani et al. |
| 8,444,903 | B2 | 5/2013 | Lyons et al. |
| 8,452,073 | B2 | 5/2013 | Taminger et al. |
| 8,599,301 | B2 | 12/2013 | Dowski, Jr. et al. |
| 8,606,540 | B2 | 12/2013 | Haisty et al. |
| 8,610,761 | B2 | 12/2013 | Haisty et al. |
| 8,631,996 | B2 | 1/2014 | Quell et al. |
| 8,675,925 | B2 | 3/2014 | Derakhshani et al. |
| 8,678,060 | B2 | 3/2014 | Dietz et al. |
| 8,686,314 | B2 | 4/2014 | Schneegans et al. |
| 8,686,997 | B2 | 4/2014 | Radet et al. |
| 8,694,284 | B2 | 4/2014 | Berard |
| 8,720,876 | B2 | 5/2014 | Reith et al. |
| 8,752,166 | B2 | 6/2014 | Jung et al. |
| 8,755,923 | B2 | 6/2014 | Farahani et al. |
| 8,787,628 | B1 | 7/2014 | Derakhshani et al. |
| 8,818,771 | B2 | 8/2014 | Gielis et al. |
| 8,873,238 | B2 | 10/2014 | Wilkins |
| 8,978,535 | B2 | 3/2015 | Ortiz et al. |
| 9,006,605 | B2 | 4/2015 | Schneegans et al. |
| 9,071,436 | B2 | 6/2015 | Jung et al. |
| 9,101,979 | B2 | 8/2015 | Hofmann et al. |
| 9,104,921 | B2 | 8/2015 | Derakhshani et al. |
| 9,126,365 | B1 | 9/2015 | Mark et al. |
| 9,128,476 | B2 | 9/2015 | Jung et al. |
| 9,138,924 | B2 | 9/2015 | Yen |
| 9,149,988 | B2 | 10/2015 | Mark et al. |
| 9,156,205 | B2 | 10/2015 | Mark et al. |
| 9,186,848 | B2 | 11/2015 | Mark et al. |
| 9,244,986 | B2 | 1/2016 | Karmarkar |
| 9,248,611 | B2 | 2/2016 | Divine et al. |
| 9,254,535 | B2 | 2/2016 | Buller et al. |
| 9,266,566 | B2 | 2/2016 | Kim |
| 9,269,022 | B2 | 2/2016 | Rhoads et al. |
| 9,327,452 | B2 | 5/2016 | Mark et al. |
| 9,329,020 | B1 | 5/2016 | Napoletano |
| 9,332,251 | B2 | 5/2016 | Haisty et al. |
| 9,346,127 | B2 | 5/2016 | Buller et al. |
| 9,389,315 | B2 | 7/2016 | Bruder et al. |
| 9,399,256 | B2 | 7/2016 | Buller et al. |
| 9,403,235 | B2 | 8/2016 | Buller et al. |
| 9,418,193 | B2 | 8/2016 | Dowski, Jr. et al. |
| 9,457,514 | B2 | 10/2016 | Schwärzler |
| 9,469,057 | B2 | 10/2016 | Johnson et al. |
| 9,478,063 | B2 | 10/2016 | Rhoads et al. |
| 9,481,402 | B1 | 11/2016 | Muto et al. |
| 9,486,878 | B2 | 11/2016 | Buller et al. |
| 9,486,960 | B2 | 11/2016 | Paschkewitz et al. |
| 9,502,993 | B2 | 11/2016 | Deng |
| 9,525,262 | B2 | 12/2016 | Stuart et al. |
| 9,533,526 | B1 | 1/2017 | Nevins |
| 9,555,315 | B2 | 1/2017 | Aders |
| 9,555,580 | B1 | 1/2017 | Dykstra et al. |
| 9,557,856 | B2 | 1/2017 | Send et al. |
| 9,566,742 | B2 | 2/2017 | Keating et al. |
| 9,566,758 | B2 | 2/2017 | Cheung et al. |
| 9,573,193 | B2 | 2/2017 | Buller et al. |
| 9,573,225 | B2 | 2/2017 | Buller et al. |
| 9,586,290 | B2 | 3/2017 | Buller et al. |
| 9,587,309 | B1* | 3/2017 | Pickens .................. C23C 16/01 |
| 9,595,795 | B2 | 3/2017 | Lane et al. |
| 9,597,843 | B2 | 3/2017 | Stauffer et al. |
| 9,600,929 | B1 | 3/2017 | Young et al. |
| 9,609,755 | B2 | 3/2017 | Coull et al. |
| 9,610,737 | B2 | 4/2017 | Johnson et al. |
| 9,611,667 | B2 | 4/2017 | GangaRao et al. |
| 9,616,623 | B2 | 4/2017 | Johnson et al. |
| 9,626,487 | B2 | 4/2017 | Jung et al. |
| 9,626,489 | B2 | 4/2017 | Nilsson |
| 9,643,361 | B2 | 5/2017 | Liu |
| 9,662,840 | B1 | 5/2017 | Buller et al. |
| 9,665,182 | B2 | 5/2017 | Send et al. |
| 9,672,389 | B1 | 6/2017 | Mosterman et al. |
| 9,672,550 | B2 | 6/2017 | Apsley et al. |
| 9,676,145 | B2 | 6/2017 | Buller et al. |
| 9,684,919 | B2 | 6/2017 | Apsley et al. |
| 9,688,032 | B2 | 6/2017 | Kia et al. |
| 9,690,286 | B2 | 6/2017 | Hovsepian et al. |
| 9,700,966 | B2 | 7/2017 | Kraft et al. |
| 9,703,896 | B2 | 7/2017 | Zhang et al. |
| 9,713,903 | B2 | 7/2017 | Paschkewitz et al. |
| 9,718,302 | B2 | 8/2017 | Young et al. |
| 9,718,434 | B2 | 8/2017 | Hector, Jr. et al. |
| 9,724,877 | B2 | 8/2017 | Flitsch et al. |
| 9,724,881 | B2 | 8/2017 | Johnson et al. |
| 9,725,178 | B2 | 8/2017 | Wang |
| 9,731,730 | B2 | 8/2017 | Stiles |
| 9,731,773 | B2 | 8/2017 | Gami et al. |
| 9,741,954 | B2 | 8/2017 | Bruder et al. |
| 9,747,352 | B2 | 8/2017 | Karmarkar |
| 9,764,415 | B2 | 9/2017 | Seufzer et al. |
| 9,764,520 | B2 | 9/2017 | Johnson et al. |
| 9,765,226 | B2 | 9/2017 | Dain |
| 9,770,760 | B2 | 9/2017 | Liu |
| 9,773,393 | B2 | 9/2017 | Velez |
| 9,776,234 | B2 | 10/2017 | Schaafhausen et al. |
| 9,782,936 | B2 | 10/2017 | Glunz et al. |
| 9,783,324 | B2 | 10/2017 | Embler et al. |
| 9,783,977 | B2 | 10/2017 | Alqasimi et al. |

(56) References Cited

U.S. PATENT DOCUMENTS

| | | |
|---|---|---|
| 9,789,548 B2 | 10/2017 | Golshany et al. |
| 9,789,922 B2 | 10/2017 | Dosenbach et al. |
| 9,796,137 B2 | 10/2017 | Zhang et al. |
| 9,802,108 B2 | 10/2017 | Aders |
| 9,809,977 B2 | 11/2017 | Carney et al. |
| 9,817,922 B2 | 11/2017 | Glunz et al. |
| 9,818,071 B2 | 11/2017 | Jung et al. |
| 9,821,339 B2 | 11/2017 | Paschkewitz et al. |
| 9,821,411 B2 | 11/2017 | Buller et al. |
| 9,823,143 B2 | 11/2017 | Twelves, Jr. et al. |
| 9,829,564 B2 | 11/2017 | Bruder et al. |
| 9,846,933 B2 | 12/2017 | Yuksel |
| 9,854,828 B2 | 1/2018 | Langeland |
| 9,858,604 B2 | 1/2018 | Apsley et al. |
| 9,862,833 B2 | 1/2018 | Hasegawa et al. |
| 9,862,834 B2 | 1/2018 | Hasegawa et al. |
| 9,863,885 B2 | 1/2018 | Zaretski et al. |
| 9,870,629 B2 | 1/2018 | Cardno et al. |
| 9,879,981 B1 | 1/2018 | Dehghan Niri et al. |
| 9,884,663 B2 | 2/2018 | Czinger et al. |
| 9,898,776 B2 | 2/2018 | Apsley et al. |
| 9,914,150 B2 | 3/2018 | Pettersson et al. |
| 9,919,360 B2 | 3/2018 | Buller et al. |
| 9,931,697 B2 | 4/2018 | Levin et al. |
| 9,933,031 B2 | 4/2018 | Bracamonte et al. |
| 9,933,092 B2 | 4/2018 | Sindelar |
| 9,957,031 B2 | 5/2018 | Golshany et al. |
| 9,958,535 B2 | 5/2018 | Send et al. |
| 9,962,767 B2 | 5/2018 | Buller et al. |
| 9,963,978 B2 | 5/2018 | Johnson et al. |
| 9,971,920 B2 | 5/2018 | Derakhshani et al. |
| 9,976,063 B2 | 5/2018 | Childers et al. |
| 9,987,792 B2 | 6/2018 | Flitsch et al. |
| 9,988,136 B2 | 6/2018 | Tiryaki et al. |
| 9,989,623 B2 | 6/2018 | Send et al. |
| 9,990,565 B2 | 6/2018 | Rhoads et al. |
| 9,994,339 B2 | 6/2018 | Colson et al. |
| 9,996,890 B1 | 6/2018 | Cinnamon et al. |
| 9,996,945 B1 | 6/2018 | Holzer et al. |
| 10,002,215 B2 | 6/2018 | Dowski et al. |
| 10,006,156 B2 | 6/2018 | Kirkpatrick |
| 10,011,089 B2 | 7/2018 | Lyons et al. |
| 10,011,685 B2 | 7/2018 | Childers et al. |
| 10,012,532 B2 | 7/2018 | Send et al. |
| 10,013,777 B2 | 7/2018 | Mariampillai et al. |
| 10,015,908 B2 | 7/2018 | Williams et al. |
| 10,016,852 B2 | 7/2018 | Broda |
| 10,016,942 B2 | 7/2018 | Mark et al. |
| 10,017,384 B1 | 7/2018 | Greer et al. |
| 10,018,576 B2 | 7/2018 | Herbsommer et al. |
| 10,022,792 B2 | 7/2018 | Srivas et al. |
| 10,022,912 B2 | 7/2018 | Kia et al. |
| 10,027,376 B2 | 7/2018 | Sankaran et al. |
| 10,029,415 B2 | 7/2018 | Swanson et al. |
| 10,040,239 B2 | 8/2018 | Brown, Jr. |
| 10,046,412 B2 | 8/2018 | Blackmore |
| 10,048,769 B2 | 8/2018 | Selker et al. |
| 10,052,712 B2 | 8/2018 | Blackmore |
| 10,052,820 B2 | 8/2018 | Kemmer et al. |
| 10,055,536 B2 | 8/2018 | Maes et al. |
| 10,058,764 B2 | 8/2018 | Aders |
| 10,058,920 B2 | 8/2018 | Buller et al. |
| 10,061,906 B2 | 8/2018 | Nilsson |
| 10,065,270 B2 | 9/2018 | Buller et al. |
| 10,065,361 B2 | 9/2018 | Susnjara et al. |
| 10,065,367 B2 | 9/2018 | Brown, Jr. |
| 10,068,316 B1 | 9/2018 | Holzer et al. |
| 10,071,422 B2 | 9/2018 | Buller et al. |
| 10,071,525 B2 | 9/2018 | Susnjara et al. |
| 10,072,179 B2 | 9/2018 | Drijfhout |
| 10,074,128 B2 | 9/2018 | Colson et al. |
| 10,076,875 B2 | 9/2018 | Mark et al. |
| 10,076,876 B2 | 9/2018 | Mark et al. |
| 10,081,140 B2 | 9/2018 | Paesano et al. |
| 10,081,431 B2 | 9/2018 | Seack et al. |
| 10,086,568 B2 | 10/2018 | Snyder et al. |
| 10,087,320 B2 | 10/2018 | Simmons et al. |
| 10,087,556 B2 | 10/2018 | Gallucci et al. |
| 10,099,427 B2 | 10/2018 | Mark et al. |
| 10,100,542 B2 | 10/2018 | GangaRao et al. |
| 10,100,890 B2 | 10/2018 | Bracamonte et al. |
| 10,107,344 B2 | 10/2018 | Bracamonte et al. |
| 10,108,766 B2 | 10/2018 | Druckman et al. |
| 10,113,600 B2 | 10/2018 | Bracamonte et al. |
| 10,118,347 B2 | 11/2018 | Stauffer et al. |
| 10,118,579 B2 | 11/2018 | Lakic |
| 10,120,078 B2 | 11/2018 | Bruder et al. |
| 10,124,546 B2 | 11/2018 | Johnson et al. |
| 10,124,570 B2 | 11/2018 | Evans et al. |
| 10,137,500 B2 | 11/2018 | Blackmore |
| 10,138,354 B2 | 11/2018 | Groos et al. |
| 10,144,126 B2 | 12/2018 | Krohne et al. |
| 10,145,110 B2 | 12/2018 | Carney et al. |
| 10,151,363 B2 | 12/2018 | Bracamonte et al. |
| 10,152,661 B2 | 12/2018 | Kieser |
| 10,160,278 B2 | 12/2018 | Coombs et al. |
| 10,161,021 B2 | 12/2018 | Lin et al. |
| 10,166,752 B2 | 1/2019 | Evans et al. |
| 10,166,753 B2 | 1/2019 | Evans et al. |
| 10,171,578 B1 | 1/2019 | Cook et al. |
| 10,173,255 B2 | 1/2019 | TenHouten et al. |
| 10,173,327 B2 | 1/2019 | Kraft et al. |
| 10,178,800 B2 | 1/2019 | Mahalingam et al. |
| 10,179,640 B2 | 1/2019 | Wilkerson |
| 10,183,330 B2 | 1/2019 | Buller et al. |
| 10,183,478 B2 | 1/2019 | Evans et al. |
| 10,189,187 B2 | 1/2019 | Keating et al. |
| 10,189,240 B2 | 1/2019 | Evans et al. |
| 10,189,241 B2 | 1/2019 | Evans et al. |
| 10,189,242 B2 | 1/2019 | Evans et al. |
| 10,190,424 B2 | 1/2019 | Johnson et al. |
| 10,195,693 B2 | 2/2019 | Buller et al. |
| 10,196,539 B2 | 2/2019 | Boonen et al. |
| 10,197,338 B2 | 2/2019 | Melsheimer |
| 10,200,677 B2 | 2/2019 | Trevor et al. |
| 10,201,932 B2 | 2/2019 | Flitsch et al. |
| 10,201,941 B2 | 2/2019 | Evans et al. |
| 10,202,673 B2 | 2/2019 | Lin et al. |
| 10,204,216 B2 | 2/2019 | Nejati et al. |
| 10,207,454 B2 | 2/2019 | Buller et al. |
| 10,209,065 B2 | 2/2019 | Estevo, Jr. et al. |
| 10,210,662 B2 | 2/2019 | Holzer et al. |
| 10,213,837 B2 | 2/2019 | Kondoh |
| 10,214,248 B2 | 2/2019 | Hall et al. |
| 10,214,252 B2 | 2/2019 | Schellekens et al. |
| 10,214,275 B2 | 2/2019 | Goehlich |
| 10,220,575 B2 | 3/2019 | Reznar |
| 10,220,881 B2 | 3/2019 | Tyan et al. |
| 10,221,530 B2 | 3/2019 | Driskell et al. |
| 10,226,900 B1 | 3/2019 | Nevins |
| 10,232,550 B2 | 3/2019 | Evans et al. |
| 10,234,342 B2 | 3/2019 | Moorlag et al. |
| 10,237,477 B2 | 3/2019 | Trevor et al. |
| 10,252,335 B2 | 4/2019 | Buller et al. |
| 10,252,336 B2 | 4/2019 | Buller et al. |
| 10,254,499 B1 | 4/2019 | Cohen et al. |
| 10,257,499 B2 | 4/2019 | Hintz et al. |
| 10,259,044 B2 | 4/2019 | Buller et al. |
| 10,268,181 B1 | 4/2019 | Nevins |
| 10,269,225 B2 | 4/2019 | Velez |
| 10,272,860 B2 | 4/2019 | Mohapatra et al. |
| 10,272,862 B2 | 4/2019 | Whitehead |
| 10,275,564 B2 | 4/2019 | Ridgeway et al. |
| 10,279,580 B2 | 5/2019 | Evans et al. |
| 10,285,219 B2 | 5/2019 | Fetfatsidis et al. |
| 10,286,452 B2 | 5/2019 | Buller et al. |
| 10,286,603 B2 | 5/2019 | Buller et al. |
| 10,286,961 B2 | 5/2019 | Hillebrecht et al. |
| 10,289,263 B2 | 5/2019 | Troy et al. |
| 10,289,875 B2 | 5/2019 | Singh et al. |
| 10,291,193 B2 | 5/2019 | Dandu et al. |
| 10,294,552 B2 | 5/2019 | Liu et al. |
| 10,294,982 B2 | 5/2019 | Gabrys et al. |
| 10,295,989 B1 | 5/2019 | Nevins |

(56) References Cited

U.S. PATENT DOCUMENTS

| | | |
|---|---|---|
| 10,303,159 B2 | 5/2019 | Czinger et al. |
| 10,307,824 B2 | 6/2019 | Kondoh |
| 10,310,197 B1 | 6/2019 | Droz et al. |
| 10,313,651 B2 | 6/2019 | Trevor et al. |
| 10,315,252 B2 | 6/2019 | Mendelsberg et al. |
| 10,336,050 B2 | 7/2019 | Susnjara |
| 10,337,542 B2 | 7/2019 | Hesslewood et al. |
| 10,337,952 B2 | 7/2019 | Bosetti et al. |
| 10,339,266 B2 | 7/2019 | Urick et al. |
| 10,343,330 B2 | 7/2019 | Evans et al. |
| 10,343,331 B2 | 7/2019 | McCall et al. |
| 10,343,355 B2 | 7/2019 | Evans et al. |
| 10,343,724 B2 | 7/2019 | Polewarczyk et al. |
| 10,343,725 B2 | 7/2019 | Martin et al. |
| 10,350,823 B2 | 7/2019 | Rolland et al. |
| 10,356,341 B2 | 7/2019 | Holzer et al. |
| 10,356,395 B2 | 7/2019 | Holzer et al. |
| 10,357,829 B2 | 7/2019 | Spink et al. |
| 10,357,957 B2 | 7/2019 | Buller et al. |
| 10,359,756 B2 | 7/2019 | Newell et al. |
| 10,369,629 B2 | 8/2019 | Mendelsberg et al. |
| 10,382,739 B1 | 8/2019 | Rusu et al. |
| 10,384,393 B2 | 8/2019 | Xu et al. |
| 10,384,416 B2 | 8/2019 | Cheung et al. |
| 10,389,410 B2 | 8/2019 | Brooks et al. |
| 10,391,710 B2 | 8/2019 | Mondesir |
| 10,392,097 B2 | 8/2019 | Pham et al. |
| 10,392,131 B2 | 8/2019 | Deck et al. |
| 10,393,315 B2 | 8/2019 | Tyan |
| 10,400,080 B2 | 9/2019 | Ramakrishnan et al. |
| 10,401,832 B2 | 9/2019 | Snyder et al. |
| 10,403,009 B2 | 9/2019 | Mariampillai et al. |
| 10,406,750 B2 | 9/2019 | Barton et al. |
| 10,412,283 B2 | 9/2019 | Send et al. |
| 10,416,095 B2 | 9/2019 | Herbsommer et al. |
| 10,421,496 B2 | 9/2019 | Swayne et al. |
| 10,421,863 B2 | 9/2019 | Hasegawa et al. |
| 10,422,478 B2 | 9/2019 | Leachman et al. |
| 10,425,793 B2 | 9/2019 | Sankaran et al. |
| 10,427,364 B2 | 10/2019 | Alves |
| 10,429,006 B2 | 10/2019 | Tyan et al. |
| 10,434,573 B2 | 10/2019 | Buller et al. |
| 10,435,185 B2 | 10/2019 | Divine et al. |
| 10,435,773 B2 | 10/2019 | Liu et al. |
| 10,436,038 B2 | 10/2019 | Buhler et al. |
| 10,438,407 B2 | 10/2019 | Pavanaskar et al. |
| 10,440,351 B2 | 10/2019 | Holzer et al. |
| 10,442,002 B2 | 10/2019 | Benthien et al. |
| 10,442,003 B2 | 10/2019 | Symeonidis et al. |
| 10,449,696 B2 | 10/2019 | Elgar et al. |
| 10,449,737 B2 | 10/2019 | Johnson et al. |
| 10,461,810 B2 | 10/2019 | Cook et al. |
| 2005/0131645 A1* | 6/2005 | Panopoulos ......... G05D 1/0244 |
| | | 701/472 |
| 2006/0108783 A1 | 5/2006 | Ni et al. |
| 2013/0035783 A1 | 2/2013 | Scheuerman et al. |
| 2014/0277669 A1 | 9/2014 | Nardi et al. |
| 2014/0301775 A1 | 10/2014 | Erlich et al. |
| 2016/0082652 A1 | 3/2016 | Snyder et al. |
| 2016/0198576 A1* | 7/2016 | Lewis .................... H01L 24/75 |
| | | 361/761 |
| 2017/0036783 A1* | 2/2017 | Snyder .................... B64G 1/26 |
| 2017/0050677 A1* | 2/2017 | Czinger ............... B62D 27/023 |
| 2017/0113344 A1 | 4/2017 | Schönberg |
| 2017/0136697 A1 | 5/2017 | Kia et al. |
| 2017/0136698 A1 | 5/2017 | Kia et al. |
| 2017/0341309 A1 | 11/2017 | Piepenbrock et al. |
| 2018/0133804 A1* | 5/2018 | van Hassel ......... B23K 26/342 |

FOREIGN PATENT DOCUMENTS

| | | | |
|---|---|---|---|
| WO | 1996036525 A1 | 11/1996 | |
| WO | 1996038260 A1 | 12/1996 | |
| WO | 2003024641 A1 | 3/2003 | |
| WO | 2004108343 A1 | 12/2004 | |
| WO | 2005093773 A1 | 10/2005 | |
| WO | 2007003375 A1 | 1/2007 | |
| WO | 2007110235 A1 | 10/2007 | |
| WO | 2007110236 A1 | 10/2007 | |
| WO | 2008019847 A1 | 2/2008 | |
| WO | 2007128586 A3 | 6/2008 | |
| WO | 2008068314 A2 | 6/2008 | |
| WO | 2008086994 A1 | 7/2008 | |
| WO | 2008087024 A1 | 7/2008 | |
| WO | 2008107130 A1 | 9/2008 | |
| WO | 2008138503 A1 | 11/2008 | |
| WO | 2008145396 A1 | 12/2008 | |
| WO | 2009083609 A2 | 7/2009 | |
| WO | 2009098285 A1 | 8/2009 | |
| WO | 2009112520 A1 | 9/2009 | |
| WO | 2009135938 A1 | 11/2009 | |
| WO | 2009140977 A1 | 11/2009 | |
| WO | 2010125057 A2 | 11/2010 | |
| WO | 2010125058 A1 | 11/2010 | |
| WO | 2010142703 A2 | 12/2010 | |
| WO | 2011032533 A1 | 3/2011 | |
| WO | 2014016437 A1 | 1/2014 | |
| WO | 2014187720 A1 | 11/2014 | |
| WO | 2014195340 A1 | 12/2014 | |
| WO | WO-2015073322 A1 * | 5/2015 | |
| WO | 2015193331 A1 | 12/2015 | |
| WO | 2016116414 A1 | 7/2016 | |
| WO | 2017036461 A1 | 3/2017 | |
| WO | 2019030248 A1 | 2/2019 | |
| WO | 2019042504 A1 | 3/2019 | |
| WO | 2019048010 A1 | 3/2019 | |
| WO | 2019048498 A1 | 3/2019 | |
| WO | 2019048680 A1 | 3/2019 | |
| WO | 2019048682 A1 | 3/2019 | |

OTHER PUBLICATIONS

US 9,809,265 B2, 11/2017, Kinjo (withdrawn)
US 10,449,880 B2, 10/2019, Mizobata et al. (withdrawn)
International Search Report and Written Opinion dated Sep. 13, 2018, regarding PCT/US2018/034127.
First Rectification dated Dec. 6, 2018, regarding China Application No. CN201820781707.4.
Extended European Search Report received for corresponding EP Application No. 18806928.0 dated Jan. 26, 2021.
Jorge Corona-Gastuera et al,; "An Approach for Intelligent Fixture-less Assembly: Issues and Experiments;" A. Gelbukh, A. de Albornoz, and H. Terashima (Eds.): MICAI 2005, LNAI 3789, pp. 1052-1061, 2005. © Springer-Verlag Berlin Heidelberg 2005.
Bone, G. and Capson D., "Vision-Guided fixtureless Assembly of Automotive Components", Robotics and Computer Integrated Manufacturing, vol. 19, pp. 79-87, 2003. DOI: 10.1016/S0736-5845(02)00064-9.
Ogun, P. et al., 2015. "3D Vision Assisted Flexible Robotic Assembly of Machine Components." IN: Proceedings of 2015 8th International Conference on Machine Vision (ICMV 2015), Barcelona, spain, Nov. 19-21, 2015 (Proceedings of SPIE, 9878, DOI: 10.1117/12.2229053).
James K. Mills et al., "Robotic Fixtureless Assembly of Sheet Metal Parts Using Dynamic Finite Element Models: Modelling and Stimulation." Laboratory for Nonlinear Systems Control, Department of Mechanical Engineering, University of Toronto, 5 King's College Road, Toronto, Ontario, Canada M5S 1A4. IEEE International Conference on Robotics and Automation 0-7803-1965-6/95 $4.00 © 1995 IEEE.
Chinese version of the Notification of the First Office Action issued for CN Appl. No. 201810509371.0 dated Jun. 4, 2021, 6 pages.
English language translation of the Notification of the First Office Action issued for CN Appl. No. 201810509371.0 dated Jun. 4, 2021, 8 pages.

* cited by examiner

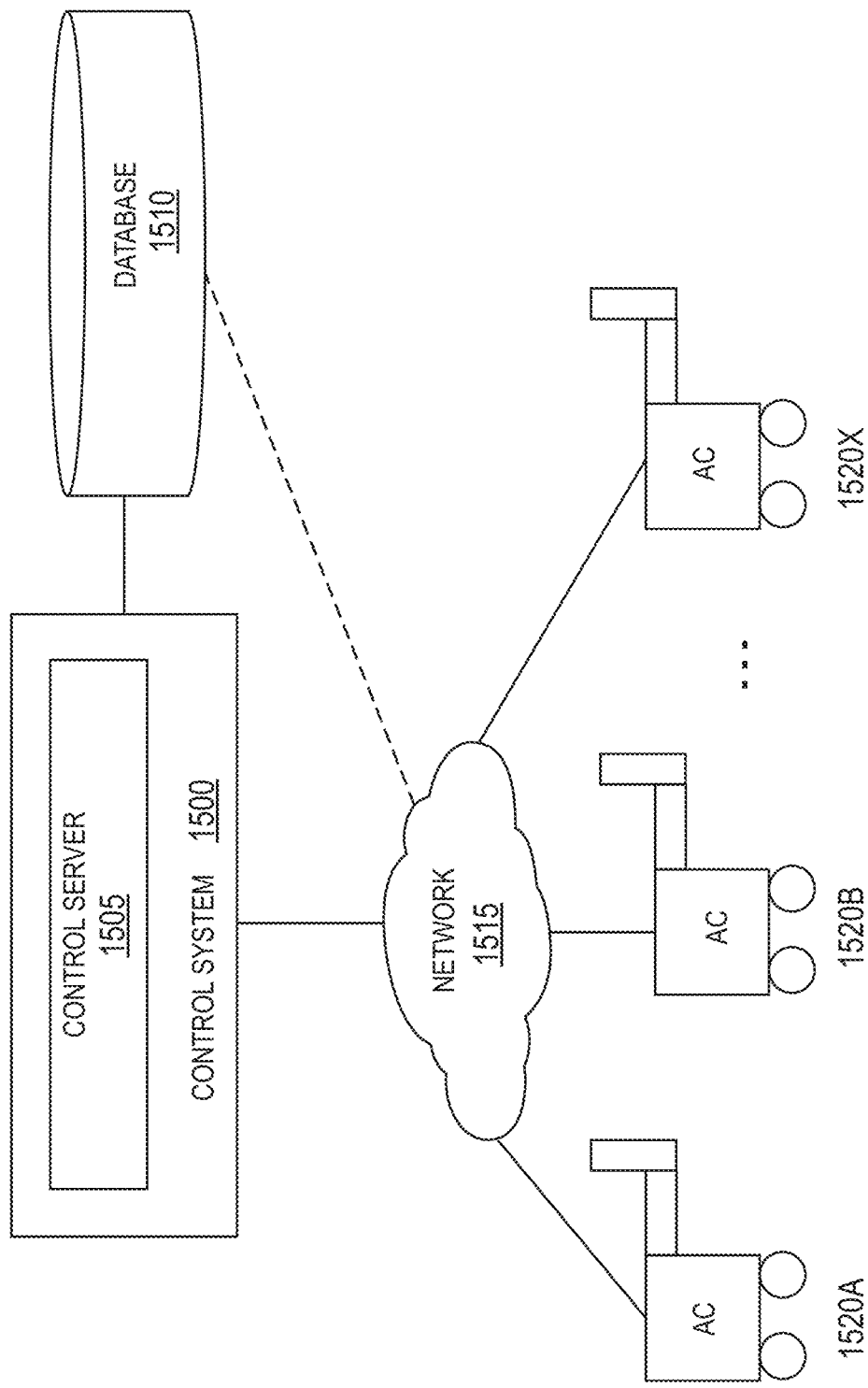

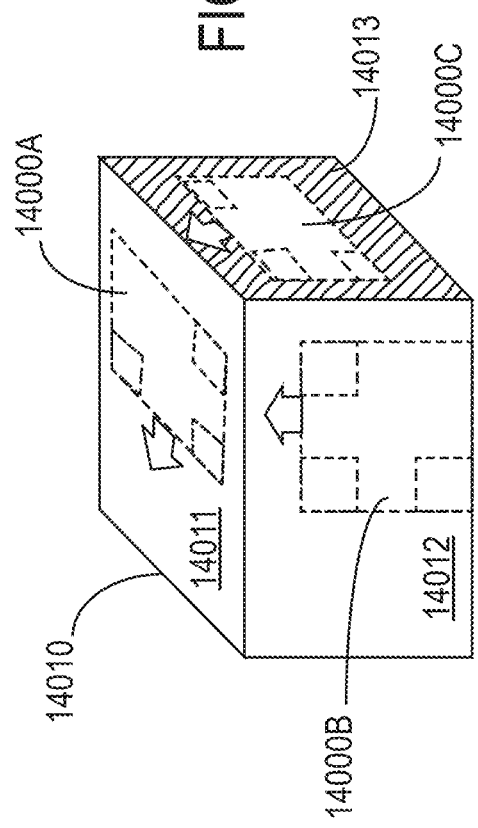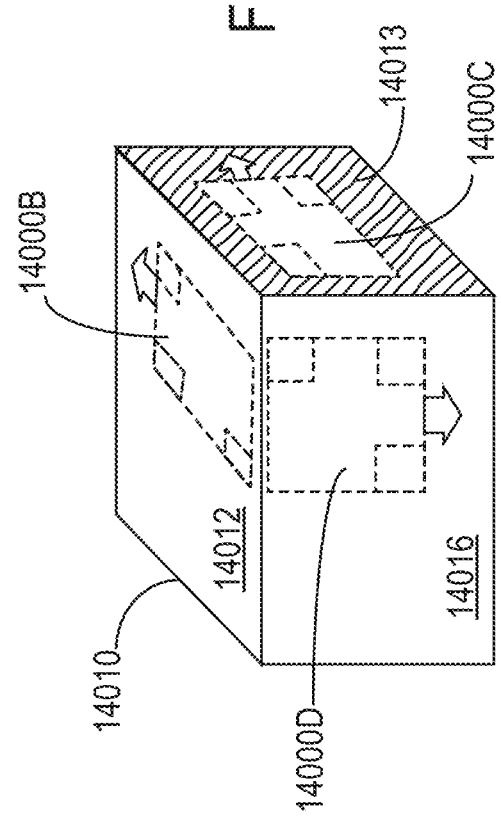

ROBOTIC ASSEMBLY OF TRANSPORT STRUCTURES USING ON-SITE ADDITIVE MANUFACTURING

BACKGROUND

Field

The present disclosure relates generally to manufacturing, and more specifically to flexible and automated assembly techniques for manufacturing vehicles, aircraft, boats and other transport structures using 3-D printing.

Background

Traditional manufacturing facilities can involve significant inflexible factory infrastructure to produce products at volume. For example, a factory may use fixed robotic assembly systems operating on assembly lines to achieve efficient production at volume. The inflexible factory infrastructure may often limit the manufacturing systems to manufacture only a handful of models of transport structures such as vehicles, motorcycles, boats, aircraft and the like, and even then, each model of the transport structure may be expensive to tool. In the event that a factory is configured, permanently or in the long-term, to produce one or more underperforming models, the factory may face financial trouble because of the factory and tooling amortization costs and operate at a loss. More specifically, the factory in these instances may be underutilized because of factory inflexibility, the need for tooling amortization prior to changing factory resources from producing the underperforming products to producing new products or more commercially successful existing products, and other constraints.

Furthermore, where additive manufacturing (AM) techniques may be desirable for the three-dimensional (3-D) printing of components or portions thereof for the transport structures, such factories conventionally either outsource the AM functions or, where they are in-house, the AM is conducted at a dedicated location away from the assembly line of the transport structure. Thus, these factories have little if any flexibility to modify their AM capabilities to accommodate changes in circumstances.

SUMMARY

Several aspects of systems and methods for 3-D printing of components for transport structures will be described more fully hereinafter.

One aspect of an automated assembly system for a transport structure includes a plurality of automated constructors to assemble the transport structure, wherein a first one of the automated constructors includes a three-dimensional (3-D) printer to print at least a portion of a component and transfer the component to a second one of the automated constructors for installation during the assembly of the transport structure.

One aspect of a method for automated assembly of a transport structure by a plurality of automated constructors, wherein a first one of the automated constructors comprises a three dimensional (3-D) printer, includes printing at least a portion of a component of the transport structure by the 3-D printer, automatedly transferring the component from the first one of the automated constructors to a second one of the automated constructors, and automatedly installing the component by the second one of the automated constructors during the assembly of the transport structure.

It will be understood that other aspects of systems and methods for 3-D printing of components for transport structures will become readily apparent to those skilled in the art from the following detailed description, wherein it is shown and described only several embodiments by way of illustration. As will be realized by those skilled in the art, the facilities and methods for manufacturing transport structures as described herein are capable of other and different embodiments and its several details are capable of modification in various other respects, all without departing from the invention. Accordingly, the drawings and detailed description are to be regarded as illustrative in nature and not as restrictive.

BRIEF DESCRIPTION OF THE DRAWINGS

Various aspects of flexible and modular robotic manufacturing of transport structures will now be presented in the detailed description by way of example, and not by way of limitation, in the accompanying drawings, wherein:

FIG. 1B schematically illustrates a control system of the vehicle manufacturing facility.

FIG. 15A shows a rectangular solid part in a first pose.

FIG. 15B shows the rectangular solid part in a second pose.

DETAILED DESCRIPTION

Figure 1A:
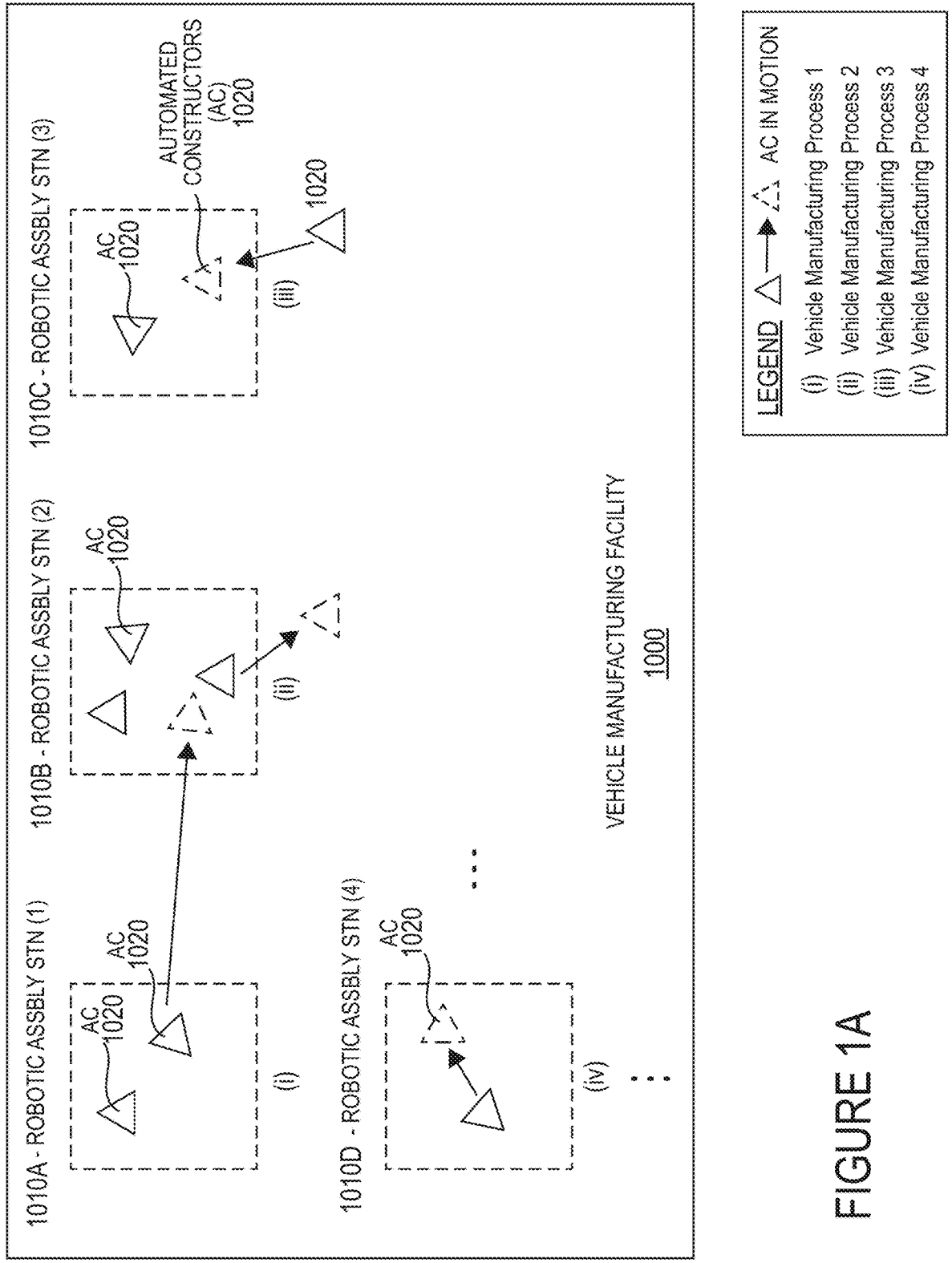
FIG. 1A illustrates a vehicle manufacturing facility comprising a plurality of robotic assembly stations and a plurality of automated constructors.

The detailed description set forth below in connection with the appended drawings is intended to provide a description of various exemplary embodiments of 3-D printing of components for transport structures and is not intended to represent the only embodiments in which the invention may be practiced. The term "exemplary" used throughout this disclosure means "serving as an example, instance, or illustration," and should not necessarily be construed as preferred or advantageous over other embodiments presented in this disclosure. The detailed description includes specific details for the purpose of providing a thorough and complete disclosure that fully conveys the scope of the invention to those skilled in the art. However, the invention may be practiced without these specific details. In some instances, well-known structures and components may be shown in block diagram form, or omitted entirely, in order to avoid obscuring the various concepts presented throughout this disclosure.

A need exists for flexible and modular robotic vehicle manufacturing facilities, systems, and methods. The facilities, systems, and methods provided herein allow for flexible and modular transport structure manufacturing and assembly. The facilities, systems, and methods may comprise a plurality of variable robotic assembly stations to perform a set of one or more vehicle manufacturing processes and a plurality of variable robots, such as automated constructors, to perform the one or more vehicle manufacturing processes. Flexibility in the manufacturing and assembly of vehicles can be provided in 1) variableness of the location and/or area of the robotic assembly station, 2) capabilities of a robot, such as an automated constructor, to carry out one or more vehicle manufacturing processes with convenient and automated reconfiguration between each process, and 3) customization of vehicle parts, including connectors and interconnecting material, through 3-D printing or other techniques. Automated processes allow for construction and assembly of parts, tracking of parts during assembly and during life of the part, MAC and flexible construction of various types of vehicles.

While oftentimes for purposes of illustration, vehicle manufacturing and related facilities are referenced, it will be appreciated that the techniques described in this disclosure are equally applicable and well-suited to other types of transport structures, including but not limited to boats, aircraft, helicopters, motorcycles, trains, busses, and the like.

Provided herein are flexible and modular vehicle manufacturing facilities, systems, and methods for the manufacturing and assembly of transport structures. The manufacturing facilities, systems, and methods provided herein may be non-design specific and may be capable of accommodating a wide variety of vehicles and demands. A facility may comprise one or more robotic assembly stations. Each robotic assembly station may comprise one or more robots, including automated constructors. A set of vehicle manufacturing processes may be performed in each robotic assembly station. The facility may use a combination of 3-D printed parts and commercial off-the-shelf (COTS) parts. Flexibility in the manufacturing and assembly of vehicles can be provided in 1) variableness of the location and/or area of the robotic assembly station, 2) capabilities of a robot, such as an automated constructor, to carry out one or more vehicle manufacturing processes with convenient and automated reconfiguration between each process, and/or 3) in-place printing for ease of assembly, including connectors and interconnecting material, through 3-D printing.

Increased flexibility and non-design-specific capabilities in a manufacturing facility may provide significant economic advantages. For example, traditional manufacturing systems can build significant inflexible factory infrastructure to produce products at volume. For automotive manufacturing, a scale factory can be used to assemble vehicles. However, even the smaller factories that do not include stamping facilities and paint shops that do not include stamping factories, can cost hundreds of millions of dollars to build, equip, and maintain. Oftentimes, the resulting factories can only support a handful of vehicle models and/or vehicle types, each of which can cost well over $100 million to tool. In order for a large inflexible factory, which can only build specific vehicles, to be profitable, the specific vehicles must consume a significant portion of the factory capacity. In the event that the factory is inflexibly configured to produce one or more underperforming vehicles, the factory may not replace the one or more underperforming vehicles with another vehicle model because of the costs associated with tooling for specific models, updating fixtures, and programming (e.g., fixed spot-welding robots) to assemble traditional vehicle body structures. It can be financially burdensome to replace underperforming models prior to complete amortization of the tooling.

Accordingly, in various exemplary embodiments, a facility may comprise non-design-specific features to provide flexibility, such as described above and to be described further below, variableness of the location and/or area of the robotic assembly stations, capabilities of a robot, such as an automated constructor, to carry out one or more vehicle manufacturing processes with convenient and automated reconfiguration between each process, and/or customization of vehicle parts, including connectors and interconnecting material, through 3-D printing. Unlike a traditional volume factory, the flexible facility can be conveniently reconfigured, such as via automated systems, with machine-learning enabled robots reconfiguring themselves as needed, to produce a variety of vehicles without downtime for retooling or reprogramming. Moreover, 3-D printers can be supported on a robotic device and in some exemplary embodiments, the robotic device can move to different assembly stations as needed to 3-D print different parts or components on a dynamic, substantially real-time basis. The printed parts may be further manipulated or moved by the supporting robotic device or by one of any number of automated constructors. For example, a robot may take a 3-D printed part at an assembly station and place the part into the transport structure or insert the printed part on another component for assembly and integration with the component.

FIG. 1A illustrates a vehicle manufacturing facility comprising a plurality of robotic assembly stations and a plurality of automated constructors. A vehicle manufacturing facility 1000 may comprise one or more robotic assembly stations, such as, for example, a first robotic assembly station 1010a, a second robotic assembly station 1010b, a third robotic assembly station 1010c, a fourth robotic assembly station 1010d, and so on. A robotic assembly station may comprise a designated area at a designated location where a set of one or more vehicle manufacturing processes occurs.

A vehicle manufacturing process may include any process involved in the manufacture of a vehicle, such as, among many other processes, the producing, printing, painting, assembling, disassembling, cutting, bending, stamping, forming, tooling, processing, treating, smelting, heating, cooling, cleaning, recycling, discarding, painting, inspecting, imaging, and/or testing of parts, components, and/or assemblies of parts or components of a vehicle. One or more types of vehicle manufacturing processes may occur at various stages during vehicle manufacturing and/or disassembly.

For example, while the assembling of a vehicle may include the steps of putting the vehicle together, a disassembling step of taking a vehicle apart may be desirable where used cars are being recycled. Disassembly may also occur where a chassis or space frame is being taken apart to form a chassis with a different profile.

While additively manufactured parts may be 3-D printed and thereby customized to a particular application, the additively manufactured part may, depending on the application, undergo further steps such as painting, cutting, bending or other manipulation, for example, to accommodate a discrepancy in fit or adjust a tolerance. In addition, COTS parts or custom parts tooled at the assembly plant may involve any of the above steps, including painting, cutting, bending, stamping, and the like. One or more interfaces between parts may undergo heat treatment, and subcomponents may require bonding or thermal fusion. During the recycling process, smelting may be used to extract metal from materials for atomization into powder and ultimate use by the additive manufacturing device.

Parts may otherwise be cleaned, imaged, inspected, and tested for finalization into a commercial transport structure.

Each of the aforementioned steps may be performed, in whole or in part, by one or more of the plurality of automated constructors at one or more stations. In some exemplary embodiments, each station includes an area designated for the dedicated performance of one of the tasks above, with automated constructors moving to the station or otherwise residing at the station as required. For example, an automated constructor tasked with inspecting a part can move to a station to perform the inspection. The automated constructor can inspect tolerances of a part being assembled on the fly to ensure that the part is meeting one or more specifications. If a part is not within the specification, the automated constructor can communicate this information to a central controller or another automated constructor, and the part can either be remedied to fall within specifications, or it can be removed from active assembly in the event the problem cannot be fixed via available remedial measures or if the problem is serious in nature.

In some instances, a vehicle manufacturing process may be independent of other vehicle manufacturing processes. For instance, a vehicle manufacturing process may occur independently regardless of other processes that are being performed or that have been performed.

In other instances, a vehicle manufacturing process may be dependent on other vehicle manufacturing processes. For example, two or more vehicle manufacturing processes may occur simultaneously (e.g., heating and cleaning). In another example, two or more vehicle manufacturing processes may be carried out consecutively in series (e.g., cooling after heating). The processes may occur in a particular sequence (e.g., step A occurs before step B) or may occur in series without regard to sequence (e.g., step A before step B or step B before step A may both be plausible). In some instances, two or more vehicle manufacturing processes may occur within a particular time frame. The time frame may be a predetermined period of time.

One or more vehicle manufacturing processes may be grouped into a set. In some instances, a vehicle can be partially or completely assembled by undergoing one or more sets of the one or more vehicle manufacturing processes. For example, a vehicle can be partially or completely assembled by undergoing one or more sets of the one or more vehicle manufacturing processes in a specific order. Optionally, a vehicle can be partially or completely assembled without regard to order. Alternatively or in addition, a vehicle can be partially or completely disassembled, intentionally, by undergoing one or more sets of the one or more vehicle manufacturing processes in a specific order. Optionally, a vehicle can be partially or completely disassembled without regard to order.

A set of one or more vehicle manufacturing processes may be performed in each robotic assembly station. Each robotic assembly station may perform a different set of one or more vehicle manufacturing processes. For instance, even if one or more manufacturing processes are the same across stations (e.g., a first set of processes sharing a same process with a second set of processes), there may be one or more additional manufacturing processes that are different across the stations. Alternatively, two or more robotic assembly stations may perform a same set of one or more vehicle manufacturing processes. In some instances, a single vehicle manufacturing process may be performed in one robotic assembly station. Optionally, multiple vehicle manufacturing processes may be performed in a single robotic assembly station. In some instances, a single vehicle manufacturing process (e.g., smelting) may be performed across two or more robotic assembly stations.

A vehicle manufacturing facility 1000 may comprise a single building or multiple buildings. A vehicle manufacturing facility may be integrated into a building that is used for performing one or more additional features. A vehicle manufacturing facility may be or may comprise one or more factories, plants, warehouses, hangers, or any other type of structure. The vehicle manufacturing facility may be or comprise a campus comprising one or more structures. A vehicle manufacturing facility may comprise one or more roofs, and/or one or more walls. Optionally, a vehicle manufacturing facility may occur in the open without requiring a roof, and/or walls. A vehicle manufacturing facility, or a structure therein, may comprise one or more vertical levels (e.g., floors), where each level may be at, above, or below ground level. A vehicle manufacturing facility may have an open layout (e.g., without dividers or rooms), or may comprise one or more rooms or dividers. Any description herein of a facility may apply to any combination of structures or layouts as described herein.

The vehicle manufacturing facility 1000 may comprise as many robotic assembly stations as necessary or desirable to carry out one or more sets of vehicle manufacturing processes in the facility. Any description herein of a robotic assembly station may apply to stations that perform any of the processes described herein, which may include assembly and/or disassembly processes. The vehicle manufacturing facility may comprise any number of robotic assembly stations. In some instances, the number of stations may be increased or decreased to accommodate limited volume and space of the facility. The stations may be distributed over any type of facility structures or layouts as described herein. For instance, the stations may all be within the same building, or may be distributed over multiple buildings. The stations may be within a campus or property comprising one or more buildings. The stations may be within a part of a building that may have any additional areas devoted to other functions or activities.

A station may encompass an area of a facility. The areas of multiple stations may or may not overlap. Two or more stations may be adjacent to one another. A station may have a fixed size, location, and/or shape. In some instances, the boundaries of a station may be enforced by physical objects, such as by dividers, walls, boundaries, geofences, demarcations, or other objects. In some instances, the boundaries of a station may be shown by visual markers, such as drawings (e.g., lines), labels, lighting (e.g., brightness, color, type of lighting, etc.), or any other form of marking. Alternatively, the boundaries of a station may not be explicitly divided by physical and/or visible markers. Alternatively, a station may change in size (e.g., increase or decrease), location, shape, or any other characteristic. Such changes may occur over time. Such changes may be provided in response to a new or changing demand. For instance, a robotic assembly station may increase in size in response to increased demand. Additionally, functions of one or more robotic assembly stations may be altered to meet the increased demand. Similarly, a robotic assembly cell may decrease in size in response to decreased demand. Functions of the one or more robotic assembly stations may be altered in response to decreased demand. A station may or may not comprise a working area. The working area may comprise a platform or an area in which a vehicle, vehicle part, and/or vehicle assembly may be placed for operation. For instance, an assembly-in-process may be located within the working area within the station area. The working area may be fixed or in motion. For example, the working area may be an autonomous assembly platform. In another example, the working area may be a conveyer belt or other moving platform. The working area may change in size, location, shape, or other characteristic, such as in response to a change in the composition of the station and/or function (e.g., set of processes performed by the station) of the station. The working area of a station may be unique to the station (e.g., without overlap with another station). The working area may in some exemplary embodiments be accessible only to compositions of the station (e.g., robots associated with the station). A station may comprise other areas, such as sub-stations (e.g., arm exchange station, supply station, etc.) and paths (e.g., travel paths for robots, transport paths for vehicle parts or assemblies, etc.).

Each robotic assembly station may comprise one or more robots, such as automated constructors 1020, configured to perform a set of one or more vehicle manufacturing processes. An automated constructor may be referred to as a robot, robotic device, automated machine, automated device, automated apparatus, automotive tools, or manufacturing equipment. An automated constructor may perform an assembly or disassembly step. An automated constructor may perform any manufacturing process as described elsewhere herein, alone or in combination with one or more additional automated constructors. For example, an automated constructor may be configured to receive instructions on performing a set of one or more vehicle manufacturing processes, and further configured to subsequently carry out the received instructions. An automated constructor may have pre-programmed instructions to perform one or more vehicle manufacturing processes. Alternatively or in addition, the automated constructor may receive real-time instructions to perform one or more vehicle manufacturing processes.

An automated constructor may be capable of carrying out a single vehicle manufacturing process (e.g., bending) in the set of vehicle manufacturing processes. For example, a first automated constructor may perform a bending process and a second automated constructor may perform a cutting process in a robotic assembly station. Alternatively, an automated constructor may be capable of carrying out more than one vehicle manufacturing processes (e.g., bending, cutting, etc.) in the set of vehicle manufacturing processes. For example, a first automated constructor may perform both a bending and a cutting vehicle manufacturing process and a second automated constructor may perform both a heating and an adhesive injecting vehicle manufacturing process in a robotic assembly station. A single automated constructor may perform a single manufacturing process, a single automated constructor may perform multiple manufacturing processes, multiple automated constructors may collectively perform a single manufacturing process, or multiple automated constructors may collectively perform multiple manufacturing processes.

In some instances, an automated constructor can be capable of reconfiguration to perform different functions. The different functions may be associated with one or more vehicle manufacturing processes that the automated constructor is instructed to perform. The reconfiguration may be a hardware reconfiguration or a software reconfiguration. For example, the automated constructor may be capable of exchanging between different robot effectors comprising different tools required to perform the different functions. In another example, the automated constructor may be capable of reprogramming, such as to carry out different instructions. In one exemplary embodiment, the automated constructor learns new or different tasks, or variations or refinements of existing tasks, via machine-learning. The machine-learning can be autonomous in the sense that the algorithms that execute the machine-learning processes are included in a processing system, such as one or more processors coupled to a memory or other storage medium, that resides within the automated constructor. In other embodiments, a processing system within the automated constructor communicates with one or more other robots, automated constructors, central control systems, or a control facility, to conduct and prioritize machine-learning capabilities. In other exemplary embodiments, the machine-learning can be independent with respect to certain tasks and can be coordinated. By having made a part on a prior build, the robot may implement a process with the intended result on a similar part of a new product. This activity of the robot may include machine-learning.

Machine-learning can involve numerous applications in the context of the manufacture of transport structures. The automated constructors may be programmed with algorithms, for example, to enable them to make predictions based on previously-stored data or to make decisions based on prior experiences. To this end, machine-learning represents a departure from, or more commonly an addition to, the use of static programs in which the automated constructor is programmed to perform one or more tasks without dynamic variations that might otherwise improve the task or render the task more efficient.

One example of machine-learning may involve an automated constructor whose job it may be to use one or more robotic arms or effectors to retrieve a particular component from an automated constructor incorporating a 3-D printing function, and thereafter to install the component into the transport structure. The component may include, by way of example, a transmission part, gear case, heat exchanger, powertrain, etc., or a subcomponent of any of the aforementioned. Depending on the particular component being installed, the automated constructor may learn, after gaining initial experience installing the component (e.g. by being initially directed by steps dictated via a static program), one or more ways to more efficiently mobilize itself and position or angle the component for an optimal placement in the vehicle These and similar examples of machine-learning may assist in taking the environment and facilities in which the automated constructor is working into account.

If the component is also to be fastened to the vehicle, the automated constructor may acquire in real time through machine-learning algorithms optimal ways for fastening the component, such as affixing screws of other fasteners in a particular order that best or most quickly secures the component.

As another example, machine-learning may also involve an automated constructor having an objective to modify a COTS part in a certain manner using one or more effectors. While the automated constructor on each occasion may modify the COTS part using a predetermined specification to achieve the same end result, the automated constructor may employ machine learning to determine through experience the fastest, most efficient and most effective technique for performing the modification, such as by learning to use the tools in a particular order or by using different sized tools to learn to optimize the modification process through ongoing experience.

Clusters or groups of automated constructors, such as robots, may also be configured (e.g., using various combination of algorithms) to work together to achieve faster results on an assembly line, to optimize additive manufacturing by distributing the AM jobs in a more productive way, or to use different robots for different functions. For example, it may be determined via learning experience by one or more 3-D printing robots that it is more efficient and quicker for a group of 3-D printing robots at a station to each print different sub-components of a gear case, rather than for each 3-D robot of the group of 3-D robots to be working on different subcomponents of different components (e.g., gear case, crankshaft, gas pedals, suspension, etc.), or vice versa.

Machine-learning among automated constructors may also be used to determine, on a dynamic bases and depending on a set of observed conditions in real time, any number of different priorities. Robots may recognize that certain tasks require attention over other tasks at certain times, while the opposite may be true at others. For example, a group of automated constructors may recognize via machine learning that a given station has become (or will become based on an automated constructor's predictions) a bottleneck. Based on this recognition, more automated constructors may change behavior and temporarily transfer to the station at issue to resolve the bottleneck.

As another illustration, machine-learning may be as fundamental as one or more automated constructors learning new and completely different tasks. A robot initially programmed to weld may subsequently learn to apply adhesive. An automated constructor, including a 3-D printer, may subsequently learn to position or orient itself in an area proximate the vehicle in which a part that it prints can be readily passed onto another automated constructor for faster placement of the part.

In another exemplary embodiment, the automated constructors located at various robotic assembly stations can employ self-learning techniques dynamically to avoid collisions with other automated constructors or any other obstacles, including employees working at the assembly station in coordination with or independent of nearby automated constructors.

Additional examples on the use of machine-learning are set forth below:

Machine Learning for Slicing in Additive Manufacturing Processes.

As noted above, in an aspect of the disclosure, the automated constructors may be configured with the ability to perform the additive manufacturing processes. In addition to manufacturing processes, slicing refers to the step wherein the computer aided design (CAD) file of the part to be 3-D printed is cut (or "sliced") to provide instructions to the printer to print the part. These instructions may include G-Codes that provide movement patterns for the print head/deflector to complete the print. Oftentimes, these movement patterns are inefficient, and therefore result in slower prints. Machine learning algorithms could be built into the slicing program to provide efficient movement patterns for the print head/depositor. The said algorithms would optimize paths taken by the print head/depositor to result in quicker, higher-quality builds.

Machine Learning for Motion Control of Print Heads.

Machine learning may also enable print heads to travel in optimized paths and speeds. Instead of simply moving from Point A to B, the machine learning algorithms can determine the quickest and most efficient paths. This optimization process can allow the print head to accelerate while printing regions with simple geometries, while slowing down to account for changes in direction. Machine learning may provide the motion control firmware with more flexibility by optimizing G Code paths to allow for more extreme movements.

Machine Learning for Materials Development.

Machine learning may be used to accurately print a part and/or print over a part on the fly. For example, where lightweight parts are needed, machine learning can guide the automated constructor to print with aluminum. In situations where high strength components are required, the constructor can print with steel. Additionally, machine learning may accurately determine alloying mixtures as needed, thereby driving alloy development based on load and other considerations (environmental factors, density, location on the vehicle, etc.)

Machine Learning for Structural Optimization.

During the printing process, machine learning algorithms can automatically generate fill structures in regions where structural reinforcement is needed. Additionally, these algorithms can be configured to 'anticipate' structures in regions by observing the build stage and can instruct the automated constructor to print. The various load cases would be specified before the vehicle is manufactured and would be a part of a directory, thereby providing the machine learning algorithm a database to refer to for accurately printing the required amount of structure. Machine learning may be integrated in the CAD design phase itself, wherein the algorithm would anticipate potential structures and include them automatically. This is similar to an autocomplete algorithm in an internet search bar.

Machine Learning During Vehicle Assembly.

Machine learning algorithms, in other exemplary embodiments, can make it possible for the automated constructors to obtain the required tools as and when needed. For example, during the assembly process wherein a nut or bolt has to be tightened to a prescribed torque, the constructor can identify the situation and automatedly extend the effector with a torque wrench. Machine learning would also make it possible for these constructors to automatedly reposition themselves based on the assembly stage, thereby optimizing the plant layout. Tools and parts would be delivered just-in-time.

In short, depending on the configuration and embodiment at issue, there is a potentially very-wide variety of applications of machine-learning processes which may be applicable to the present disclosure. It will be appreciated that the design of such algorithms to facilitate machine-learning (regardless of their source, such as the automated constructor itself or a central control location subsequently transmitted to the automated constructor) may be within the grasp of one skilled in the art upon perusal of this disclosure. Common and non-exhaustive examples of potentially applicable machine-learning algorithms may include decision tree learning algorithms, linear and logistic regressions, classifier and support vector machine algorithms, and the like. From more common algorithms such as the above, more complex algorithms or groups of algorithms can be developed by those skilled in the art that combine logic, experience and prediction with motion and action.

In addition to the algorithms, the automated constructors may employ a plurality of machine-learning sensors for gathering data relevant to the machine-learning process and for performing other functions. For example, the automated constructor may be equipped with a low power sensor node configured to gather a variety of types of data that may be used in machine-learning applications. The gathered data may be sent to a processing system in the automated constructor or to a central control facility, e.g., via a wireless connection, for further processing and/or routing to other automated constructors. The sensors may include, for example, optical sensors, thermal sensors for detecting temperature, sensors for detecting the presence of electric charge or voltage, acoustic sensors, sensors for detection of chemicals (including potentially harmful chemicals to the vehicle, nearby parts, environment or otherwise) proximate the automated constructors, and the like. The sensors can also include RF sensors, radio sensors, and other electrical sensors for receiving wireless electrical signals or messages.

The automated constructors may be configured for traveling to and from, and within, a robotic assembly station. The robotic assembly station may comprise as many automated constructors as required to carry out the set of one or more vehicle manufacturing processes associated with the robotic assembly station. For example, depending on the embodiment, the robotic assembly station may comprise anywhere from one to 1000 automated constructors or more. In other embodiments, each robotic assembly station may have any number of automated constructors. For instance, they may or may not have the same number or types of automated constructors. A number and/or type of automated constructor in each robotic station may be selected independent of other robotic stations. An automated constructor may be associated with one or more robotic assembly stations. For example, an automated constructor may be associated with only a first robotic assembly station 1010*a*. In another example, an automated constructor may be associated with both the first robotic assembly station 1010*a* and a second robotic assembly station 1010*b*. In some instances, an automated constructor can be associated with one or more robotic assembly stations when the automated constructor is within the area of the robotic assembly station and/or the automated constructor is performing a manufacturing process associated with the robotic assembly station. For example, if the robotic assembly station is associated with assembling a section of a chassis, the automated constructor may be assisting in assembling the section of the chassis. The association of an automated constructor may change based on demand. For instance, if there is a greater need of an automated constructor in the first robotic assembly station, the automated constructor may be associated with the first robotic assembly station. When the need increases in the second robotic assembly station and decreases in the first robotic assembly station, the automated constructor may become associated with the second assembly station. The automated constructor may be associated with only one station at a time. Alternatively, it may be associated with multiple stations at a time. In some instances, an automated constructor may not be associated with any station at a particular moment. For instance, one or more 'extra' automated constructors may be idling or waiting until they are associated with a robotic assembly station. For instance, an automated constructor 1020 may be idle unless and until instructions are provided to it, e.g., from a control system or another automated constructor 1020, to mobilize to a robotic assembly station and perform an assigned task.

In some instances, automated constructors may traverse various regions of the manufacturing facility as needed. For example, as shown in FIG. 1A, an automated constructor 1020 may travel from a first robotic assembly station 1010*a* to a second robotic assembly station 1010*b*. While in the first robotic assembly station, the automated constructor may perform a manufacturing process associated with the first robotic assembly station. When the automated constructor travels to the second robotic assembly station, the automated constructor may perform a manufacturing process associated with the second robotic assembly station. In some instances, an automated constructor 1020 may depart a robotic assembly station 1010*b*. This may occur when the automated constructor is no longer needed at the robotic assembly station, or if a need is greater at a different location. In some instances, the automated constructor 1020 may enter a robotic assembly station 1010*c*. This may occur when the automated constructor is needed at the robotic assembly station. An automated constructor may travel within a robotic assembly station 1010*d*.

In some instances, the designated area and/or designated location of a robotic assembly station may vary with the respective locations and movements of the one or more automated constructors in the assembly station performing the set of one or more vehicle manufacturing processes. For example, if the one or more automated constructors associated with a first robotic assembly station 1010a travel to the location of a second robotic assembly station 1010b, and the one or more automated constructors associated with the second robotic assembly station travel to the location of a fourth robotic assembly station 1010d, the location of the first robotic assembly station may change to the initial location of the second robotic assembly station, and the location of the second robotic assembly station may change to the initial location of the fourth robotic assembly station. Two or more robotic assembly stations may share the same designated location. Two or more robotic assembly stations may partially or completely overlap in designated areas. In other instances, the designated area and/or designated location of an assembly station may vary with the respective sizes and/or locations of components or assemblies of components of a vehicle that is a subject of the set of one or more vehicle manufacturing processes.

The vehicle manufacturing facility may comprise a vehicle transport system that can transport a vehicle or other transport structure, or parts of a transport structure, to multiple locations (e.g., robotic assembly stations, etc.) during an assembly process. For example, the transport system can comprise a moving platform, such as a conveyer belt. In some instances, a gantry may be used to transport vehicles or parts. Alternatively or in addition, the transport system can comprise one or more robots (e.g., mobile supply vehicles) that are programmed to transport a partially or fully assembled vehicle or other transport structure undergoing an assembly process, or vehicle parts. Alternatively or in addition, the transport system can comprise manual labor, for example, from facility employees who have instructions to transport a vehicle or vehicle parts to multiple locations in the facility. For example, the vehicle transport system may be a combination of conveyer belts, robots, and/or manual labor (e.g., an employee provides a tube to a mobile supply vehicle at location A, the mobile supply vehicle transports the tube from location A to a conveyer belt at location B, and the conveyer belt transports the tube from location B to multiple other locations in the facility). The transport system may transport a vehicle or vehicle parts to different locations within the same robotic assembly station, between different robotic assembly stations, and or between a robotic assembly station and another location.

In some instances, during a vehicle assembly process, a plurality of types of transport structures, (e.g., first aircraft, second aircraft, first motorcycle, second motorcycle, first automobile model, second automobile model, first boat model, second boat model, first bus model, second bus model, etc.) can be transported, via the vehicle transport system, to the one or more robotic assembly stations. Alternatively or in addition, a plurality of types of vehicle components (e.g., wheel, tube, engine, etc.) or assemblies of vehicle components can be transported, via the vehicle transport system, to the one or more robotic assembly stations. The facility may simultaneously assemble and/or disassemble multiple vehicles.

The facility may simultaneously assemble and/or disassemble multiple types or models of transport structures. For example, in the case of vehicles, a first vehicle model may traverse through various robotic assembly stations in the facility, each station located at a different location in the facility, for different stages of its assembly. At the same time, in parallel, a second vehicle model may be traversing through various different robotic assembly stations in the facility for different stages of its assembly. The first and second vehicle models may traverse through the same and/or different robotic assembly stations. Optionally, the first and second vehicle models may traverse through the same robotic assembly stations at the same time or at different times. The facility may support the simultaneous assembly and/or disassembly of any number of vehicles or vehicle models. The difference in vehicle models (e.g., design) being assembled and/or disassembled simultaneously may vary drastically (e.g., building a boat, car, and a bus simultaneously) or narrowly (e.g., building three different series models of a same automobile brand, each series comprising the same body design).

One or more robotic assembly stations may be reconfigured to support the assembly and/or disassembly of different vehicle models. In some instances, various models of transport structures can be assembled and/or disassembled in batches. For example, one or more robotic assembly stations may be configured to assemble a first vehicle model. After assembling a first batch of the first vehicle model, the one or more robotic assembly stations may be reconfigured to assemble a second batch of a second vehicle model. Alternatively or in addition, a robotic assembly station may reconfigure as needed (e.g., configured to build one of a first vehicle model, then reconfigured to build one of a second vehicle model, then reconfigured to build one of a third vehicle model, then reconfigured back to build one of the first vehicle model, etc.). Thus, the robotic assembly stations may be reconfigured as needed when different vehicle models or types are assembled in series. As previously described, the different vehicle models may arrive in large batches, or may be individualized so that each vehicle may be a different model, or anywhere in between. The number of vehicles in a series of the same vehicle model or type may vary based on demand. For example, a large batch of 1000 vehicles of the same type may be built using a robotic assembly station, then several vehicles of another type may be built using the robotic assembly station (which may optionally need to be re-configured to accommodate the different vehicle types), and then a medium batch of a hundred or so vehicles of another type may be built using the robotic assembly station (which may optionally need to be re-configured again to accommodate the third vehicle type).

The respective functions and/or movements of the one or more automated constructors may be controlled by a control system. FIG. 1B schematically illustrates a control system of the vehicle manufacturing facility. The control system 1500 may comprise a control server 1505. A server, as the term is used herein, may refer generally to a computer that provides a service (e.g., transmit and receive instructions) or resources (e.g., data) over a network connection. The server may be provided or administered by an administrator (e.g., plant manager) of the vehicle manufacturing facility. In some instances, the server may include a web server, an enterprise server, or any other type of computer server, and can be computer-programmed to accept requests (e.g., HTTP, or other protocols that can initiate data transmission) from a computing device (e.g., a robot, an automated constructor, a 3-D printer, etc.) and to serve the computing device with requested data. In addition, the server can be a broadcasting facility, such as free-to-air, cable, satellite, and other broadcasting facility, for distributing data. The server may also be a server in a data network (e.g., a cloud computing network). Any description herein of a server may apply to one or more servers or other devices that may individually or collectively perform any of the steps described elsewhere herein. Alternatively or in addition, the system may be implemented using a cloud computing infrastructure or a peer-to-peer configuration. In some exemplary embodiments, the server may reside locally within the assembly facility or it may reside at a campus or building thereof, or one or more dedicated locations networked to the assembly facility.

The control server 1505 may comprise known computing components, such as one or more processors, one or more memory devices storing software instructions executed by the processor(s), and data. The server can have one or more processors and at least one memory for storing program instructions. The one or more processors can be a single microprocessor or multiple microprocessors, field programmable gate arrays (FPGAs), digital signal processors (DSPs), or any suitable combination of these or other components capable of executing particular sets of instructions. Computer-readable instructions can be stored on a tangible non-transitory computer-readable medium, such as a flexible disk, a hard disk, a CD-ROM (compact disk-read only memory), an MO (magneto-optical), a DVD-ROM (digital versatile disk-read only memory), a DVD RAM (digital versatile disk-random access memory), or a semiconductor memory. Alternatively, the methods disclosed herein can be implemented using hardware components or combinations of hardware and software such as, for example, ASICs (application specific integrated circuits), special purpose computers, or general purpose computers. While FIG. 1B illustrates the control server as a single device 1505, in some embodiments, multiple devices (e.g., computers) may implement the functionality associated with the control server. The one or more processors may further be capable of using cloud storage as well as any future memory or storage capabilities to be implemented in the future, including, without limitation, storage capabilities that may be essential for implementing the Internet of Things (IoT).

The network 1515 may be configured to connect and/or provide communication between various components (e.g., one or more automated constructors 1520a-x, other robots, 3-D printers, other machines, sensors, etc.) and the control system 1500. For example, the network may be implemented as the Internet, intranet, extranet, a wireless network, a wired network, a local area network (LAN), a Wide Area Network (WANs), Bluetooth, Near Field Communication (NFC), any other type of network that provides communications between one or more components of the network layout in FIG. 1B, or any combination of the above listed networks. In some embodiments, the network may be implemented using cell and/or pager networks, satellite, licensed radio, or a combination of licensed and unlicensed radio. The network may be wireless, wired (e.g., Ethernet), or a combination thereof.

The control system 1500 may be implemented as one or more computers storing instructions that, when executed by one or more processors, can generate and transmit instructions to one or more automated constructors 1520a-x and receive data and/or instruction requests from the one or more automated constructors. The facility 1000 may comprise one or more control systems, wherein each control system operates substantially parallel to and/or in conjunction with the control system 1500. In some instances, the control server may comprise the computer in which the one or more control systems are implemented. Alternatively, the one or more control systems may be implemented on separate computers. The control server may access and execute the one or more control systems to perform one or more processes consistent with the disclosed embodiments. In certain configurations, the one or more control systems may be include software stored in memory accessible by the control server (e.g., in a memory local to the control server or remote memory accessible over a communication link, such as the network). Thus, in certain aspects, the one or more control systems may be implemented as one or more computers, as software stored on a memory device accessible by the control server, or a combination thereof. For example, one control system may be a computer hardware, and another control system may be software that can be executed by the control server.

The one or more control systems can be used to control various components of the vehicle manufacturing facility 1000 in a variety of different ways, such as by storing and/or executing software that performs one or more algorithms to achieve control. Although a plurality of control systems have been described for performing the one or more algorithms, it should be noted that some or all of the algorithms may be performed using a single control system, consistent with disclosed embodiments.

The one or more control systems may be connected or interconnected to one or more databases 1510. The one or more databases 1510 may be one or more memory devices configured to store data (e.g., sensor data, parts manufacturing data, inventory data, etc.). Additionally, the one or more databases may, in some exemplary embodiments, be implemented as a computer system with a storage device. In one aspect, the one or more databases may be used by the control server 1505 to perform one or more operations consistent with the disclosed embodiments. In certain embodiments, the one or more databases may be co-located with the control server, and/or co-located with other components (e.g., automated constructors 1520a-x) on the network 1515. For example, an automated constructor 1520 may transmit sensor data to the one or more databases without going through the control server. One of ordinary skill will recognize that the disclosed embodiments are not limited to the configuration and/or arrangement of the one or more databases.

The control system 1500 may be configured to generate instructions for one or more automated constructors 1520a-x to travel to or from each assembly station. For example, the control system may instruct the one or more automated constructors to autonomously travel to or from each assembly station. An automated constructor may have varying levels of autonomous independence. For instance, the control system may allow an automated constructor to travel on its own without providing any instructions. The automated constructor may, for example, have preprogrammed instructions to travel on its own, such as via communicating with the control system and/or communicating with other automated constructors. In another example, the automated constructor may have preprogrammed conditions or parameters that the automated constructor must adhere to while travelling on its own. In some instances, the control system may provide periodic or continuous updates to software in the automated constructor, such as to redefine preprogrammed conditions or parameters, to update learning capabilities (e.g., capability to autonomously travel), or to assign new or different tasks. Alternatively or in addition, the control system may provide more detailed (e.g., step-by-step) instructions to the one or more automated constructors to travel to or from each assembly station. For instance, the control system may provide a specific travel path for an automated constructor. In another instance, the control system may provide a target destination, and the automated constructor may be programmed to reach the target destination by following any path. The automated constructor may follow one or more parameters in determining a path or may freely determine the path on the fly. In another instance, the control system may provide a target destination and parameters, such as allowed paths and disallowed paths, allowed areas and disallowed areas in the facility, preferred paths, preferred areas, and/or time constraints. The automated constructor may, within the provided parameters, reach the target destination. The instructions can be preprogrammed in the automated constructor or provided as real-time instructions. The automated constructor may optionally be operating autonomously when traveling along the path without any pre-planning to the path. The constructor may be generating the path in real-time.

The automated constructor may also employ machine-learning techniques as described in this disclosure to increase its ability or effectiveness to autonomously travel, e.g., between assembly stations. For example, the automated constructor may use one or more sensors to recognize stationary or mobile obstacles and may record information or parameters about any of these obstacles that may assist the automated constructor in developing future travel paths or in avoiding collisions. The automated constructor may, in some instances, convey this machine-learned information to the control system 1500, depending on factors such as the degree of autonomy of the automated constructor, as governed by its software or hardware capabilities, pre-conveyed instructions from the control system 1500, or otherwise.

In some instances, the control system 1500 may change the designated location and/or designated area of a robotic assembly station, such as by instructing the travel of one or more automated constructors associated with the robotic assembly station. In this way, the robotic assembly stations may be flexible and modular, and the vehicle manufacturing facility 1000 may be readily reconfigured by changing the respective locations and/or areas of each robotic assembly station within the limits of the facility location and/or facility area. In some instances, the facility may comprise one or more parts of a building, and in some instances, the facility may comprise one or more different buildings. The one or more robotic assembly stations may be distributed in any layout, as constrained by the location and/or area of the facility. For example, a first robotic assembly station may be located at a first building of the facility and a second robotic assembly station may be located at a second building of the facility.

The control system 1500 may, in some exemplary embodiments, generate instructions in real-time. Some examples of real-time activity can include a response time of less than 1 second, tenths of a second, hundredths of a second, or a millisecond. Each of the robots, including the one or more automated constructors, such as those described above or further below, may in these embodiments be capable of responding to instructions from the control system in or near real-time. For example, through the movement of the one or more automated constructors, the robotic assembly stations may be reconfigured and scaled in location and/or area in or near real-time. In some instances, the control system may generate periodic instructions. The periodic instructions can be regular, such as in accordance with schedule or at regular intervals (e.g., every 10 minutes, every hour, every day, every week, etc.), or irregular. The instructions may be provided in accordance with a predetermined schedule. The instructions may be provided in response to a detected event (e.g., assembly of a new transport structure is initiated, raw supply runs out, one or more machines malfunction, etc.).

The control system 1500 may be further configured to generate instructions for the one or more automated constructors to perform manufacturing processes for the transport structures. In the case of vehicles, the control system 1500 may be configured to generate and/or provide instructions for the one or more automated constructors to perform one or more vehicle manufacturing processes or one or more sets of one or more vehicle manufacturing processes. For instance, the control system 1500 may change the set of one or more vehicle manufacturing processes associated with a robotic assembly station altogether. The control system may give detailed instructions to the one or more automated constructors as to performing a vehicle manufacturing process. For example, the control system may give specific dimensions of a vehicle part to a 3-D printing automated constructor to print. A more detailed description of the one or more automated constructors performing the one or more vehicle manufacturing processes is provided further below.

Figure 2:
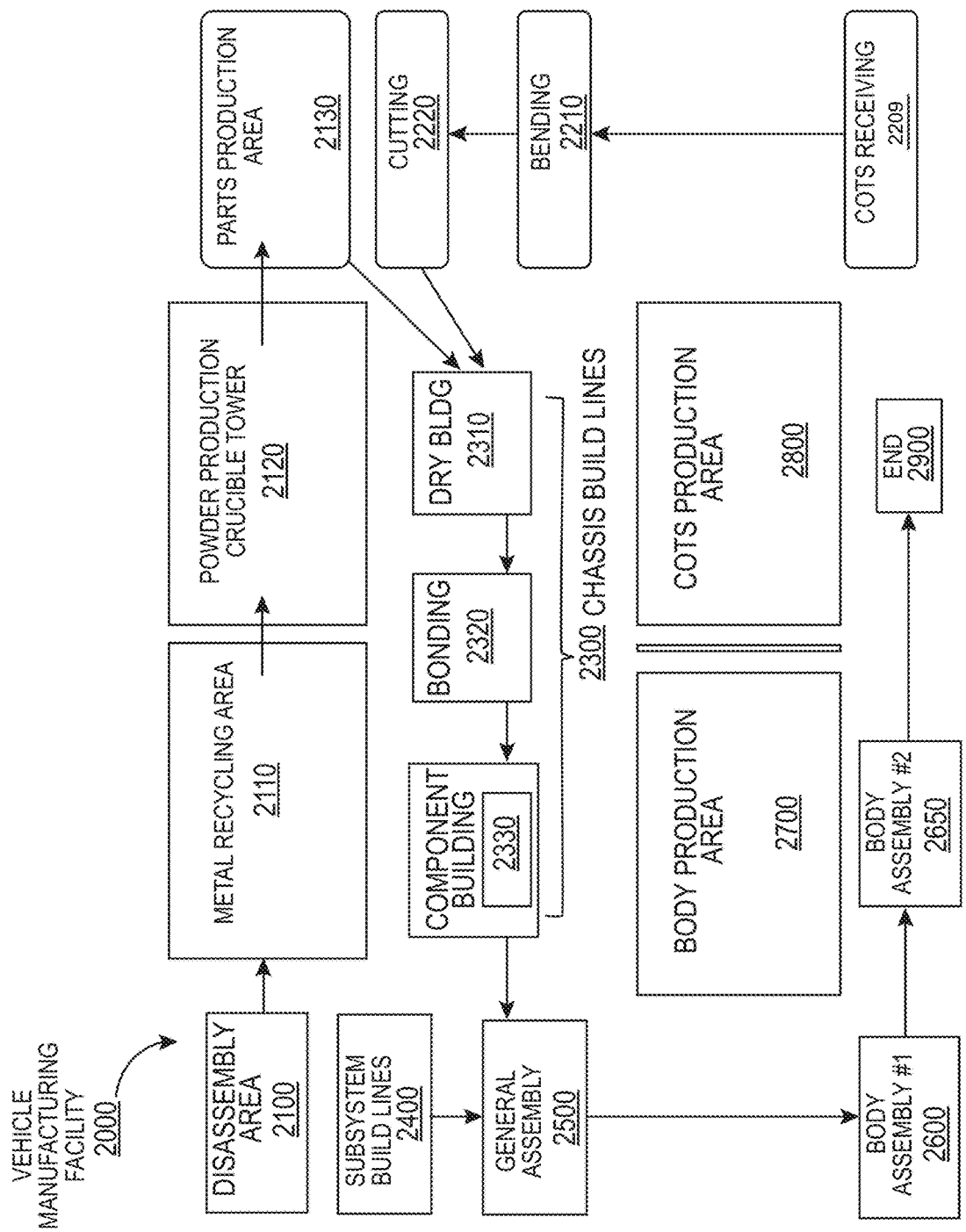
FIG. 2 shows a schematic diagram of a vehicle parts production system.

FIG. 2 shows a schematic diagram of a parts production system for a transport structure. While the details and concepts may be applied to any suitable transport structure as previously described, FIG. 2 is illustrated in the context of an exemplary vehicle parts production system. The vehicle manufacturing facility 2000 may use vehicle parts that are produced on-site or off-site of the facility. Some vehicle parts may be initially produced off-site and, if necessary, altered or otherwise processed on-site. Alternatively, some vehicle parts may be initially produced on-site and altered or processed off-site. In some instances, on-site part production may comprise three dimensional (3-D) printing. In some instances, off-site parts may comprise commercial off-the-shelf (COTS) parts. COTS parts may also be 3-D printed. In some instances, existing parts (e.g., 3-D printed, COTS, etc.) may be customized via 3-D printing. As used herein, the terms "parts" or "vehicle parts" may collectively refer to the parts to be assembled in a vehicle or other transport structure as well as one or more manufacturing tools that are capable of interacting with or manipulating the parts to be assembled.

In an exemplary embodiment involving a vehicle assembly facility, vehicle parts may be produced on-site through 3-D printing. Old vehicles and transport structures, and old vehicle parts, may be input into the vehicle parts production system for disassembly in a disassembly area 2100. The old vehicles and old vehicle parts may be native to the system (e.g., manufactured and/or assembled by the same facility 2000) or foreign to the system (e.g., manufactured and/or assembled by a different facility). The dissembled components of the old vehicles and old vehicle parts may be reused, recycled, or discarded in a metal recycling area 2110. For example, metal parts may be recycled. The metal recycled parts, as well as other printing structural supports, may be transferred to a smelter in the metal recycling area 2110 to produce ingots. The ingots can be produced from metal from any sources, including from sources other than disassembled old transport structures including vehicles and old vehicle parts. Other disassembled parts that cannot be reused or recycled may be discarded from the system. The ingots may be fed into a powder production crucible tower 2120 where they may be converted to metal power, such as by undergoing gas atomization or another suitable process for converting the recycled ingots into metal powder. The metal powder output from the powder production crucible tower may be fed to one or more 3-D printers in a parts production area 2130 and, in some embodiments as described below, the output powder may be directly transported to one or more 3-D printing robots on the assembly line. The 3-D printer may use metal powder from other sources, such as commercially available metal powder. It will be appreciated that the 3-D printer is not limited to using metal powder as a base material for rendering a 3-D object, and that plastics, composites, and other materials may be transported to the parts production area and/or directly to the 3-D printing robots and used as material for 3-D printing one or more components or portions thereof.

The parts production area 2130 may comprise an enterprise resource planning (ERP) system that can direct the one or more 3-D printers to produce vehicle parts or to finish COTS or other parts. In an exemplary embodiment, the ERP system may include software that enables facility 2000 to use a system of integrated software applications to manage and automate numerous functions and manufacturing processes. For example, the ERP system can instruct the one or more 3-D printers to incorporate necessary details, or modifications, in the printed vehicle parts. The ERP system can comprise software that automates and integrates core business processes, such as manufacturing processes, by utilizing big and small data, such as customer orders, manufacturing target goals, inventory records, parts databases, financial data, and manufacturing schedules. In some instances, the control system 1500 of FIG. 1B may comprise, in its software, the ERP system. Alternatively, the ERP system may be a separate system from the control system. In some instances, the 3-D printers may comprise fixed machines. Alternatively or in addition, the 3-D printers may comprise 3-D printing robots. The 3-D printing robots may be capable of, and configured for, travel. The 3-D printing robots may perform on an assembly line. In some instances, the 3-D printing robots may be automated constructors associated with one or more robotic assembly stations.

Figure 20:
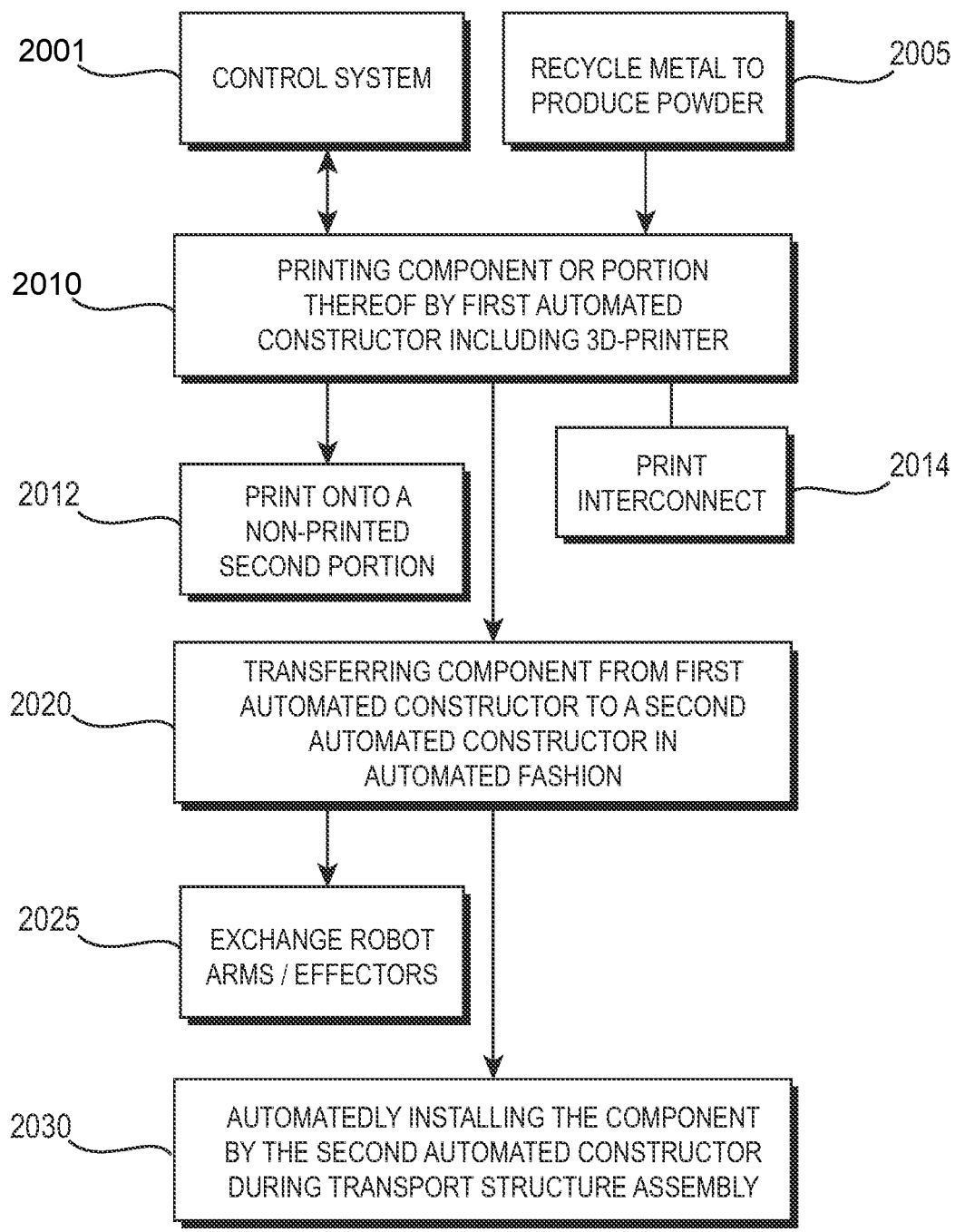
FIG. 20 shows a flow diagram of an exemplary method for automated assembly of a transport structure by a plurality of automated constructors, wherein a first one of the automated constructors comprises a three dimensional (3-D) printer.

FIG. 20 shows an illustrative block diagram of an exemplary method for on-site 3-D printing of components at a robotic assembly station. In the exemplary method, as shown in 2001, a control system may provide instructions to or otherwise communicate with the automated constructor(s) involved in the 3-D printing process. Alternatively, the automated constructors are operating in an autonomous or semi-autonomous manner.

In some embodiments, the material used for 3-D printing may include powder procured from recycled metal, as shown in step 2005 and described above. In other exemplary embodiments, the 3-D printed material may include plastics or composites, and may be obtained from any suitable source. At step 2010, a first automated constructor including a 3-D printer 3-D prints a component or a portion thereof. That is, in some embodiments, the 3-D printer is built as an integral part of the first automated instructor. In other embodiments, a separate 3-D printer is supported by the automated constructor, e.g., on a platform, or by the use of one or more arms or effectors, etc. In an exemplary embodiment, the first automated constructor is capable of moving in an automated fashion to and from different robotic assembly stations on an as-needed basis, e.g., following real-time commands from the control system.

The 3-D printing of a portion of the component, as described in step 2010, may mean, for example, that the first automated constructor 3-D prints the portion of the component onto a non-printed second portion of a component, such as, for example, a COTS component. Alternatively, the first automated constructor may be working in concert with another automated constructor that also includes a 3-D printer and each automated constructor may contribute a 3-D printed portion of the component. As another example, the first automated constructor may 3-D print a portion of a component onto a second portion of a component that was previously 3-D printed, in whole or in part.

In an exemplary embodiment, the first automated printer may print an interconnect configured to interconnect the component to another structure, as shown in step 2014.

Thereupon, in step 2020, the component may be transferred in an automated fashion from the first automated constructor having the 3-D printer to a second automated constructor. In an exemplary embodiment, the first automated constructor uses one or more arms and/or effectors at a distal end of the arm to transfer the 3-D printed component (or portion thereof) to the second automated constructor, the latter whose function may be to move the component to a nearby location for installation and/or to free up the first automated constructor to enable it to perform other printing tasks. In another exemplary embodiment, the second automated constructor uses a robotic arm and/or effector to grasp or otherwise engage the 3-D printed component and to take it away from the first automated constructor. In other embodiments, more than one automated constructor may be used to conduct this task. During these processes, one or more of the first or second automated constructors may exchange robotic arms and/or effectors to acquire those necessary to perform the necessary manipulations with the 3-D printed component, as shown in step 2025.

Thereupon, as shown in step 2030, the second automated constructor (by itself or with the aid of other machines, robots or automated constructors) installs, in an automated fashion, the component in an appropriate location during the assembly of the transport structure. For example, the second automated constructor may use its capabilities to position the component in a transport structure for installation therein.

The above described parts production processes, and the processes described further below, may be performed distinctly in one or more robotic assembly stations. For example, disassembly may occur in a first robotic assembly station (e.g., robotic assembly station 1010a in FIG. 1), smelting of disassembled parts into ingots may occur in a second robotic assembly station, gas atomization of ingots into metal powder may occur in a third robotic assembly station, and 3-D printing may occur in a fourth robotic assembly station. Alternatively, one process (e.g., 3-D printing) may occur in more than one robotic assembly station (e.g., 3 stations). Alternatively, more than one (e.g., disassembly and smelting) process may occur in the same robotic assembly station.

A 3-D printed part may be machined in place, such as on an assembly line, simultaneously while the 3-D printed part is being printed by the one or more 3-D printers, such as a 3-D printing robot. Alternatively, the 3-D printed part may be processed post-print in a subsequent automated stage in a post-print processing system. The post-print processing system may comprise one or more computer numeric control (CNC) machines that can be configured to perform automated and repeatable surface treatment of the 3-D printed parts. For example, a CNC machine may comprise a head for shot-peening to enable automated and repeatable surface treatment. Shot-peening is a process of shaping metals or composites by bombarding them with a stream of metal shot. A 3-D printed part may be further painted, cut, and/or bent. For example, the system may comprise a painting machine to paint, a bending machine to bend, and a cutting machine (e.g., laser, water jet) to cut or trim. The post-print processing system may be configured to hold and restrain a base plate or other additional elements (e.g., attachment points) of the 3-D printed part being treated to secure the part during treatment.

In some instances, prior to undergoing an independent machining step (e.g., surface treatment), the 3-D printed part can be cleaned, such as of powder or of other unneeded materials (e.g., particles). For example, the 3-D printed part can be transferred to an automated cleaning station (e.g., in a separate robotic assembly station) to remove powder or other unneeded particles from the part. The automated cleaning station may comprise shaking systems, vacuum systems, a combination of shaking and vacuum systems, or other techniques to remove material from the printed parts. The post-print processing system may further comprise ovens for heat treatment of the 3-D printed parts. In some instances, heating and cleaning can be performed on a printed part simultaneously. The heat profiles for the heat treatment process may be determined and controlled by a control system (e.g., the main control system, ERP system, etc.) comprising information of the required treatments and finishing processes of the printed parts. Referring again to FIG. 2, once the printed parts have been processed, the printed parts can be transferred to various sub-system build lines 2400, such as a chassis build line 2300.

3-D printing technology for parts production can provide flexibility in a number of ways. For example, different parts may be printed on demand, as needed. This may beneficially reduce time to obtain the part (e.g., shipping and delivery from another source), reduce inventory space (e.g., storage of parts that can be used at a later time), and increase oversight for accuracy and precision during the printing. Furthermore, there is substantial freedom in customization of a part, restricted only by the ever-increasing limits of what a 3-D printer can print. This may beneficially accommodate the assembly or disassembly of different vehicle models without having to alter infrastructure or make other long-term changes in the facility. Moreover, the 3-D printer may be supported on a robotic device and may be movable to different assembly stations based on need. In one exemplary embodiment, the control system 1500 may generate instructions that are provided to the robotic device to autonomously move to another assembly station or other location. In other exemplary embodiments, the 3-D printer may be moved to another assembly station by, or with the aid of, one or more additional automated constructors or mobile supply vehicles.

In another aspect, the vehicle manufacturing facility 2000 may use commercial off-the-shelf (COTS) parts. COTS parts may comprise standard COTS parts, for use in assembly, and structural COTS parts, for use in building complex structures (e.g., chassis). COTS parts may be produced on-site, such as in COTS production subsystem 2800, or they may be obtained from off-site sources. For example, COTS parts requiring some form of customization may be manufactured on-site. Optionally, an existing COTS part may be customized or altered with 3-D printing technology or a standard machining technique. In some instances, a COTS part can be both a standard COTS part and a structural COTS part. Structural COTS parts can be used as received. Alternatively or in addition, structural COTS parts can be adapted or customized (e.g., via tooling) for use in complex structures. Structural COTS parts can be obtained at low cost based on high volume (e.g., bulk) of their respective production systems. With certain exceptions, structural COTS parts can require little or no tooling and can be incorporated into an assembly or complex structures with minor or no tooling amortization. For example, structural COTS parts may include honeycomb or other structural panels comprising material such as carbon fiber, fiberglass, and aluminum, which may also optionally contain foam cores. Structural COTS parts may also include tubes that can be of any cross-section, which can comprise material such as carbon fiber, aluminum, titanium, fiberglass, plastic, steel, and any combination of the above or other materials. Structural COTS parts may also include extrusions. Extrusions can require minor tooling, such as for modifying or fixing the cross-section. Extrusion dies can be saved for subsequent transport structure manufacturing. In some instances, a catalog of all tools and fixtures made or received can be stored in a parts production system database, which may in some embodiments be included in the database 1510 (FIG. 1B). A vehicle optimization system (e.g., ERP system, control system) may have access to the parts production system database to coordinate and optimize the vehicle manufacturing process. For example, the vehicle optimization system may prevent a redundant purchase or manufacture of an existing tool (e.g., extrusion die).

The COTS parts may optionally be received at a COTS parts and receiving area 2209. Once the COTS parts are received by the system at area 2200, or alternatively produced on-site at volume (e.g. at COTS production area 2800), they can be transferred to a bending area 2210 and/or a cutting area 2220. The COTS parts can be bent or cut in any order, such as is efficient and/or feasible for the desired parts design. For example, the COTS parts can be transferred first to the bending area and then transferred to the cutting area. Alternatively, the COTS parts can be transferred first to the cutting area and then transferred to the bending area. Alternatively, the COTS parts can be transferred first to the cutting area, then to the bending area, then back to the cutting area. In some instances, the cutting area and bending area can each comprise a robotic assembly station. The bending area may comprise automated bending machines configured to bend the COTS parts into desired shapes. The bending may be done on multiple axes. The cutting area may comprise laser and water-jet systems configured to trim the COTS parts. The COTS parts can be trimmed in 3 dimensions. Any location of a COTS part can be trimmed, including locations other than the ends. For example, at the cutting area, an extrusion may be shortened to the correct length, with a needed fillet at one end, and a portion of its cross section in the middle may be reduced for clearance and weight savings, in a location where shear loading is not as significant in a specific design. In some instances, trimming and/or bending may be performed on an assembly line, for example when it is necessary to complete bends or cuts in a vehicle position.

Figure 21:
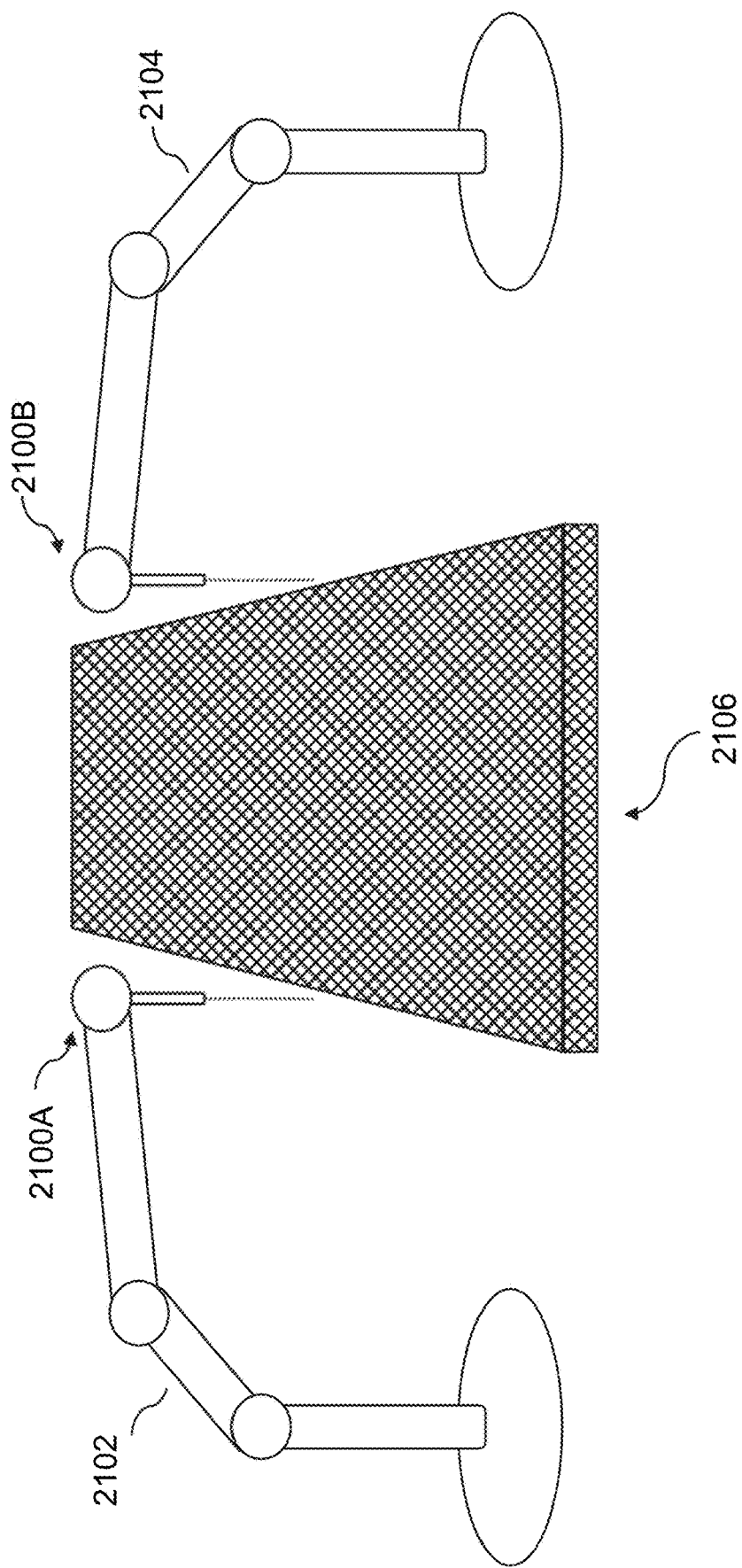
FIG. 21 shows an illustration of an exemplary automated laser cutting process.

In addition to structural COTS parts, the facility 2000 may also use standard COTS parts, which can be used as part of the final product assemblies. For example, standard COTS parts may include transmissions, steering racks, and tires. Standard COTS parts can be used as received in an assembly. For example, standard COTS parts such as tires may be purchased and installed directly on vehicle wheels without modification. Alternatively or in addition, standard COTS parts can be adapted or modified before incorporation. For example, a standard transmission COTS part that is provided to COTS parts and receiving area 2209 by a major automotive transmission tier 1 manufacturer can be moved to a laser cutting area 2220, where an existing fixturing point is cut off. FIG. 21 and then moved to a parts production area 2130, where a new fixturing point is printed thereon by a 3D printing enabled robot. Alternatively, the 3-D printing enabled robot (e.g., an automated constructor supporting a 3-D printer or otherwise having a 3-D printing function) may print on the new fixturing point on the assembly line. It may be noted that because a transmission can be a stressed member in some transport structures, the transmission can be considered both a standard COTS part and a structural COTS part. In some instances, tire tools may be printed, such as in the parts production area 2130 or COTS production area 2800, to beneficially enable high rate production of tires with low tooling cost.

Once the COTS parts have been processed (e.g., bending, cutting, printing, etc.), they can be transferred to various sub-system build lines 2400 (e.g., suspension, drivetrain, chassis, interior, etc.), including the chassis build line 2300, along with the 3-D printed parts. For example, the chassis build line may comprise three robotic assembly stations, including a first station 2310 for dry building, a second station 2320 for bonding, and a third station 2330 for component building. The chassis build line may perform functions such as inspection (e.g., scanning), adhesive injection, bolting, placing or depositing of components, 3-D printing, imaging (e.g., via cameras), and moving (e.g., via conveyers) of parts. Each of the other subsystems 2400 may comprise one or more robotic assembly stations. The final product in each of the sub-systems (e.g., vehicle suspension, drivetrain, chassis, aircraft fuselage, etc.) may be assembled during general assembly 2500.

The parts production system may further comprise additional and independent input other than the 3-D printed structural parts and the standard and structural COTS parts. For example, in a body production area 2700, the system may produce custom exterior body panels and other custom formed members. The body panels may comprise materials such as aluminum, carbon fiber, fiber-reinforced plastic, or plastic. Beneficially, the production of body panels and other custom formed members on-site at the facility 2000 can reduce tooling costs because it does not require the expensive tooling and stamping capital equipment used for traditional steel bodies.

The use of plastic, carbon, and/or aluminum bodies may allow the bodies to be wrapped, rather than painted for color, to beneficially reduce environmental pollution of the facility 2000 which can be caused by paint. The wrapping of the body panel can be performed at the end of the body panel production area.

The body production area 2700 may also produce other custom formed body parts. For example, the body production area may produce a low profile custom roof rail composed of carbon fiber to reduce mass, and shaped to conform or even interface with the exterior body of the vehicle. The custom formed body parts may be produced via a traditional layup or autoclave process. Alternatively, the custom formed body parts may be made with a tool that is 3-D printed, which can beneficially reduce capital expenditure costs. The cost associated with a tool used for making the part may not require amortization across a large volume of vehicles. For example, the low-cost 3-D printed tool may be reused if the corresponding part (e.g., custom roof rail) made using the tool is expected to be used in the future to manufacture other vehicles in the facility 2000, or be useful in other products. Alternatively, if the system (e.g., vehicle optimization system, ERP system, control system) determines that there is low probability that the tool will re-used, the tool can be recycled, such as via disassembly at area 2100 and recycling in recycling area 2110.

Once all the production inputs, such as the 3-D printed parts, standard and structural COTS parts, body parts, other tools, and/or materials, are delivered to the appropriate locations, via a transport system, on an assembly line, the vehicle assembly may begin. The assembly line may comprise a conveyer belt, gantry-type arrangement or other form, and may transport the parts from location to location up or down the line, wherein a process is performed at each location. Alternatively, the assembly line may comprise a fixed working area, wherein all processes are performed at substantially the same location. For example, as described previously above, the transport system may comprise robots or manual labor to transport the parts to the working area, and different processes may be performed by, for example, enabling robots to move relative to the working area. The assembly line may end 2900 after general assembly 2500 and body assembly 2600, 2650 are complete. The method of assembly in the assembly line is described in detail further below. While various systems and processes (e.g., disassembly, smelting, powder production, laser and water cutting, CNC bending, cleaning station, ovens, etc.) have been described with respect to the parts production system in FIG. 2, a person of ordinary skill in the art may recognize that an assembly facility for different types of transport structure, such as aircraft, boats, motorcycles, snowmobiles, mass transit transport structures and the like, may include additional or different areas, systems and subsystems as those areas described above with respect to the vehicle manufacturing facility. Furthermore, it will be appreciated that a vehicle manufacturing facility need not comprise all of the various systems and processes described above and that the various systems and processes need not be configured as illustrated in FIG. 2. Alternatively or in addition, a vehicle manufacturing facility may implement variations of the various systems and processes described. For example, the facility may comprise only a sample of the processes, such as only utilizing COTS parts and not 3-D printed parts, or vice versa. For example, as previously described, COTS parts may be trimmed before being bent, or vice versa. For example, as previously described, 3-D printed parts may be printed on the assembly line, and parts may be printed on COTS parts.

Figure 3:
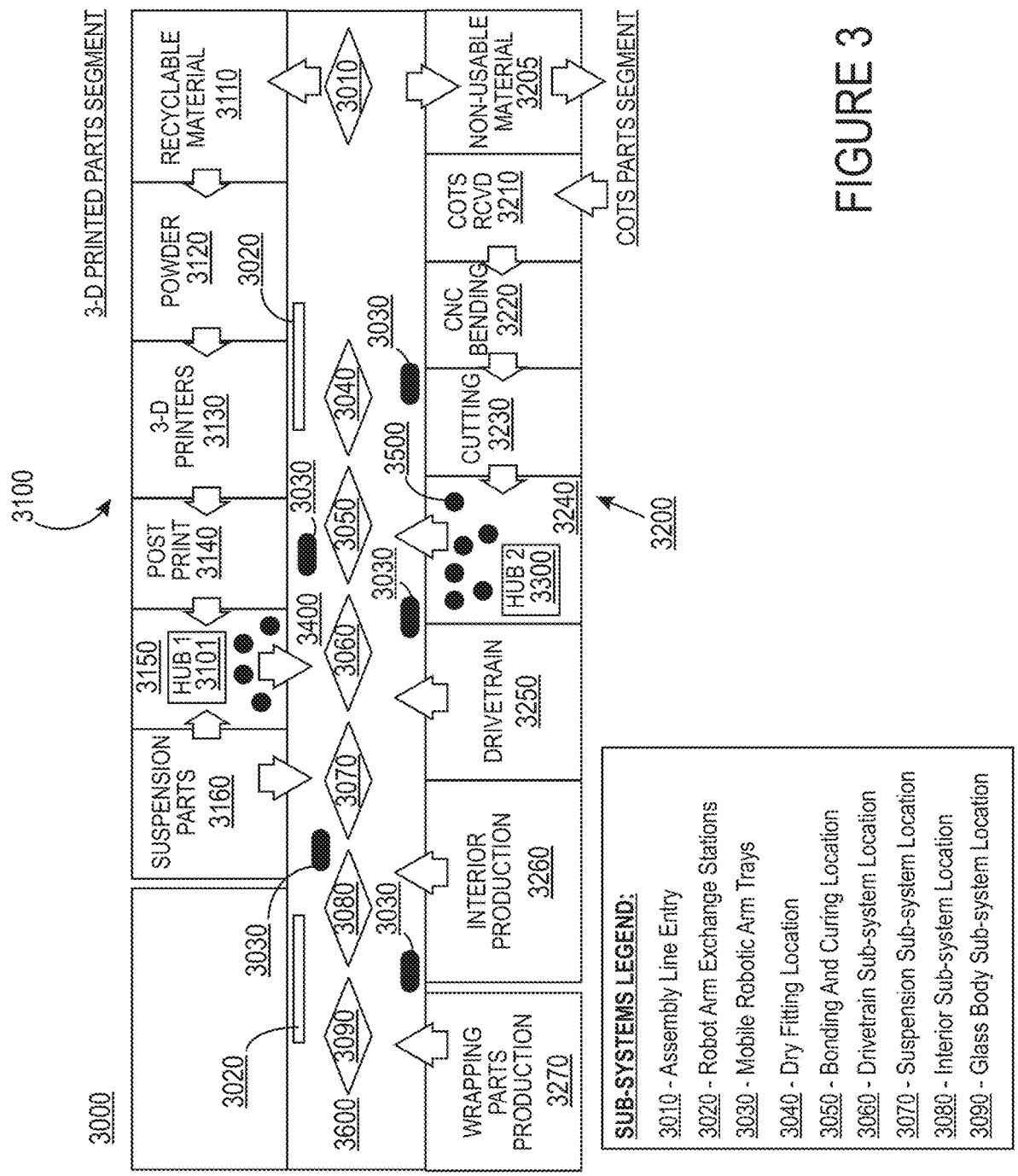
FIG. 3 shows an alternative linear configuration of the vehicle parts production system.

FIG. 3 shows an alternative exemplary configuration of the parts production system 3000. While the assembly of numerous types of transport structures may be contemplated as described above, the example in FIG. 3 is directed to a parts production system 3000 for a vehicle in order to avoid unnecessarily obscuring concepts of the disclosure. In FIG. 3, the parts production system or facility 3000 can be segmented by vehicle sub-system areas (e.g., sub-system 2400 in FIG. 2). The facility 3000 may comprise one or more parts production segments. For example, the facility may comprise a 3-D printed parts production segment 3100 and a COTS parts production segment 3200. FIG. 3 further illustrates a number of subsystems 3600 in the assembly line where different tasks common to both 3-D printed parts and COTS parts may be performed.

In an exemplary embodiment intended to increase manufacturing flexibility and efficiency, the 3-D printed parts production segment 3100 and the COTS parts production segment 3200 of FIG. 3 may operate in coordination with one another to facilitate assembly of one or more types of vehicles. This coordination may be achieved, at least in part, by means of the control system 1500 and database 1510 described with reference to FIG. 1B, as well as the automated constructors 1520*a-x* and robotic devices that may be in communication with the control system 1500 via network 1515 (FIG. 1B). These automated constructors and robotic devices may autonomously move between one or more stations or assembly stations and/or perform different tasks (in real-time or otherwise) at the direction of the control system 1510 based upon demand, availability, and other factors.

In the 3-D printed parts production segment 3100, an old vehicle or old vehicle part to be recycled 3010 can be disassembled to produce recyclable material 3110 and non-usable material 3205. The non-usable material can be discarded from the system. The recyclable material may be converted to ingots, such as via transferring the material to a smelter. The ingots can be produced from metal from any sources, including from sources other than disassembled old vehicles and old vehicle parts. Powder can be produced 3120 from the ingots, such as via gas atomization in a powder production tower. The powder may be fed to one or more 3-D printers 3130. The 3-D printed parts may go through post-print processing 3140, including processes such as surface treatment, cleaning, and/or heat treatment. The 3-D printed parts 3400 may be pooled and stored 3150 in a first parts hub location 3101. The first parts hub location 3101 may further comprise one or more robots, such as automated constructors, that are capable of transferring a vehicle part to a desired assembly line location. For example, the 3-D printed parts can be dispatched out from the first parts hub location 3101 to various locations in an assembly line via one or more automated constructors. In some instances, the parts required to build a suspension sub-system may be 3-D printed in a suspension parts production area 3160. The 3-D printed suspension parts may be transferred directly to the suspension sub-system location 3070 in the assembly line. Alternatively, the 3-D printed suspension parts may be transferred, with the other 3-D printed parts, to the first parts hub location 3101, where they can be subsequently dispatched out to the suspension sub-system location 3070 in the assembly line. Alternatively, the suspension parts may be acquired as COTS products.

In the COTS parts production segment 3200, after the COTS parts are received 3210, either from on-site production or from an off-site source, the COTS parts may undergo CNC bending 3220 and/or cutting 3230, such as via laser and water-jets. The customized (e.g., via bending and cutting) COTS parts 3500 may be pooled and stored 3240 in a second parts hub location 3300. The second parts hub location 3300 may also comprise one or more robots, such as automated constructors, that are capable of transferring a part to a desired assembly line location. The one or more robots at the first parts hub location and the one or more robots at the second parts hub location can be functionally equivalent. For example, the customized COTS parts can be dispatched out from the second parts hub location to various locations in the assembly line via one or more automated constructors.

In some instances, parts required to build a drivetrain sub-system may be produced in a drivetrain production area 3250. Alternatively, the parts required to build a drivetrain sub-system may be acquired as COTS parts. The drivetrain parts may be transferred directly to the drivetrain sub-system location 3060 in the assembly line, or alternatively through the first parts hub or the second parts hub. In some instances, parts of an interior sub-system can be produced in an interior production area 3260. Alternatively, the interior parts may be acquired as COTS parts. The interior parts may be transferred directly to the interior sub-system location 3080 in the assembly line, or alternatively through the first parts hub or the second parts hub. In some instances, body wrapping parts, such as body panels and glass, may be produced in a body wrapping parts production area 3270. Alternatively, the body wrapping parts may be acquired as COTS parts. The body wrapping parts may be transferred directly to a glass body sub-system location 3090 in the assembly line, or alternatively through the first parts hub location 3101 or the second parts hub location 3300.

Some other assembly line locations to which parts can be transported include the dry fitting location 3040 and the bonding and curing location 3050.

Different robotic assembly stations at different locations may be used for different stages of vehicle assembly and manufacture. The different stations may be located in a way to follow a logical progression. For example, a robotic assembly station performing a previous stage may be located adjacent to a robotic assembly station performing the subsequent stage. In some instances, a vehicle, or vehicle parts, can follow a route or path and the various stations may be located along or adjacent to the route or path. For example, robotic assembly stations may be located such that the parts travel along a substantially linear or circular path. In some instances, each assembly line location may comprise a robotic assembly station. Throughout various locations in the assembly line, there may be available one or more robot arm exchange stations 3020 and one or more mobile robotic arm trays 3030. In some instances, robot arm exchange stations may be stationary and the mobile robotic arm trays may be capable of travel either autonomously or with aid (e.g., pushing) of another robot capable of travel, such as an automated constructor. The robot arm exchange stations 3020 and the mobile robotic arm trays 3030 will be described in more detail further below.

Figure 4:
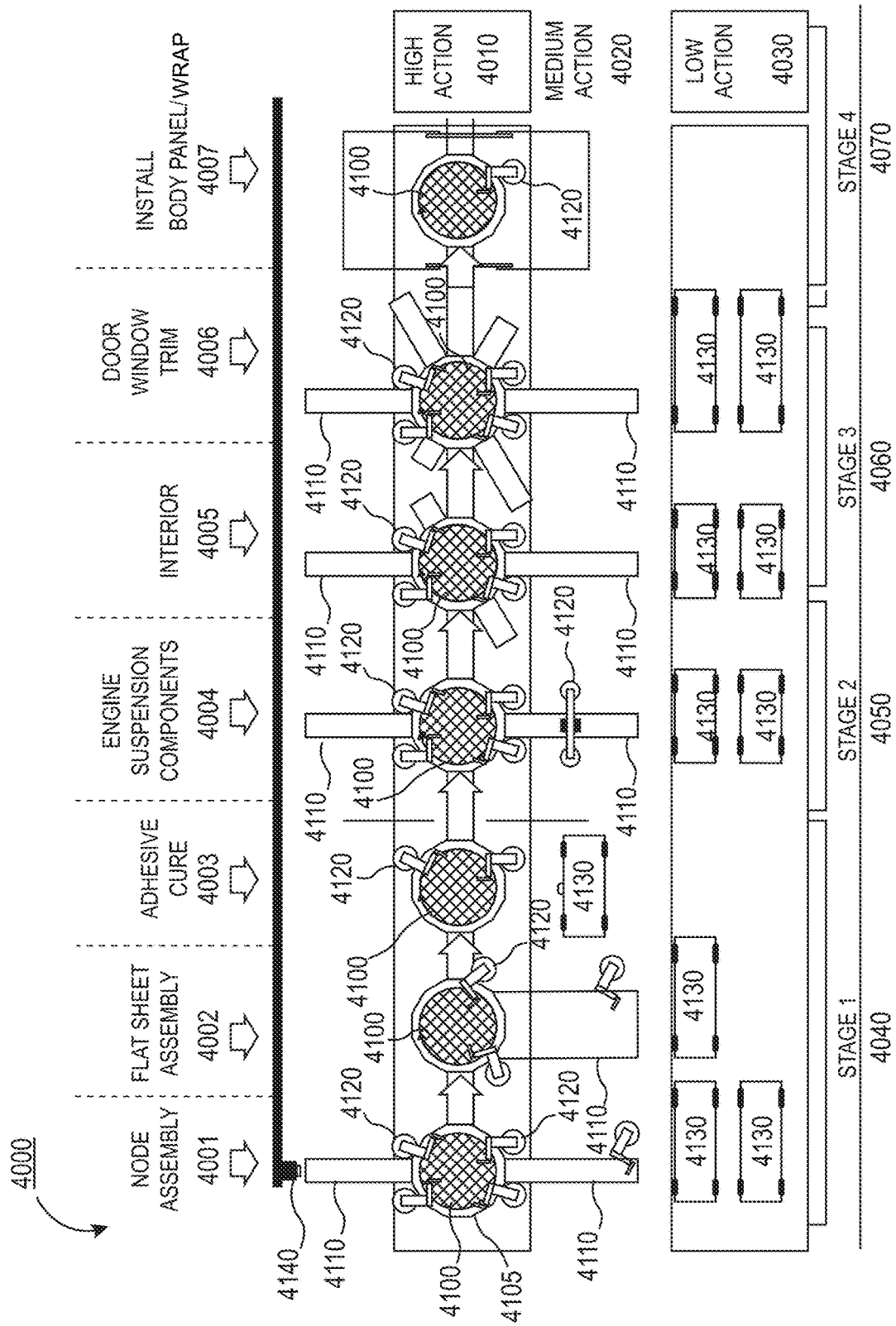
FIG. 4 shows an example of an additional assembly configuration.

FIG. 4 shows an example of an additional assembly configuration. The additional assembly configuration may optionally be used for low volume assembly. The low volume assembly configuration 4000 allows for complete assembly of a transport structure 4100, including assembly of vehicle structure, in as few as seven stations 4001-4007. Alternatively, depending on the configuration, an assembly can be completed in less than or equal to seven stations for a particular vehicle. An assembly can be completed in a greater number of stations than those previously listed. In some instances, each station can correspond to a robotic assembly station, each robotic assembly station comprising one or more automated constructors 4120 performing a set of one or more vehicle manufacturing processes associated with each robotic assembly station. For example, a first station can comprise a set of vehicle manufacturing processes for node assembly 4001, a second station can comprise a set of vehicle manufacturing processes for flat sheet assembly 4002, a third station can comprise a set of vehicle manufacturing processes for adhesive cure 4003, a fourth station can comprise a set of vehicle manufacturing processes for assembly of engine suspension components 4004, a fifth station can comprise a set of vehicle manufacturing processes for interior assembly 4005, a sixth station can comprise a set of vehicle manufacturing processes for door and window trimming 4006, and a seventh station can comprise a set of vehicle manufacturing processes for body panel installation and wrapping 4007. In other instances, each stage of manufacturing can correspond to a robotic assembly station, each stage comprising one or more substations. For example, a first robotic assembly station may comprise the substations in the first stage, including node assembly 4001, flat sheet assembly 4002, and adhesive cure 4003. A second robotic assembly station may comprise the substation in the second stage, such as the assembly of engine suspension components 4004. A third robotic assembly station may comprise the substations in the third stage, including interior assembly 4005 and door and window trimming 4006. A fourth and final assembly station may comprise the substation in the fourth stage, such as body panel installation and wrapping 4007.

Each station and/or robotic assembly station may comprise three levels of actions, including high level action 4010, medium level action 4020, and low level action 4030. In some instances, the level of an action may be determined by degree of involvement of the one or more automated constructors tasked to perform the action. Alternatively or in addition, the level of an action may be determined by its degree of difficulty. Alternatively or in addition, the level of an action may be determined by its degree of intervention (e.g., contact, manipulation, control, etc.) with the vehicle 4100 being assembled. Alternatively or in addition, the level of an action may be determined by its proximity to an autonomous assembly platform 4105. For example, the transportation of parts and tools from a mobile supply vehicle 4130 to the autonomous assembly platform 4105 via a conveyer belt 4110 can be a low level action because an automated constructor need only perform a simple task such as transporting the parts or tools between two locations and this tasked is performed at a relatively long distance (e.g., end of conveyer belt) from the autonomous assembly platform. For example, actions performed intermediately on the parts or tools on the conveyer belt can be medium level action. For example, actions performed at the autonomous assembly platform can be high level action.

Different vehicle parts or vehicle tools may be conveyed where needed, on demand. For example, the different vehicle parts and/or tools may be transported between robotic assembly stations or within robotic assembly stations or from another location to a particular robotic assembly station. The mobile supply vehicle 4130 and conveyer belt 4110 may conveniently and efficiently make available parts and/or tools required in the robotic assembly station to the one or more automated constructors associated with the robotic assembly station. For instance, a mobile supply vehicle may approach an automated constructor to directly provide a part to an automated constructor. An automated constructor may alternatively approach the mobile supply vehicle to directly receive a part from the mobile supply vehicle. A mobile supply vehicle may also provide a part via an intermediate conveyer belt. Such a conveyer belt may transfer a part from one location to another location without aid of any mobile supply vehicles. A conveyer belt may minimize or reduce the need for travel of an automated constructor to fetch the parts. The autonomous assembly platform 4105 may be any platform that is capable of supporting one or more vehicle manufacturing processes. For example, the platform 4105 can be configured to support the size and weight of a vehicle or other transport structure being assembled on the platform. The platform 4105 can comprise any shape (e.g., substantially circular, angular, polygonal, free-form, etc.) and any suitable area. In some instances, the autonomous assembly platform 4105 may simply comprise an area of the ground-level ground (e.g., floor) of the facility 4000. In other instances, the autonomous assembly platform 4105 may be raised above ground-level. The platform 4105 may be capable of moving up and down. The platform 4105 may or may not be capable of moving laterally or rotating. The autonomous assembly platform 4105 may be substantially parallel to the ground. The autonomous assembly platform 4105 may be configured to rotate clockwise or counterclockwise to allow one or more automated constructors access to different parts of a vehicle 4100 on the platform without the one or more automated constructors themselves having to move across inconvenient paths (e.g., over, under, or through a conveyer belt) to access the different parts of the vehicle. The automated constructors may be capable of traversing the ground to move around the platform 4105.

The assembly line may be monitored, such as via one or more quality control sensors 4140. The one or more quality control sensors 4140 may be fixed at a location, with some freedom of movement (e.g., rotation, panning, tilting, etc.) or no freedom of movement throughout the facility 4000. Alternatively or in addition, the one or more quality control sensors 4140 may be included on one or more robots, such as automated constructors. The quality control sensors 4140 may, in substantially real-time, provide quality control and feedback to one or more transport structure manufacturing processes, such as by comparing the assembled product to requirements in a desired design. The quality control sensors 4140 may be communicatively coupled to the control system 1500 (FIG. 1B) to transmit sensing data to the control system, wherein the control system may, in response to the sensing data, provide instructions to one or more robots, such as automated constructors, of the system to continue, stop, or change one or more actions they are performing. The sensors 4140 can include cameras, infrared sensors, other visual detectors (e.g., scanners, etc.), audio sensors (e.g., microphone), heat sensors, thermal sensors, motion detectors, and/or other sensors. The sensors can detect visual and non-visual properties of a part, robot, tool, or any individuals within an assembly station. The sensors, with aid of one or more processors, may capture one or more images, capture videos, track location, status, and orientation of parts, and/or spot errors. Data obtained from the sensors may be stored in memory and/or analyzed with aid of one or more processors. In addition, data gathered by the sensors and the one or more processors may be conveyed to a remote user.

Figure 5:
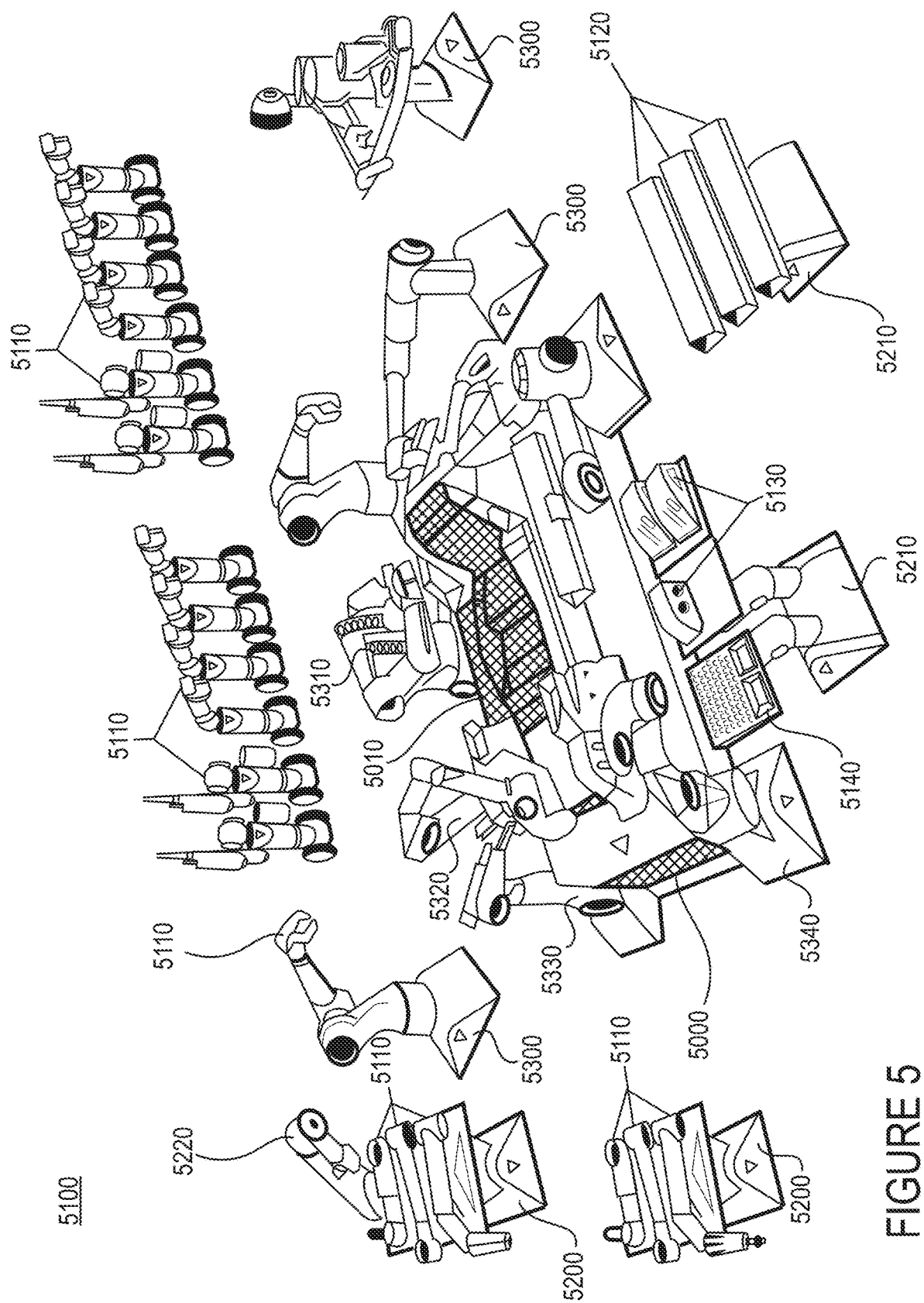
FIG. 5 shows a schematic illustration of an additive manufacturing assembly system.

FIG. 5 shows a schematic illustration of an additive manufacturing assembly system. The additive manufacturing assembly system may comprise nodal structures, including connectors (e.g., nodes) and interconnecting materials that can be connected to each other via the connectors. The interconnecting materials may comprise various standardized structural materials, such as honeycomb panels, tubes, and extrusions. The connectors may be 3-D printed, such as in the parts production area 2130 in FIG. 2. Alternatively, the connectors may be acquired as COTS parts, and modified or used as is, depending on the implementation. The interconnecting structural materials may be 3-D printed, such as in the parts production area 2130 in FIG. 2. Alternatively, the interconnecting structural materials may be acquired as COTS parts. In some instances, the connectors and/or the interconnecting material may partially comprise COTS parts and partially 3-D printed material, such as when some portion of the connectors and/or the interconnecting material is 3-D printed onto a COTS part. Alternatively, non-printed structural material may be manufactured within the facility.

Various connecting techniques, including the use of fasteners (e.g., screws) and adhesives (e.g., glues), can be used to assemble an interconnecting material with another interconnecting material via a connector. For example, a first tube and a second tube may each be fastened via a fastener to a node, thereby being joined by the node. In another example, a first tube and a second tube may each be fastened to a node via injecting adhesives between the joints of the first tube and the node and between the joints of the second tube and the node, thereby being joined by the node. The connecting methods may temporarily or permanently connect an interconnecting material to a node. The availability of 3-D printing can add substantial flexibility to the available connecting methods. For example, fasteners, fixturing features (e.g., holes of a certain diameter) for fixturing the fasteners, and/or channels for the introduction of adhesives can be custom-designed and 3-D printed. In some instances, the fasteners, features for fixturing the fasteners, and/or channels for the introduction of adhesives can be 3-D printed onto a connector or interconnecting material. Flexible fixturing features can include screws, friction, key-based interlocks that can enable a robotic assembly station to quickly and adaptively fixture the parts, and the like.

In an exemplary embodiment, the additive manufacturing system 5100 may implement a robotic assembly system. A robotic assembly system may increase rate production of complex transport structures. As described previously above (such as with respect to FIGS. 1A and 1B), a transport manufacturing facility may comprise a plurality of robotic assembly stations and a plurality of robots, such as automated constructors and mobile supply vehicles, associated with each assembly station. The plurality of robots can be configured within robotic assembly station arrangements to collaboratively assemble and verify quality control of transport structures passing through the assembly station. A robotic assembly station can comprise various specific features and/or sensors configured to enable rapid assembly of the vehicle or other transport structure parts, including the 3-D printed parts, COTS parts, and/or non-printed facility manufactured parts.

The robotic assembly system may be flexible in many aspects. For example, the robotic assembly stations can be configured to be able to adjust and assemble new and/or different structures without the need for significant adjustments to fixturing or reprogramming of the robotic assembly system or components thereof (e.g., robots). For example, the designated locations and/or designated areas of the robotic assembly stations may be modified in real-time. In some exemplary embodiments involving the assembly of vehicles such as automobiles, the plurality of robots can each be capable of performing different vehicle manufacturing processes, such that an existing robot can be instructed to perform a different vehicle manufacturing process without having to substitute the robot for a different robot in order to perform the different vehicle manufacturing process.

A robotic assembly station may be non-design specific. As described previously, different vehicle models may share one or more robotic assembly stations at the same time or at different times. A robotic assembly station may, for example, assemble structures to be used for various different brands of vehicles, various different models of vehicles, various different categories of vehicles (e.g., trucks, trailers, buses, four-wheel automobiles, etc.), and/or various different categories of transport structures (e.g., boats, aircraft, motorcycles, etc.). For example, the various different brands, models, and/or categories of vehicles may be presented in arbitrary order to a robotic assembly station, and the robotic assembly station may continue to perform the set of one or more vehicle manufacturing processes associated with the robotic assembly station. Similarly, a robot may be non-design specific. The same robot may perform the same vehicle manufacturing process (e.g., welding) for various different brands, models, and/or categories of vehicles. In some instances, different robots may share the same tools for various different brands, models, and/or categories.

The robotic assembly system may comprise additive manufacturing processes. The additive manufacturing processes may be vertically integrated, such as by incorporating printing machines (e.g., 3-D printing robot) as well as assembly machines (e.g., various automated constructors) in a robotic assembly station. Non-printed structural material may also be manufactured within the plant, for example, in small or large volume. For instance, carbon fiber may be weaved into specific shapes by one or more automated constructors (e.g., carbon fiber weaving robots). The carbon fiber material may be shaped to desired 3-D designs, such as by varying the length of individual strands of the carbon fiber. In some instances, the non-printed structural material may be produced as demanded. This may beneficially reduce inventories for discrete parts. The inventories may comprise bulk raw material stock for on-demand production of the non-printed structural material.

In a robotic assembly station, a plurality of robots may be utilized to assemble parts of a vehicle 5010. For example, some robots, such as mobile support vehicles, can be configured to gather 3-D printed parts from printers, collect standard and structural COTS materials, such as carbon fiber tubes, extrusions and structured panels, and collect arms of a robot from a robot arm exchanging center 5100 for transport. Mobile support vehicles can include mobile support vehicles 5210 to carry one or more vehicle components and mobile support vehicles 5200 to carry one or more robot arms. For example, a mobile support vehicle 5210 may carry a tray of fasteners 5140, a tray of nodes 5130, and/or a tray of COTS extrusions 5120. The same mobile support vehicle may carry more than one type of vehicle components. Alternatively, different mobile support vehicles may carry different types of vehicle components. In some instances, a mobile support vehicle may be specific to one or more types of vehicle components or tools.

A mobile support vehicle may travel autonomously in whole or in part, such as via preprogrammed instructions and/or instructions from a control system (such as the control system 1500 in FIG. 1B or control system 6000 in FIG. 6 to be discussed further below). In some instances, the mobile support vehicle may comprise one or more sensors (e.g., cameras, geo-location device such as a GPS, etc.) communicating with the control system, such that the control system may track the location of the mobile supply vehicle. In an exemplary embodiment, the control system may use the tracked location to form and transmit instructions. The mobile supply vehicle may roll, rotate, walk, slide, float, fly and/or perform a combination of the above, to travel from one location to another location. The mobile support vehicle may move freely within a parameter or a set of parameters, along a surface, and/or along a track (etc. laterally, vertically, etc.). In some instances, a mobile support vehicle may be configured to travel such that a base is moving relative to an underlying surface (e.g., ground, rope, side of a wall, side of a column, etc.). For example, the mobile support vehicle may comprise a moving component and a non-moving component. The moving component, such as wheels, belts, limbs, wings, or other parts (e.g., cogs, etc.) may move relative to the non-moving component to move the non-moving component relative to the underlying surface.

In an exemplary embodiment, some robots, such as automated constructors, can be configured to assemble parts, fixture parts, and apply fasteners and adhesives to the vehicle parts. An automated constructor may be fixed in location with limited freedom of movement (e.g., rotation, rotation of limb if one exists, etc.). Alternatively or in addition, an automated constructor may travel autonomously or semi-autonomously, such as via preprogrammed instructions and/or instructions from a control system (such as the control system 1500 in FIG. 1B or control system 6000 in FIG. 6) as described previously above. The automated constructor may freely traverse over an underlying surface. The automated constructor may be free to move in any lateral direction that is free of obstacles or obstructions. The automated constructor may comprise one or more processors on-board the automated constructor that may generate commands to control movement of the constructor. The commands may be generated in response to and/or based on data collected by one or more sensors on-board the automated constructor.

In exemplary embodiments, the automated constructor may comprise one or more sensors (e.g., cameras, geo-location device such as a GPS) communicating with the control system, such that the control system may track the location of the automated constructor. In some instances, the control system may use the tracked location to form and transmit instructions. The automated constructor may roll, rotate, walk, slide, float, fly and/or a combination of the above to travel from one location to another location. For example, the automated constructor may comprise one or more wheels that may roll to propel the automated constructor. The automated constructor may move freely within a parameter, along a surface, and/or along a track (etc. laterally, vertically, etc.). In some instances, an automated constructor may be configured to travel such that a base is moving relative to an underlying surface (e.g., ground). For example, the automated constructor may comprise at least a moving component and a non-moving component. The moving component, such as wheels, belts, limbs, wings, or other parts (e.g., cogs, etc.) may move relative to the non-moving component to move the non-moving component relative to the underlying surface.

Automated constructors can include robots such as a bonding robot 5330 for bonding, a fixture robot 5320 to deal with fixtures, a 3-D printing robot 5310 for printing 3-D parts or for supporting a separate 3-D printer, a bolting robot 5340 for bolting, an arm-replacing robot 5220 for replacing arms of other robots, an extrusion robot 5300 to deal with extrusions, such as for creating extrusions and/or installing extrusions, a press-fitting robot (not shown in FIG. 5), and a welding robot (not shown in FIG. 5) for welding. A 3-D printing robot may comprise a robot equipped with a 3-D printer. The 3-D printing robot may travel autonomously or semi-autonomously like other automated constructors. The mobile 3-D printing robot may, on demand, travel to an assembly line or other working area (e.g., platform) and print directly on a vehicle, vehicle part, and/or vehicle assembly.

Various other robots can perform mechanical processes such as, cutting (e.g., via water-jets, laser cutters), bending (e.g., CNC machine bending), and milling (e.g., of panels to accept inserts and allow conformity to specific shapes). Alternatively, mobile support vehicle robots may transport the parts requiring the mechanical processes to other machines.

An automated constructor may be configured to perform a vehicle manufacturing process, with or without aid of one or more tools. For example, a 3-D printing robot may be configured to perform a 3-D printing process with aid of a 3-D printer. The one or more tools (e.g., 3-D printer) may be a permanent or detachable part of the automated constructor. In some instances, an automated constructor may comprise one or more robotic arms 5110. The one or more robotic arms may be permanently attached or be detachable from the automated constructor. In one example, the arm may have a tool that may be affixed to the arm, and the arm may be swapped out to exchange tools as needed. In another example, the arm may remain affixed to the automated constructor but a tool, such as an end effector, may be swapped out from the arm. A robotic arm may comprise an interchangeable end effector that is capable of performing a variety of tasks (e.g., chassis assembly, battery assembly, body panel assembly, painting, human heavy lifting assistance, application of fasteners, application of adhesives, application of paints, fixturing of components for curing, etc.). In some instances, the end effector may be interchangeable. Alternatively or in addition, a robotic arm comprising the end effector may be interchangeable. In some instances, the one or more tools may be made available at various stationary locations. For example, one or more arms comprising interchangeable end effectors may be made available at various fixed arm exchange areas 5100 where robots may visit to exchange arms. Alternatively, the tools, such as the one or more arms comprising the interchangeable end effectors, may be made available on mobile support vehicles 5200 that are configured to transport the one or more arms to various locations accessible by other robots. In some instances, a mobile support vehicle carrying the one or more arms may deliver an arm to a specific robot. The robot arms available may be non-design specific. For example, different robots may use the same arm at different points in time to perform a vehicle manufacturing process on different models and/or categories of vehicles. In some instances, a robotic arm may be compatible with any automated constructor, such that any automated constructor may use the robotic arm. In other instances, a robotic arm may be compatible with only a certain type of automated constructors, such that only the certain type of automated constructors may use the robotic arm.

In an example, a robotic assembly station can, through use of one or more automated constructors comprising one or more robotic arms, simultaneously coordinate the insertion of multiple tubes into a node from various angles, introduce bolted secondary features, and then inject an adhesive via 3-D printed channels. Fixture robots can then apply external fixtures to provide the proper location during cure.

Figure 6:
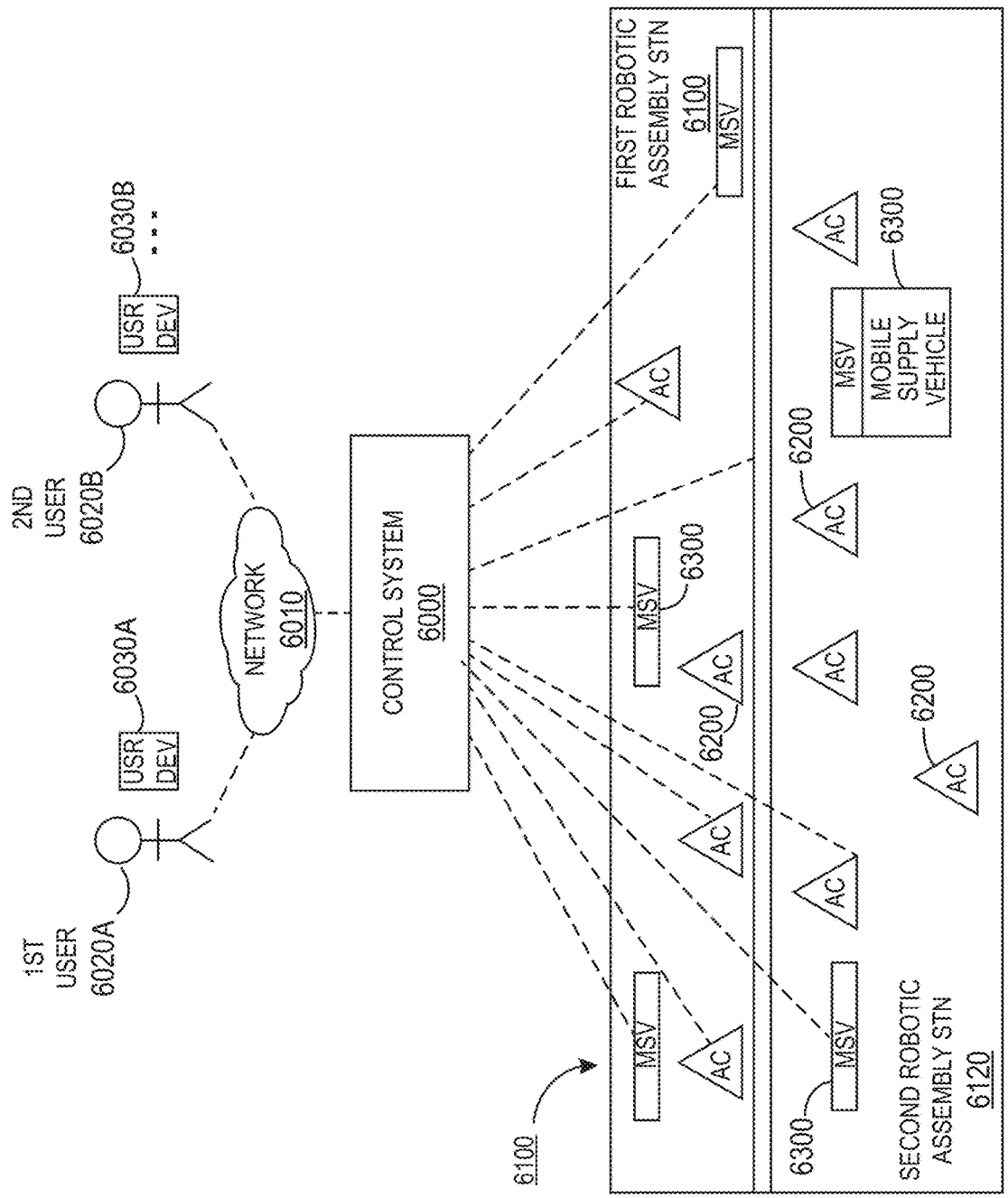
FIG. 6 shows a schematic diagram of an assembly system control system.

FIG. 6 shows a schematic diagram of an assembly system control system 6000. In some instances, the assembly system control system 6000 and workings of the assembly system control system may correspond to the control system 1500 in FIG. 1B and workings of the control system 1500 in FIG. 1B. The control system 6000 may comprise known computing components, such as one or more processors, one or more memory devices storing software instructions executed by the processor(s), and data. The one or more processors can be a single microprocessor or multiple microprocessors, field programmable gate arrays (FPGAs), or digital signal processors (DSPs) capable of executing particular sets of instructions, or some combination of these components. Computer-readable instructions can be stored on a tangible non-transitory computer-readable medium, such as a flexible disk, a hard disk, a CD-ROM (compact disk-read only memory), an MO (magneto-optical), a DVD-ROM (digital versatile disk-read only memory), a DVD RAM (digital versatile disk-random access memory), or a semiconductor memory. In some exemplary embodiments, the control system may use cloud storage any future storage technologies that, for example, may be pivotal to the Internet of Things (IoT). Alternatively, the methods disclosed herein can be implemented in hardware components or combinations of hardware and software such as, for example, ASICs (application specific integrated circuits), special purpose computers, or general purpose computers.

The network 6010 may be configured to connect and/or provide communication between various components (e.g., one or more automated constructors 6200, one or more mobile supply vehicles 6300, etc.) and the control system 6000. For example, the network may be implemented as the Internet, intranet, extranet, a wireless network, a wired network, a local area network (LAN), a Wide Area Network (WANs), Bluetooth, Near Field Communication (NFC), any other type of network that provides communications between one or more components of the network layout in FIG. 6, or any combination of the above listed networks. In some embodiments, the network may be implemented using cell and/or pager networks, satellite, licensed radio, or a combination of licensed and unlicensed radio. The network may be wireless, wired (e.g., Ethernet), or a combination thereof.

The control system 6000 may be implemented as one or more computers storing instructions that, when executed by one or more processors, can generate and transmit instructions to one or more automated constructors 6200, one or more mobile supply vehicles 6300, other robots, and/or machines in the assembly system. The control system can further receive data and/or instruction requests from the one or more automated constructors, mobile supply vehicles, other robots, and/or machines in the assembly system. While FIG. 6 illustrates a single control system 6000, in some embodiments, a vehicle manufacturing facility may comprise one or more control systems, wherein each control system operates substantially parallel to and/or in conjunction with the control system 6000, such as through the network 6010. Alternatively or in addition, control system 6000 may be distributed throughout different locations within the facility. For example, the vehicle manufacturing facility may comprise a main control system and an ERP system, wherein the ERP system is embedded as part of the main control system. In some instances, a single computer may implement the one or more control systems. Alternatively, the one or more control system may be implemented on separate computers. In certain configurations, one or more control systems may be a software stored in memory accessible by other control systems (e.g., in a memory local to the other control systems or remote memory accessible over a communication link, such as the network). In some configurations, for example, one control system may be a computer hardware, and another control system (e.g., ERP system directing the 3-D printers) may be software that can be executed by another control system.

The one or more control systems 6000 can be used to control various components of the vehicle manufacturing facility in a variety of different ways, such as by storing and/or executing software that performs one or more algorithms to achieve control. Although a plurality of control systems have been described for performing the one or more algorithms, it should be noted that some or all of the algorithms may be performed using a single control system, consistent with disclosed embodiments.

In some instances, the one or more control systems may be connected or interconnected to one or more databases, such as the database 1510 in FIG. 1B. The one or more databases may be one or more memory devices configured to store data (e.g., sensor data, parts manufacturing data, inventory data, etc.). The one or more databases may also, in some exemplary embodiments, be implemented as a computer system with a storage device. In one aspect, the one or more databases may be used by the control system 6000 to perform one or more operations consistent with the disclosed embodiments. In certain exemplary embodiments, the one or more databases may be co-located with the control system, and/or co-located with other components (e.g., automated constructors 6200) on a network, which may or may not be the network 6010. For example, an automated constructor 6200 may transmit sensor data to the one or more databases without going through the control system. It will be appreciated that one or more other configurations and/or arrangements of the one or more databases are also possible.

The control system 6000 may communicate with multiple users, such as through the network 6010. For example, one or more users, such as a first user 6020a and a second user 6020b may communicate with the control system. The users (e.g., administrator of the vehicle manufacturing facility, plant manager, etc.) may participate in the system such as to monitor the vehicle manufacturing process (e.g., robot activity, production efficiency, quality control, etc.) and/or give instructions to various components (e.g., robots, machines, etc.) of the vehicle manufacturing facility. Communications may be one-way, for example from a user to the control system (e.g., command, instruction, etc.) or from the control system to a user (e.g., alerts, notifications, commands, instructions, etc.). Alternatively, communications may be two-way between a user and a control system. In some instances, a user may communicate with other users of the system. The user may be associated with the facility, and can include individuals or entities such as an administrator of the facility, employee of the facility, designer of a vehicle model or other transport structure being manufactured by the facility, and customers or potential customers of the facility. The instructions provided by a user to the command system may be real-time instructions (e.g., following the manufacture of a vehicle) or periodic instructions at regular or irregular intervals (e.g., initiation of an assembly or design, periodic check-up at key stages, etc.). In some instances, the instructions may be at a high level, such as to command the start or stop of an assembly or otherwise initiate a pre-existing protocol, wherein the control system may then perform the user command autonomously or semi-autonomously. In some instances, the instructions may be more detailed, such as controlling individual paths of a robot, controlling travel paths of a vehicle part, and controlling schedules.

A user may communicate with the system with the aid of a user device 6030a, 6030b which may comprise an interface. For example, a first user may communicate with the system with the aid of a first user device comprising an interface, a second user may communicate with the system with the aid of a second user device comprising an interface, an $n^{th}$ user may communicate with the system with the aid of an $n^{th}$ user device comprising an interface, and so on.

The user device 6030a, 6030b may be a mobile device (e.g., smartphone, tablet, pager, personal digital assistant (PDA)), a computer (e.g., laptop computer, desktop computer, server), or a wearable device (e.g., smartwatches). A user device can also include any other media content player, for example, a set-top box, a television set, a video game system, or any electronic device capable of providing or rendering data. The user device may optionally be portable. The user device may be handheld. The user device may be a network device capable of connecting to a network, such as a local area network (LAN), wide area network (WAN) such as the Internet, a telecommunications network, a data network, or any other type of network.

The user device may comprise memory storage units which may comprise non-transitory computer readable medium comprising code, logic, or instructions for performing one or more steps. The user device may comprise one or more processors capable of executing one or more steps, for instance in accordance with the non-transitory computer readable media. The user device may be, for example, one or more computing devices configured to perform one or more operations consistent with the disclosed embodiments. The user device may comprise a display showing a graphical user interface. The user device may be capable of accepting inputs via a user interactive device. Examples of such user interactive devices may include a keyboard, button, mouse, touchscreen, touchpad, joystick, trackball, camera, microphone, motion sensor, heat sensor, inertial sensor, or any other type of user interactive device. The user device may be capable of executing software or applications provided by one or more authentication systems. For example, a user (e.g., facility administrator, plant manager, etc.) may input instructions through the user device to the control system for forwarding to one or more robots or machines. In another example, a user may reprogram the control system, such as for re-optimization of the vehicle manufacturing process or for a software update. In another example, a user may have an option to transmit an emergency stop command, such as for safety considerations, that can stop operation of all robots and/or machines operating in the vehicle manufacturing facility.

The control system 6000 may be configured to generate instructions for one or more automated constructors 6200 and/or one or more mobile supply vehicles 6300 to travel to or from each assembly station. For example, the control system may instruct the one or more automated constructors to autonomously travel to or from each assembly station. Alternatively or in addition, the control system may provide more detailed (e.g., step-by-step) instructions to the one or more automated constructors to travel to or from each assembly station. In some instances, the control system may change the designated location and/or designated area of a robotic assembly station 6100, 6120, such as by instructing the travel of one or more automated constructors associated with the robotic assembly station. Alternatively or in addition, a robot may have pre-programmed instructions that the control system may or may not override. In this aspect, the robotic assembly stations may be flexible and modular, and the manufacturing facility may be readily reconfigured by changing the respective locations and/or areas of each robotic assembly station within the limits of the facility location and/or facility area. In some instances, the control system may provide instructions to a component (e.g., mobile supply vehicle 6300) in coordination with other components in the same robotic assembly station. For example, the control system 6000 may give instructions to all robots associated with a first robotic assembly station 6100 to stop any and all operations and travel to the second robotic assembly station 6120.

In an exemplary embodiment, the control system 6000 may generate instructions in real-time. Real-time can include a response time of less than 1 second, tenths of a second, hundredths of a second, or a millisecond. Depending on the implementation, each of the one or more robots 6200, 6300, such as those described above or further below, may be capable of responding to instructions from the control system in real-time. For example, through the movement of the one or more automated constructors, the robotic assembly stations may be reconfigured and scaled in location and/or area in real-time.

The control system 6000 may be further configured to generate instructions for the one or more automated constructors 6200 to perform one or more manufacturing processes for vehicles or other transport structures, or one or more sets of one or more manufacturing processes. The control system may give detailed instructions to the one or more automated constructors as to performing a manufacturing process. For example, the control system (such as through an ERP system) may give specific dimensions of a vehicle part to a 3-D printing automated constructor to print.

In another example, a robot may freely move to and from and within a robotic assembly station, within the limitations of instructions pre-programmed in the robot and/or instructions received from a control system (such as the control system 1500 in FIG. 1B and/or control system 6000 of FIG. 6) and/or instructions learned by the robot via machine-learning. The robot may be capable of receiving and post-processing 3-D printed parts, and delivering the 3-D printed parts to a robotic assembly station for incorporation into a complex structure (e.g., chassis). Different robotic assembly stations may be placed next to or around one or more assembly lines, such as for efficiency, that can enable materials to pass through the different robotic assembly stations as the processes are conducted.

Figure 7:
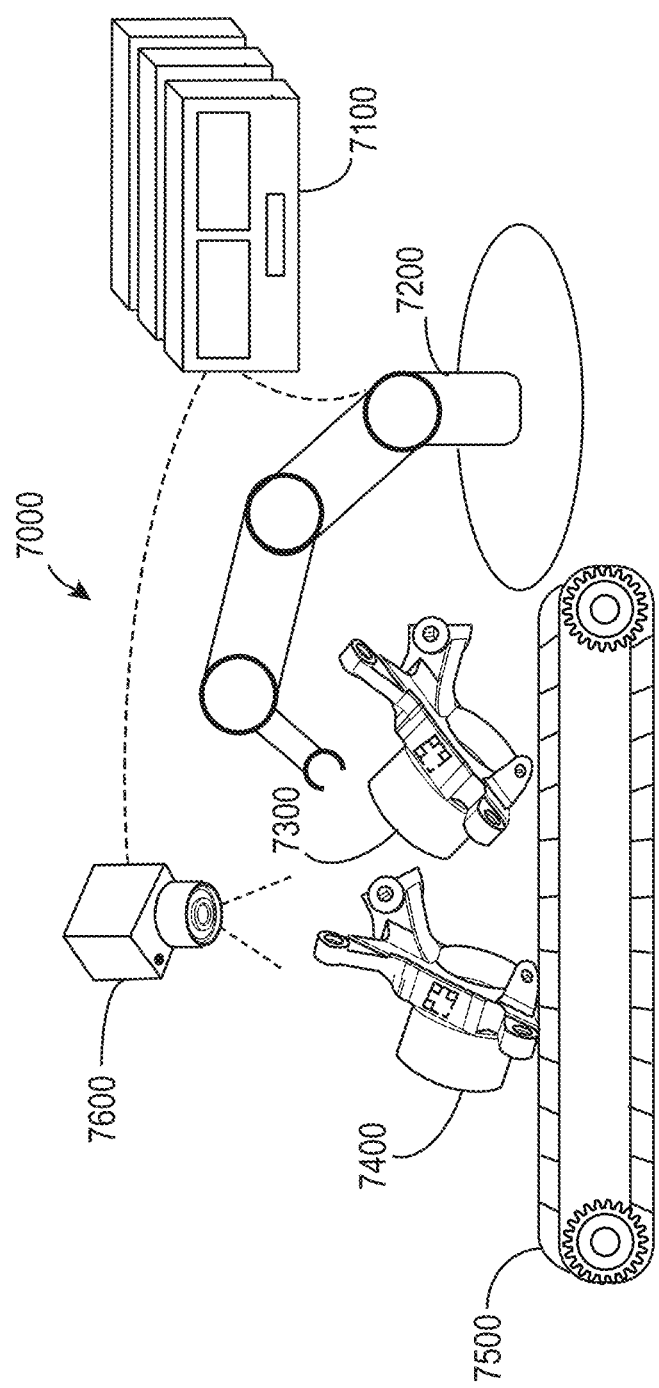
FIG. 7 shows an example of a robotic automation system.

FIG. 7 shows an example of a robotic automation system. The robotic automation system 7000 may comprise one or more automated constructors 7200, a conveyer belt 7500 to transport one or more transport structure parts 7300, 7400, a sensor 7600, and one or more process tools 7100. Alternatively, the system may comprise transport systems alternative to the conveyer belt, such as other moving platforms, mobile robots and/or manual labor. The robotic automation system may support various processes performed in a manufacturing facility, such as manufacturing, testing, inventory, pre-use, recycling, or disposal processing. The process performed by the robotic automation system may be constructive, conservational, or deconstructive as is appropriate for the phase of the life cycle of the parts of the transport structure being processed.

The one or more automated constructors 7200 and/or the one or more process tools 7100 may be mobile, such that they can travel to very large, permanently-installed, or stored parts. Alternatively or in addition, the conveyer belt 7500 may convey the one or more automated constructors and/or the one or more process tools towards the one or more parts 7300, 7400. Alternatively or in addition, the one or more parts may be conveyed towards the one or more automated constructors and/or the one or more process tools. Whether the automated constructors and process tools are moved and/or whether the vehicle parts are moved may be a consideration of economic and mechanical efficiency. For example, it may be more economical and mechanically efficient to move the smaller and/or lighter of the two towards the larger and/or heavier of the two. In some instances, if the one or more vehicle parts to be processed is part of a larger part that is inconvenient to move (e.g., via assembly, installation), the one or more vehicle parts may be first disengaged and disassembled from its installation by one or more disassembling automated constructors. Once the one or more automated constructors and the one or more vehicle parts are brought within reach of the other, the one or more automated constructors may carry out an instructed process. In one example, the automated constructor optionally comprises an additive manufacturing or 3-D printing machine to construct a replacement for a worn or damaged vehicle part. The one or more automated constructors may exchange a robotic effector through the available process tools. Alternatively, the one or more automated constructors may exchange robot arms having different effectors.

The sensor 7600 may be communicatively coupled to a control system that is, in turn, communicatively coupled to the one or more automated constructors. Alternatively, the sensor may be in direct communication with the one or more automated constructors and/or the one or more process tools. In some instances, the sensor may be an imaging device, such as a camera. In some instances, the sensor may be a heat sensor, motion sensor, audio sensor (e.g., microphone), etc. The sensor may monitor (e.g., quality control checks, etc.) the transport structure manufacturing process. For example, the sensor 7600 may determine the phase of the life cycle that the one or more vehicle parts are in and send such data to the control system, which can subsequently instruct the one or more automated constructors to perform the process appropriate for the specific life cycle. The sensor 7600 may also detect wear and tear or damage of the one or more parts such as to instruct, through the control system, the one or more automated constructors to engage in additive manufacturing or 3-D printing to construct a replacement for the worn or damaged part. In an example, the sensor may be used to inspect clamps or seals along a pipeline to remove worn parts and manufacture and install new parts where the worn parts were removed.

Figure 8:
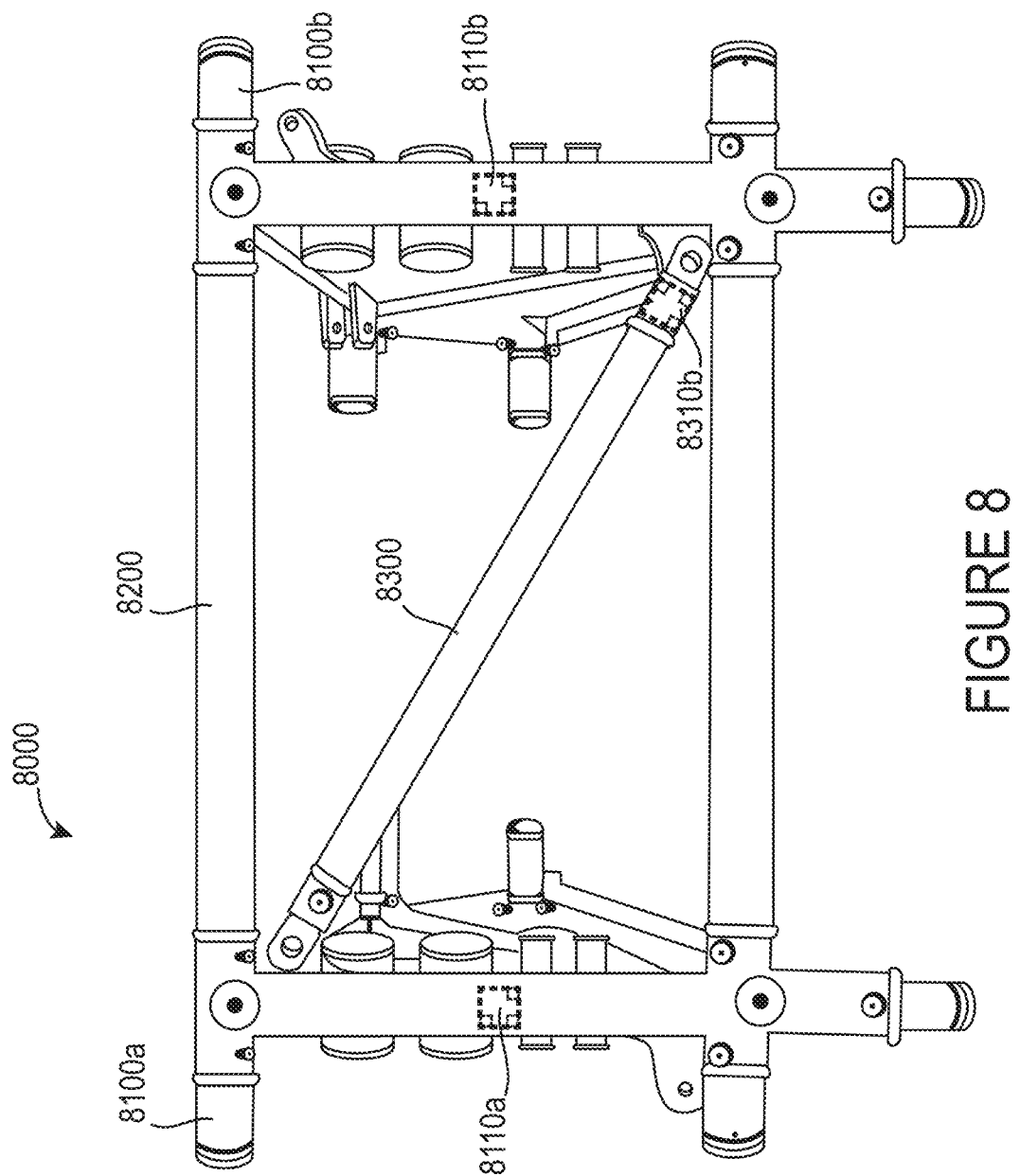
FIG. 8 shows an example of a structured subassembly.

FIG. 8 shows an example of a structured subassembly. In an exemplary embodiment, a robotic assembly station may be used to assemble structures composed of pre-fabricated components, such as nodes 8100a, 8100b, arcs, and tubes 8200. In some instances, such an assembly can require the coordinated (e.g., simultaneous, specifically timed, etc.) insertion of multiple components into other components (e.g., nodes, arcs, tubes, etc.). Such coordinated insertion can prevent geometric binding of the structure. In some instances, a subassembly structure 8300 may be incorporated into a larger assembly 8200.

In an exemplary embodiment, each part, assembly, and/or subassembly structure may comprise one or more labels. A label may comprise an identification matrix, such as the matrices 8110a, 8110b, and 8310b. Labels may be used to detect and identify parts, determine location, position, and/or orientation of a part, detect error, and/or track and monitor a part throughout the manufacturing process and/or throughout a life cycle of the part. For example, labels may be used to verify the correct orientation and position of the part, assembly, and/or subassembly structure relative to another. The labels may be detected by one or more sensors (e.g., cameras) which may be located on the assembly line and/or on the automated constructors. After verification via the labels, the parts, assembly, and/or subassembly structures may be assembled, such as via a single-motion press-into-place action, where coordinated forces are applied from several directions. The coordinated forces may be programmed or instructed (e.g., in real-time) to be simultaneous or specifically timed. The single-motion press-into-place action or other inserting actions may be performed by one or more robots in the robotic assembly station, such as one or more automated constructors.

Figure 9:
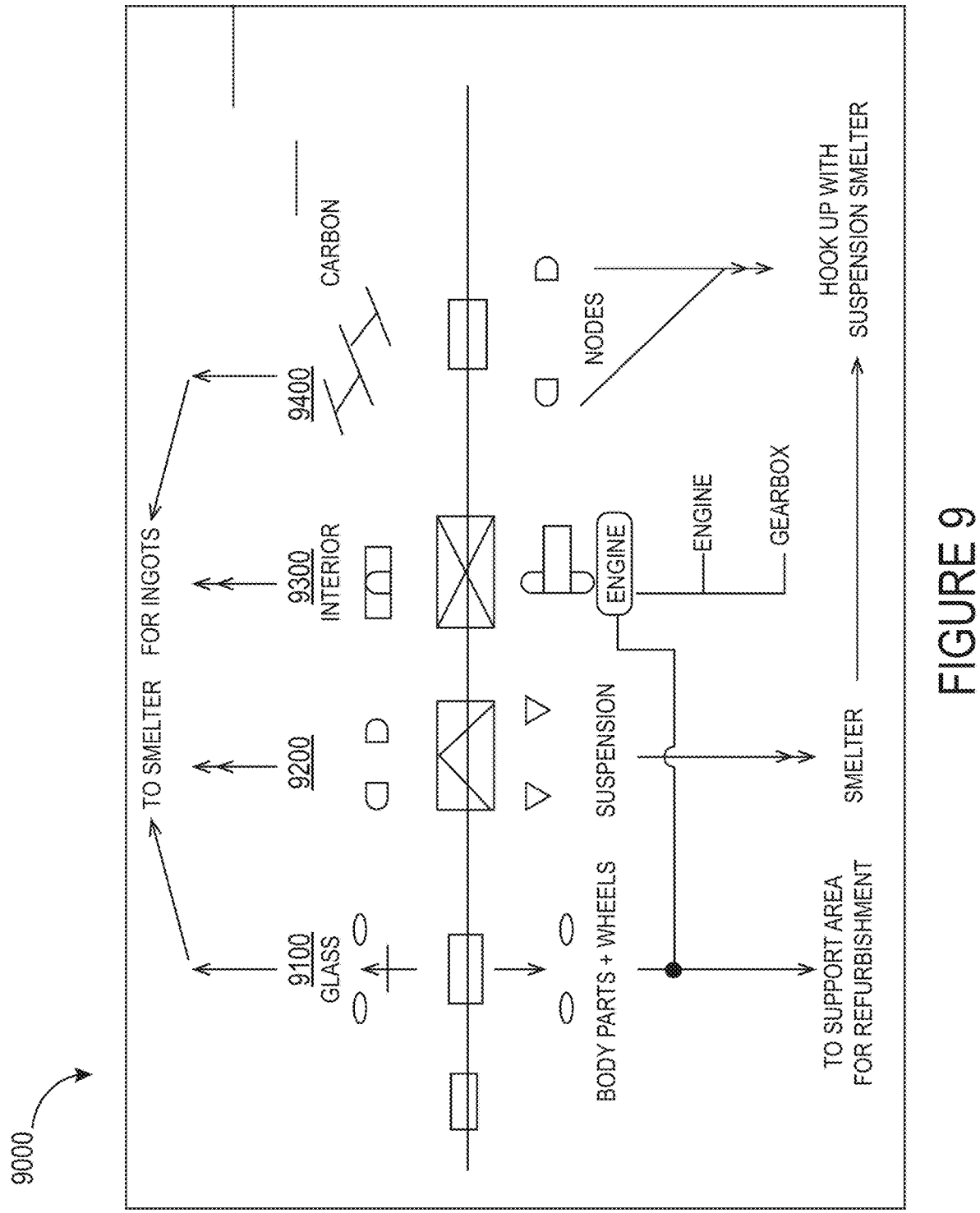
FIG. 9 shows an example of a disassembly area.

FIG. 9 shows an example of a disassembly area. The disassembly area may, for a large part, perform the processes of an assembly line in reverse to achieve flexible disassembling. An old transport structure, or transport structure part may be disassembled, such as via one or more automated constructors configured to disassemble. The disassembled components may be recycled, refurbished, or discarded based on their respective condition. The condition of a disassembled component can be inspected, for example by a sensor, such as the sensor 7600 in FIG. 7. Alternatively, one or more sensors may be located on a robot, such as the disassembling automated constructor, to inspect the disassembled components. The condition of the disassembled parts may be embedded on the disassembled parts in some embodiments, such as via an identification matrix (such as the matrices 8110a, 8110b, 8310b in FIG. 8) identifying the phase of the life cycle of the disassembled parts. The control system may give instructions, or one or more robots may be pre-programmed, to determine whether a part is to be recycled, refurbished, or discarded. For example, glass from a glass body 9100, select suspension parts from a suspension sub-system 9200, select interior parts from an interior sub-system 9300, and carbon material from other sub-systems 9400 may be determined to be recyclable and transmitted to a smelter to convert to ingots. Other components such as select body parts, wheels, tires, and engines can be determined to be capable of being refurbished and transported to a storage area. In some instances, nodes disassembled from one or more sub-systems may be determined to be recyclable and be transported to the smelter. In some instances, nodes may be hooked up to suspension parts before being transported to the smelter.

In some instances, the additive manufacturing system of FIG. 5 may further comprise a plurality of sensors. The plurality of sensors may ensure proper assembly and quality control of complex structural systems being assembled in robotic assembly stations. One or more sensors may be mounted in the robotic assembly stations. Alternatively or in addition, the one or more sensors may be positioned on one or more robots, such as automated constructors, associated with the robotic assembly station. Alternatively or in addition, the one or more sensors may be integrated into a structural product being produced by the system. The one or more integrated sensors may provide critical feedback during the assembly process, and continued information about the product over the life cycle of the product. The one or more sensors may be positioned to support proper locating and tolerance stack-ups. The one or more sensors may further detect proper or improper performance of specifications of a product.

In some instances, 3-D printed parts and/or structures can be configured to accept and/or incorporate one or more sensors. The incorporated one or more sensors may travel with the 3-D printed parts and structures, and/or the final product. By tracking the printed parts and structures, and/or the final product through the incorporated one or more sensors, the control system may monitor product quality. In an example, a stress sensor may track and monitor the tortional performance of a vehicle that has integrated the stress sensor in a specific driving condition. For example, the expected stress can be measured at the time of production, and then can be correlated to the empirical stress value measured at a later time when the vehicle performs a similar operation. Such monitoring may provide early warning of potential failure and product liability injuries, and subsequently provide feedback to the manufacturing facility to increase component strength in a potential risk area. In other examples, the system may obtain frequency response measurement and/or acoustic measurement from integrated sensors to perform similar analyses.

Figure 10:
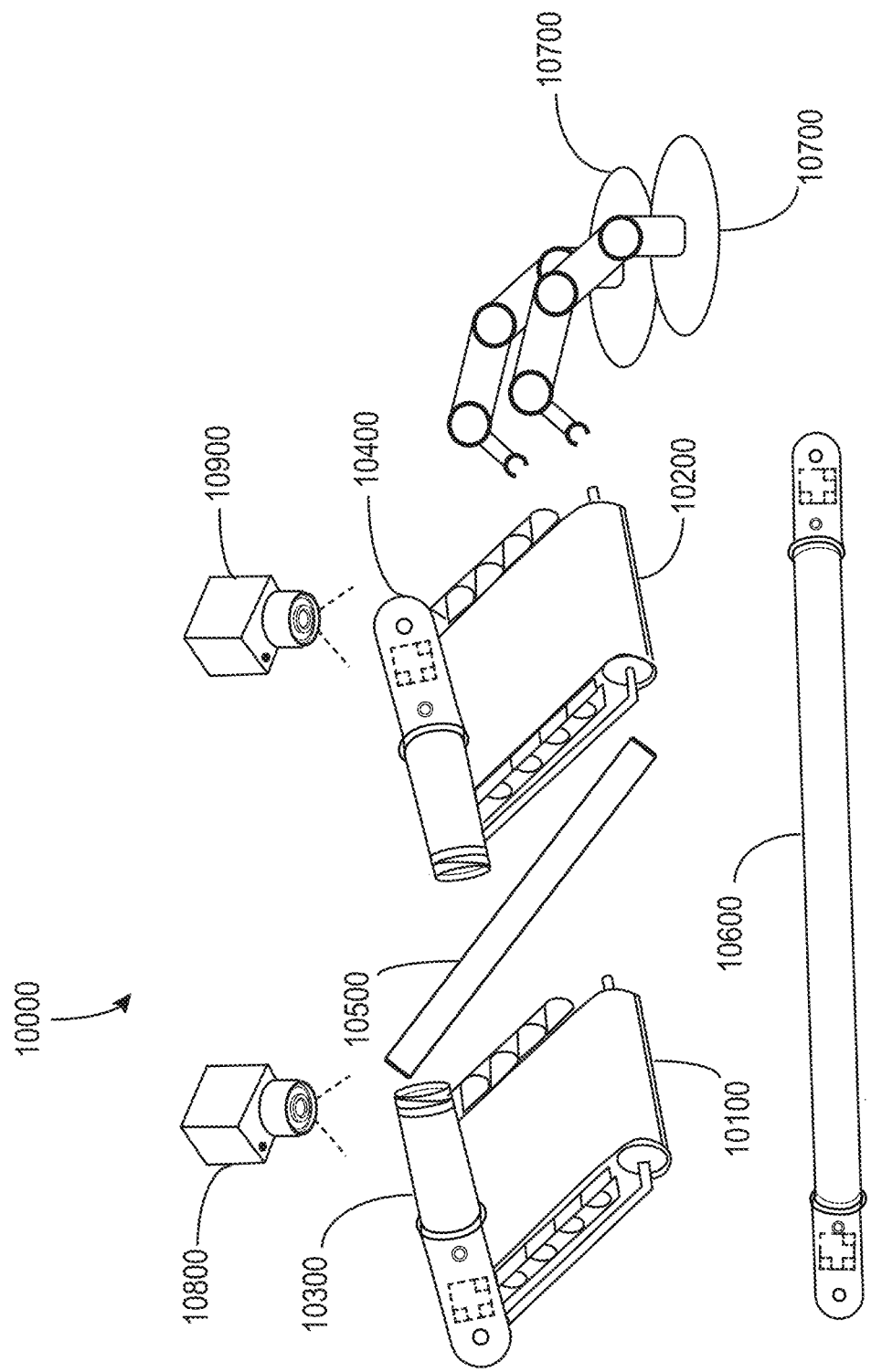
FIG. 10 shows an example of a sensor-integrated robotic automation system.

FIG. 10 shows an example of a sensor-integrated robotic automation system. The system 10000 may comprise a first conveyer belt 10100 transporting a first part 10300, the first part monitored by a first sensor 10800, and a second conveyer belt 10200 transporting a second part 10400, the second part monitored by a second sensor 10900, a subassembly structure 10600, a third part 10500, and one or more automated constructors 10700. For example, the first and second sensors may comprise overhead 3-D sensors (e.g., Kinect or LIDAR) that are capable of tracking the positions of both the arms of the one or more automated constructors and one or more individuals (e.g., human operators) present in the assembly station. The sensors may be configured to project potential movement paths and preemptively prevent human-to-robot collisions. Alternatively or in addition, operators of the assembly station may manually limit the robots' range of motion and/or range of speed, such as via giving instructions through the control system, when the one or more individuals are determined to be in a near vicinity of the one or more automated constructors. Beneficially, this system may protect human safety and maximize productive throughput when humans are safely absent from the station. In some instances, the sensors may track individuals wearing headsets overlaid with augmented or virtual reality. In some instances, virtual or augmented reality overlays of assembly sequences and component placements can be provided to an individual through the headset, wherein the overlays are aligned with current configurations of the assembly sequences and component placements in the assembly station to aid the individual in assembly participation and/or to train the individual.

In some instances, the first and second sensors may comprise video cameras and data loggers, which are capable of capturing, documenting, storing, transmitting, and/or sharing images or sequences of images of an assembly sequence with the control system, such as to the one or more databases 1510 in FIG. 1B. Alternatively, the images or sequences of images may be captured, documented, stored, transmitted and/or shared directly with other control systems, such as with control systems of other manufacturing facilities. In some instances, a database can be created documenting a full manufacturing process. The database of the full manufacturing process may enable the performance of a complete financial, efficiency, and/or environmental analysis of the end-to-end manufacturing process.

In some instances, the robotic automatic system may support motorized interaction between an individual (e.g., a factory worker, etc.) and the vehicle, product, and/or structure being assembled. For example, the system may comprise automatic and/or semi-automatic mechanisms and equipment, such as robotic and exo-skeleton-like lifting and grasping devices for material handling.

In other exemplary embodiments, one or more robots, such as automated constructors, may include a machine-based learning algorithm (or suite of algorithms) for dynamically learning tasks on the fly. In these embodiments, such robots may learn tasks, or details about tasks, such as spot-welding based on observation via the robots' sensors and/or direct experience. For instance, if an error occurs during the course of a particular task being executed by the automated constructor, the automated constructor's machine-based learning capabilities may enable it to identify the cause of the error as well as possible or likely resolutions. In another exemplary embodiment, the machine-based learning algorithms are embedded within the robots themselves and coordinated in real-time (or near real-time), periodically, or otherwise by instructions from the control system that may govern machine learning algorithms such as settings, activation, etc.

In an exemplary embodiment, an automated constructor uses machine-based learning to avoid collisions. In a manufacturing facility where a number of robots may be moving to and from various destinations, and where humans may be interspersed among the robots, it may be important to put additional safeguards in place to prevent or at least minimize accidental damage to equipment or to avoid injury. One such safeguard may include the use of machine-based learning to enable the robots, such as the automated constructors, to monitor the movements of other machines, to learn the types and patterns of such movements, and to monitor other parameters relevant to movement such as the speed, acceleration, rotating capability of other machines, etc. Monitoring of movement patterns by a self-learning algorithm can enable the machine to continuously improve its ability to safely navigate the facility via this recognition of patterns of other machines and the recording of data and other parameters related to speed and movement.

Accordingly, in some instances, the one or more robots may be capable of machine-based learning. Machine-based learning may enable a robot to behave autonomously in part or in whole. For example, a robot may, from past actions, be able to determine and perform future actions. Machine-based learning may enable a robot to automatically (e.g., independently and without preprogrammed instructions) or semi-automatically (e.g., with minimal instructions such as assigning a robot to an assembly station) assemble certain parts (e.g., tubes, nodes, etc.) into their desired locations with the correct supporting materials (e.g., structural panels, adhesives, other nodes, other components or structures, etc.) to deliver finished products. In another example, machine-based learning may enable a robot to autonomously travel to, or even determine, target destinations. The machine-based learning may be individual to a robot, such as an automated constructor or a mobile supply device. Alternatively or in addition, the machine-based learning may occur at an assembly station level such that the learning is distributed to all robots associated with the assembly station. Alternatively or in addition, the machine-based learning may be at the control system level such that the learning is distributed to all components connected to the control system. For example, machine-based learning at the control system level may improve the control system's ability to, without user instruction or with minimal user instruction, coordinate the different components of the vehicle manufacturing facility.

Figure 19A:
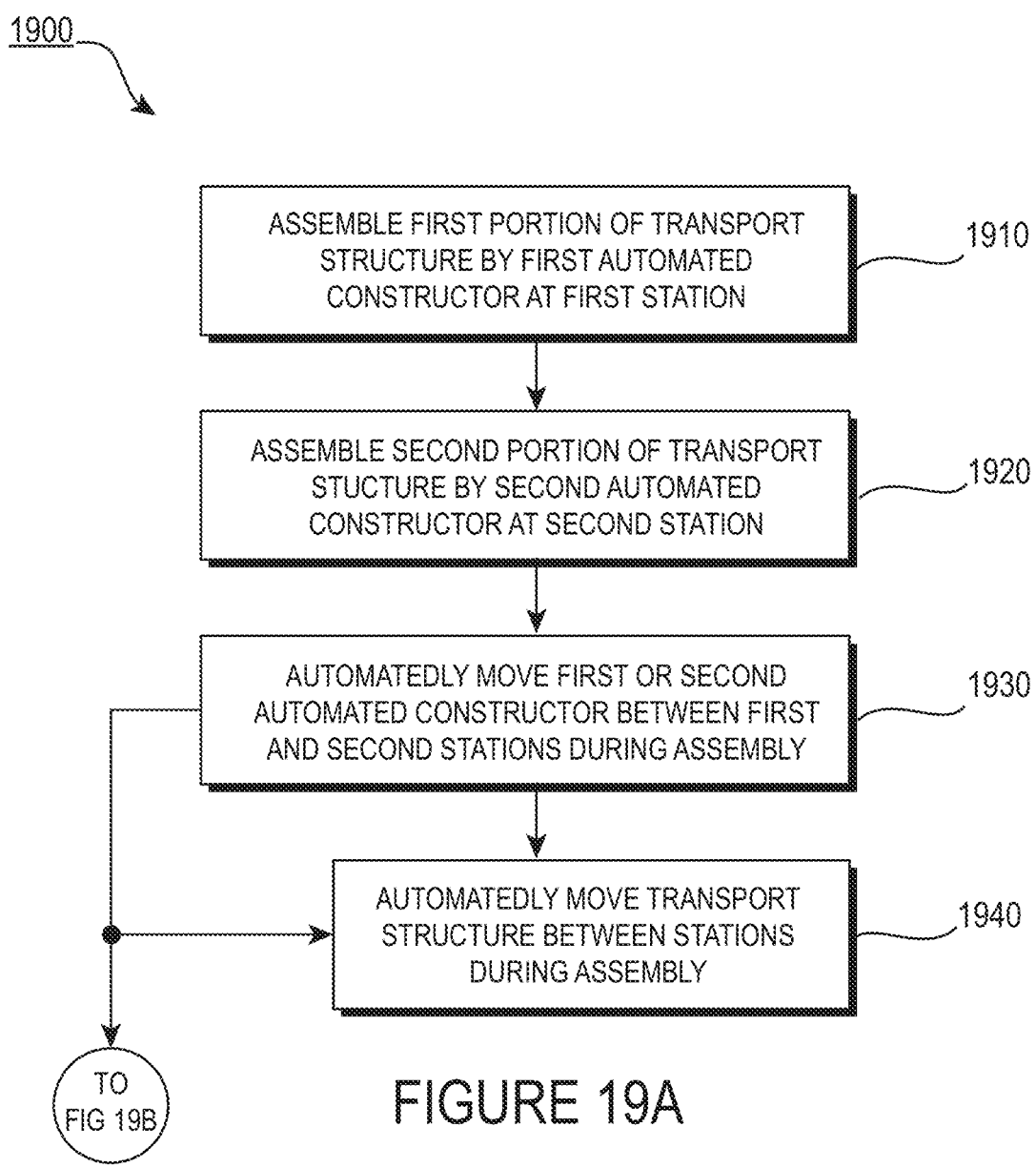
FIG. 19A shows a first portion of a flow diagram of an exemplary method for automated assembly of a transport structure by automated constructors.
Figure 19B:
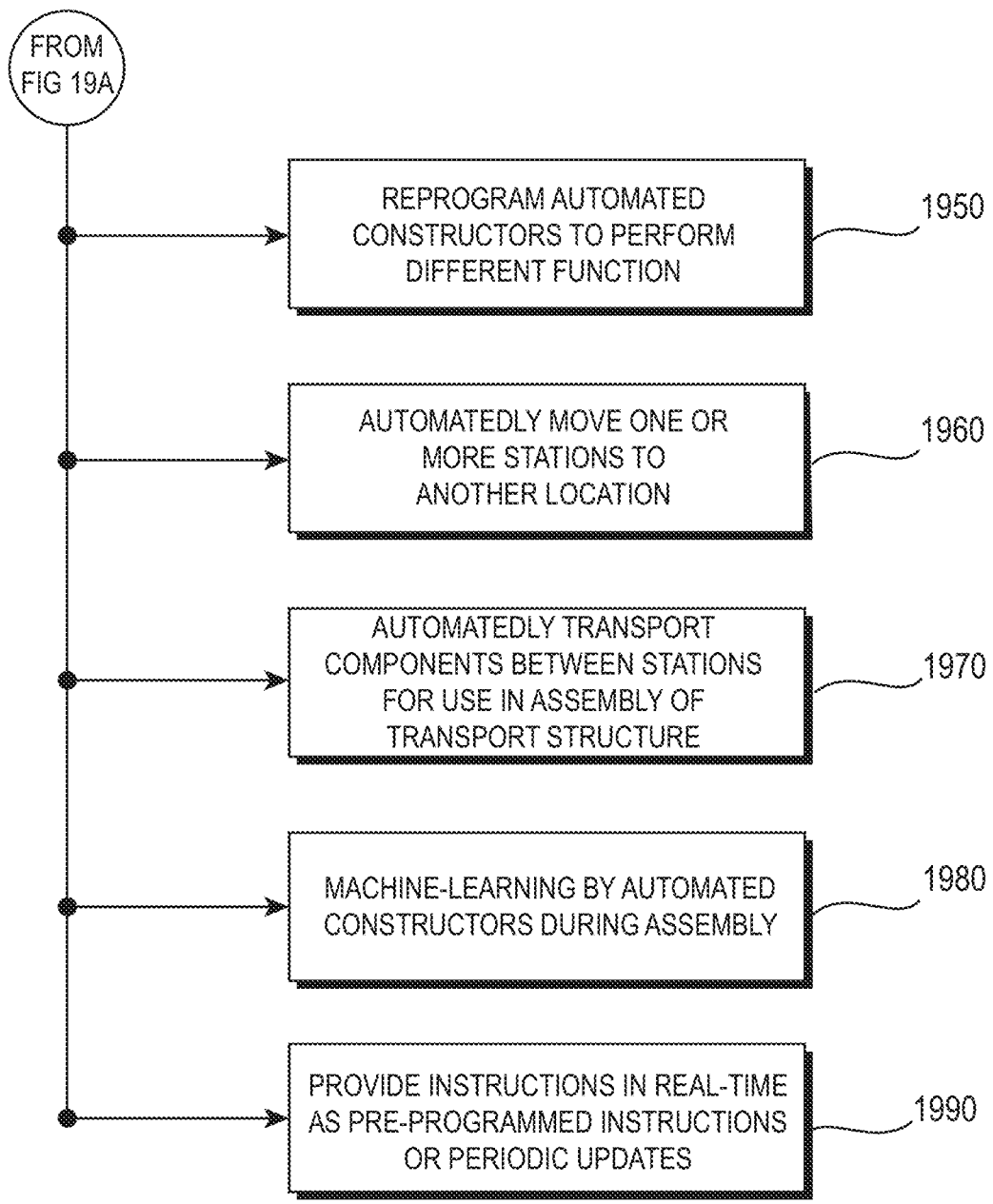
FIG. 19B shows a second portion of a flow diagram of an exemplary method for automated assembly of a transport structure by automated constructors.

FIG. 19A-B shows a flow diagram of a method for automated assembly of a transport structure according to an exemplary embodiment. Referring initially to FIG. 19A, at step 1910, a first portion of a transport structure is assembled by a first automated constructor at a first robotic assembly station. While a "first" portion of the transport structure, a "first" automated constructor, and a "first" station are described for purposes of this illustration, it will be appreciated that more than one portion of the transport structure, more than one automated constructor, and/or more than one station may alternatively or additionally be used. At step 1920, a second portion of the transport structure is assembled by a second automated constructor at a second robotic assembly station.

Concurrently with or subsequent to the above steps, a number of flexible and configurable operations may take place, e.g., to maximize build time, efficiency, to reconfigure the assembly system, or for other reasons discussed in this disclosure. For example, at step 1930, the first or second automated constructors may move in an automated fashion between the first and second stations during assembly. As another illustration, in step 1940, the transport structure itself or parts thereof may move in an automated fashion, e.g., via a conveyor belt, between robotic assembly stations as it is assembled.

Referring to FIG. 19B, in step 1950, the first or second automated constructors may be reprogrammed to perform different functions. Like the above steps, this process may occur before, during, or after assembly and may also occur between assembly of different models of transport structures or types of transport structures altogether. In step 1960, one or more of the robotic assembly stations may be moved to another location, whether in real-time or as an artifact of a pre-programmed set of instructions. For example, in step 1970 components or parts used in connection with or as part of the assembly of a transport structure may be transported in an automated fashion between robotic assembly stations for use in the assembly of the transport structure at those stations.

In step 1980, as discussed further above, the automated transport structures may learn new tasks and modify their actions as a result of machine-based learning techniques. As disclosed herein and in step 1990, any of these steps may involve the control system providing instructions directly or indirectly to one or more of the automated constructors, where the instructions may be transmitted in real-time, part of a pre-programmed instruction set, or as updates provided on a periodic basis.

In another exemplary embodiment, the system may be open to customer participation in the build process. Customers, such as companies, small teams, and/or individuals, may use a web-based design and optimization solution to design with large degree of flexibility the required structures of a desired transport structure, and produce and assemble said design using the tools and bounds available to the facility via the variable robotic assembly stations, the variable automated constructors, and 3-D printing technology.

For example, an assembly station can be programmed and configured to use an abstract and/or high level language that is accessible to non-programmers and nontechnical individuals. Such accessibility can allow end customers, including companies, small teams, and individuals, to instruct the one or more robotic assembly stations to assemble their own customized transport structures, at any volume, without aid of a technician or other specialist. For example, the end customers may be allowed to, and be able to, instruct and guide robotic motions and sequences to produce and assemble their own customized vehicles. For example, the end customers may communicate with the control system 6000 as a user 6020a, 6020b through a network 6010. Alternatively or in addition, the end customers may communicate with the control system via a cloud or a server (such as the control server 1505 of FIG. 1B). The end customers may, for example, use a user device (e.g., such as the user device 6030a, 6030b) comprising a user interface to provide user input (e.g., instructions) to guide the robotic motions and sequences to produce and/or assemble a vehicle or other structures.

In some instances, the end customers may provide the user input via a web interface or virtual reality interface provided by the control server. In an example, a sensor-integrated robotic automation system may track and record an individual's movements, motions, and/or direction of gaze, such as via a virtual reality headset of the individual, and provide such data to an end customer through the end customer's virtual reality headset, which the end customer may use as the choice of user device. The end customer may experience a virtual or augmented reality during the end customer's purchase and/or assembly experience. In the case that end customers participate in their own build, they may meet some homologation requirements related to participation in the build event.

In some instances, the manufacturing facility may be configured to be capable of intelligent video conferencing or other messaging. For example, the facility may be equipped with an integrated, intelligent video conferencing and/or messaging system to enable rapid electronic communication across the facility or outside the facility via voice or other commands. The intelligent video conferencing and/or other messaging system may enable the end customers to communicate with employees (e.g., operators, workers, etc.) of the facility in real-time during the build of the customer's vehicle, and allow for remove supervision and in-process intervention during the build process, if so desired by the end customer.

In some instances, the sensor-integrated robotic automation system may capture photos and/or videos of a specific customer's vehicle through its manufacturing and assembly process. The system may further collect test results and inspection measurements at each critical step of the manufacturing and assembly process. A full database and history of a manufacturing and assembly process for a specific vehicle could be generated for all vehicles manufactured by the facility. The database may be provided to the customer. Alternatively or in addition, the information in the database may be analyzed, such as for research and development.

At lower volume production facilities, or in operations where an artistic touch or some level of improvisation is desired (e.g., painting, design), a remote customer or operator may access the manufacturing and assembly process through a web interface or a virtual reality interface through the internet, such as by the method previously described, to provide instructions (e.g., guide robotic motions, etc.) to assist in the assembly process of a structure.

In some instances, the manufacturing facility may further comprise an additive manufactured parts identification system. The identification system may enable, with accuracy, the repeated assembly of complex structures. Accurate identification of parts, and information associated with the parts, may have beneficial applications in various operations, such as safety, manufacturing, assembly, distribution, logistics, fraud validation, sales, maintenance repair, storage, handling, recycling, and disposal.

Figure 11:
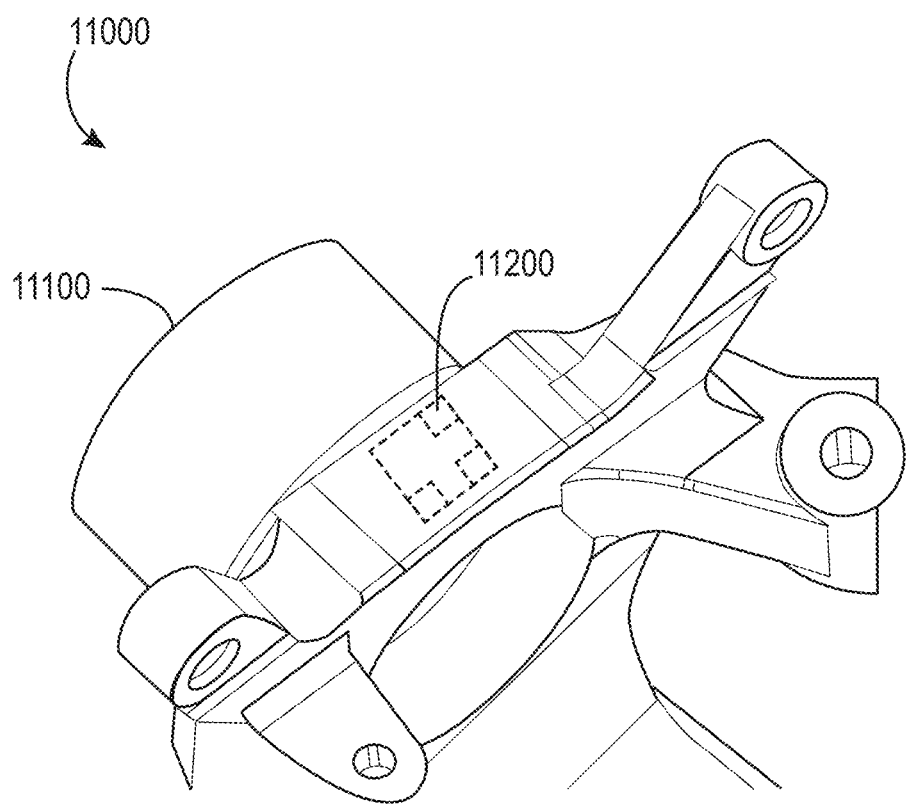
FIG. 11 shows an example of a part with an integrated label.

The identification system may comprise labels, such as identification matrices, as described briefly above. The labels may be adhered as a label or sticker, etched, printed on, or otherwise attached to a vehicle part or structure. FIG. 11 shows an example 11000 of a part 11100 with an integrated label 11200. For example, the label 11200 can be integrated in any location on a surface of a part 11100.

Figure 12:
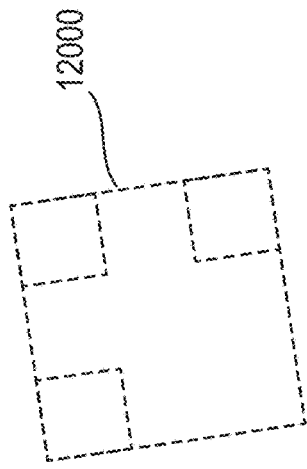
FIG. 12 shows an example of a label.

FIG. 12 shows an example of a label. The label 12000 may be any type of graphical indicia, such as an identification matrix, that is machine-readable. The label may comprise descriptive data that may or may not be encoded. The descriptive data may include data such as symbol format, data character encoding methods, capacity, dimensional characteristics, error correction rules, encoding and decoding algorithms, user-selectable application parameters, and a unique unit of information.

A label 12000 may be associated with unique information that can be stored in a separate database, such as the one or more databases 1505 of FIG. 1B, which can be accessed by a control system, such as the control system 1500 of FIG. 1B. For example, upon reading a label, a robot and/or a control system may communicate with, and search, one or more databases for the label to find the unique information associated with the label.

In an example, the labels, such as identification matrices, may simply identify the parts and the subsystems they are to be part of A catalogue of the required assembly information, which can include information such as which parts are required for which subsystems, may be stored in one or more databases. In another example, the labels may simply identify final product requirements information. Based on the final product requirements information, robots (e.g., automated constructors), via machine-learning, may perform one or more vehicle manufacturing processes complying with the final product requirements information. In another example, a label on a part may provide detailed information about the part or the assembly of the part, such as relational information (e.g., position and location of one part relative to another part or another assembly). The relational information may disclose the specific assembly that a part or another assembly (e.g., subassembly) is to be incorporated into. The detailed information, including relational information, may be stored in one or more databases accessible by a control system and/or the one or more robots reading the label, such that the control system and/or the one or more robots may find the detailed information associated with the label.

In some instances, a label on a part may provide grip point information. For example, the label for a part may disclose that, for the part, there are handles or tapped holes that are specifically designed for gripping, or flat smooth surfaces that may be compatible with suction cups. The respective locations of one or more grip points may be described with coordinates relative to the location of the label. Such information may aid a robot (e.g., automated constructor) in determining an appropriate gripper approach path and grasping angle when grasping the part.

Figure 13:
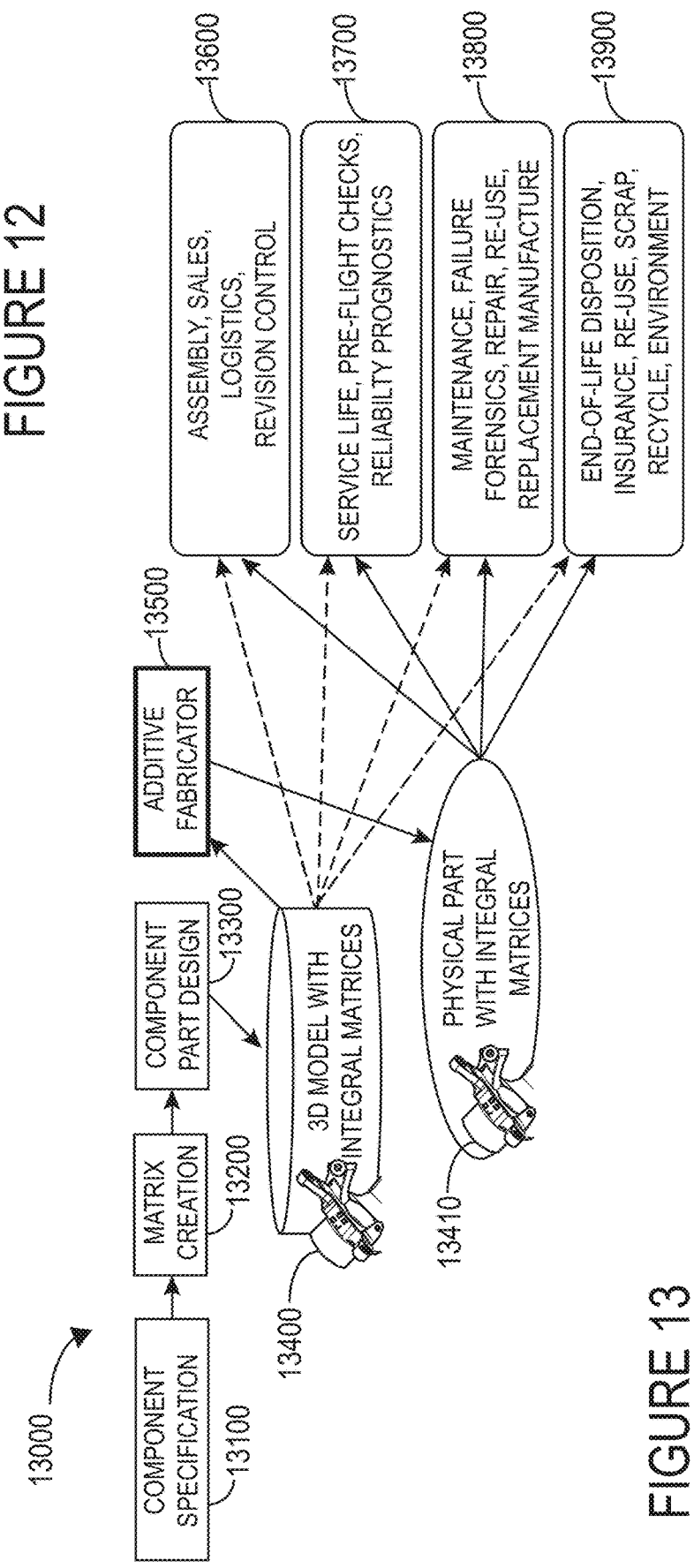
FIG. 13 shows a life cycle flow diagram of a 3-D printed component with integrated labels.

FIG. 13 shows a life cycle 13000 flow diagram of a 3-D printed component with integrated labels. For example, the 3-D printed component 13400 may be a component of an automotive subsystem, an airplane or air conditioner part, or some other useful object for industrial, military, commercial or consumer use. In a first step 13100, the component can be specified. In the component specification, the component requirements such as size and function can be identified as well as its unique identifying part number or name. The component specification may be compiled for use in subsequent steps. In a second step 13200, a label can be created, wherein the label is associated with descriptive data about the component. The descriptive data may be stored in one or more databases accessible by a control system. The descriptive data may or may not be encoded in the label. If encoded, the label may be encoded with standard (e.g., ISO/IEC 18004 standard) or non-standard algorithms. The label may be machine readable.

In the next step 13300, the component can be designed, such as on a computer (e.g., via computer aided design (CAD) software and/or selected from a library of pre-designed or standard parts. A three-dimensional model or design form of the part can be defined. The earlier-created label for the component may be integrated into the three-dimensional model or design of the component. A component may have a plurality of labels. A descriptive computer 3-D data model 13400 of the part with the integrated label can be generated. The 3-D data model may be stored as a computerized descriptor file in a transferrable digital format (e.g., STEP, STP, SLDPRT, EPRT, etc.). The descriptor file may comprise various items of data and metadata, including the part number, the physical dimensions, shape, color, material specifications, weight, geometric tolerances, and/or other literal and symbolic descriptions. In the process of saving the file, some data items may optionally be omitted or removed from the file, leaving only the geometric outline and a basic description of the part. Removal or distillation of data or metadata of a file may be performed to remove extraneous data bulk, and optionally save memory space, from the file for manufacturing, physical processing, and/or publication. The label may remain unconditionally and permanently embedded into the component model and may not be readily removed without some risk of undesirable side effects, including some loss of functionality.

In the next step 13500, an additive fabricator machine, or facility that may be partially or completely automated, may render the 3-D component model data into a physical component 13410. For example, the additive fabricator machine or facility may comprise 3-D printing technology, such as selective laser melting or selective laser sintering. For example, the process may use 3-D printers (e.g., Stratasys J750) or similar tools. The physical component may be formed from various materials, including plastic, stainless steel, maraging steel, cobalt chromium, Inconel, aluminum, gold, titanium, or other material. The component may be manufactured from one type of material (e.g., plastic). Alternatively, the component may be manufactured from composites of two or more materials.

The rendered physical component 13410 may correspond one-on-one to the 3-D component model data, including the incorporated label. For example, the label may be physically formed (e.g., etched, printed, etc.) on the component at the same time that the component is 3-D printed. The descriptive data encoded in the label may include, for example, a part number, revision code, and a unique serial number. The unique correspondence of the label on the physical component with that on the 3-D component model data may allow the label on the 3-D component model data to act as a reliable reference point throughout the life cycle of the component. For example, at each step in the life cycle of the component, the component's identity and revision level is readily verifiable to ensure the correctness, source origin, and history of the component. Beneficially, the identification system may provide secure supply-chain hygiene and high anti-counterfeit confidence, which may improve the performance and reliability of the component and/or the final product produced from the component.

The identification system may be used to track and monitor a component throughout various phases of its life cycle. Specifically, the identification system may be used for configuration control and manufacturing assembly processes, such as assembly, sales, logistics, and revision control operations 13600. For example, a label may be associated with an originating customer order number, or a customer-defined order code. Customers who are sensitive to order-specific specifications and materials can use this to eliminate supply-chain contamination from counterfeit or low-quality generic parts and prevent risk of miscommunication down the supply chain. In some instances, the identification system may be used for configuration management and pre-flight checks for service life and reliability prognostics 13700. For example, an assembly comprising of a plurality of additively manufactured components each identified with a unique label can be inventoried and simultaneously validated from a single viewpoint in a relatively short amount of time (e.g., less than one second). This may beneficially both reduce inventory time and increase accuracy of the comprehensive inventory record for hardware components. The inventory record is readily traceable, verifiable, and reliable.

In some instances, the life cycle of the component can be monitored, such as by tracking and verifying maintenance, failure, forensics, repair, re-use, and replacement manufacture processes 13800. The record may drive reliability prognostics and trigger preventative maintenance at prescribed intervals (e.g., miles traveled, hours of use, stress history). Replacement components can be rapidly and accurately specified when needed. The life cycle of the component can be tracked with precision, with added reliability from the tamper-proof identity marking on both the component and the 3-D data model. The overall reliability provided by the identification system may beneficially increase the value of used (e.g., refurbished) goods sold through one or more secondary channels and markets because the source information (e.g., design, material, usage, life cycle) of the goods can be verified for each individual component.

In some instances, the identification system may allow tracking and verification of the component for end-of-life processes 13900, including end-of-life disposition, insurance, re-use, scrap, recycle, and environmental processes. For example, after a component reaches the end of its predicted life and is retired, it can be subjected to tests that estimate additional or excess remaining service life it may still have. Components may be discarded with some additional remaining service life, such as to retain a safety margin, discarding a component with excessive remaining life may be wasteful. Components found to have some additional useful service life can be re-used, for example, in applications that are less safety-critical or applications comprising relatively lower sensitivity to component failure. This can have economic value in secondary (e.g., used parts) markets, and for insurance valuation of long-life vehicles that have a significant odometric history. The ability to track remaining service life is particularly useful and valuable for capital-intense industrial and military equipment and platforms that have a long service life. For disposal and recycling, the built-in labels can provide a verifiable and trustworthy link to manufacturing records, especially because accurate and specific materials and chemical properties records are required for environmental compatibility, metals recovery, and other re-usage applications.

In some instances, geometric metadata of a label can be used to locate a component part containing the label on its surface.

Figure 14A:
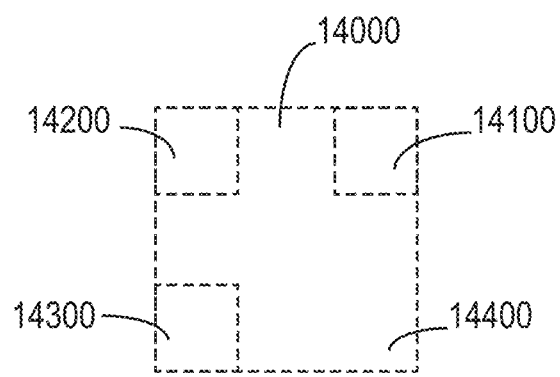
FIG. 14A shows an example of identification matrices that provide border marks.

Data matrix labels, such as identification matrices, may contain one or more registration or alignment marks, such as in the borders of the data matrix labels, that can support accurate reading of the data matrix labels. FIG. 14A shows an example of identification matrices that provide border marks. For example, an identification matrix 14000 may comprise a first corner mark 14100, a second corner mark 14200, a third corner mark 14300, and data area 14400. In some instances, the three corner marks may delineate and align the data area so that a sensor (e.g., camera, scanner, other imaging device, etc.) can detect the identification matrix as an identification matrix and identify the data area. Alternatively or in addition, the corner marks may convey other non-symbolic information or metadata about the data area. Specifically, each of the corner marks, or alternatively a combination of two or three of the corner marks, may provide a locational and/or orientation reference that communicates the posture and the position of the part containing the identification matrix in six dimensions, including the X, Y, Z, and pitch, roll, and yaw of the part relative to a workspace.

For example, the corner marks 14100, 14200, and 14300 can be used both to identify the identification matrix as a valid identification matrix, and to define a geometric location and an angle of view to an imaging device (e.g., camera) of the identification matrix, prior to the imaging device reading and decoding the data area 14400. In addition, the corner marks may also identify the boundaries of the data area that contains the encoded data.

Figure 14B:
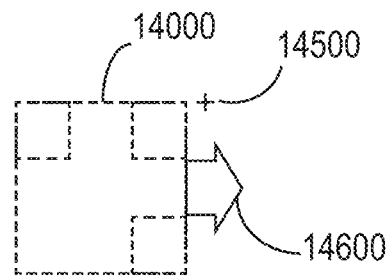
FIG. 14B shows an example of geometric metadata extracted from an identification matrix in an isolated matrix.
Figure 14C:
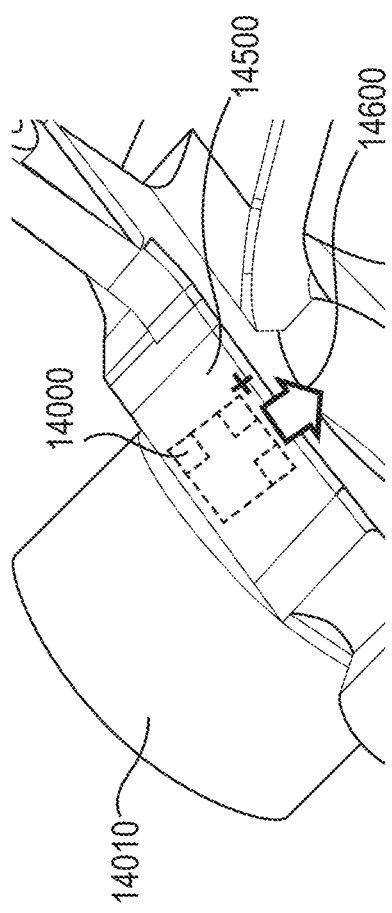
FIG. 14C shows an example of geometric metadata extracted from an identification matrix on a component part.

An identification matrix can be read by a sensor, such as an imaging device. The imaging device may comprise one or more processors, and memory, with instructions executable by the one or more processors, to read, decrypt, decode and/or otherwise process (e.g., determine geometry) identification matrices. Alternatively, another computing device may read, decrypt, decode and/or otherwise process the identification matrices. For example, the data in an identification matrix may be decoded and verified using a built-in cyclic redundancy code. The one or more processors of the imaging device and/or another computing device may extract and locate the geometric locations and orientation of the corner marks. FIGS. 14B and 14C show an example of geometric metadata extracted from an identification matrix. FIG. 14B shows an isolated matrix, and FIG. 14C shows the same matrix on a surface of a component part. For example, the geometric metadata of the matrix 14000 can comprise a reference XYZ coordinate corner position 14500 and a reference orientation vector 14600.

The XY (e.g., X, Y axes) position of the matrix 14000 can be initially identified by the sensor reading the matrix and computed into a coordinate framework (e.g., XY coordinates) referenced to the sensor. For example, the XY coordinates can be initially identified as camera coordinates of the sensor reading the matrix. The camera coordinates can then be transformed into three dimensional XYZ workspace coordinates using well-known geometric transformations.

An XYZ coordinate may comprise a coordinate point in three axes (e.g., X, Y, Z axes). The reference XYZ coordinate corner position may comprise the three-dimensional coordinates of the location of the matrix in three-dimensional space. Since the identification matrix may be designed to be located in a fixed location relative to the component, the matrix location can be referenced as a highly precise fiducial code to locate the component in a working space, such as on an autonomous assembly platform 4105 of FIG. 4. The matrix can thereby provide a reference coordinate that is useful for material handling, virtual fixturing, and other applications requiring knowledge of the component in a working space. The reference coordinate can be used, for example, to guide one or more automated constructors and/or one or more mobile supply devices for robotic grasping, clamping, drilling, milling, surface finishing, and other manufacturing and handling processes.

Figure 14D:
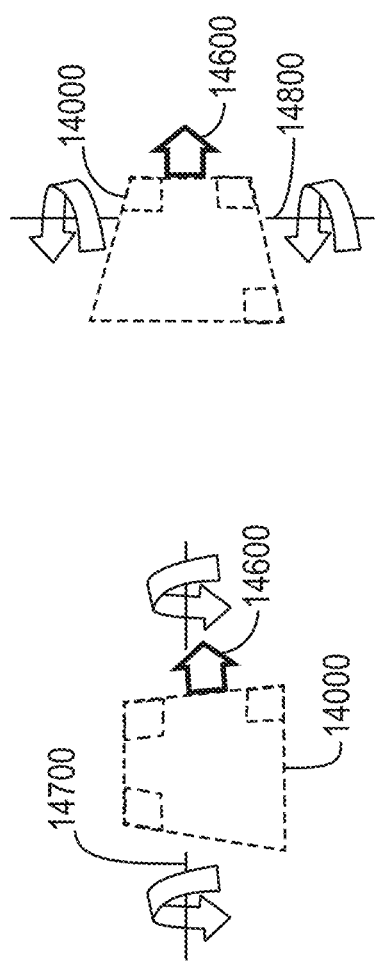
FIG. 14D illustrates variations in roll angle and pitch angle in an identification matrix.

In another aspect, the orientation of the matrix image 14000 can be determined by transforming an angle measured in the two-dimensional plane of the matrix surface, such as in FIG. 14C. The matrix image and camera world position are sufficient to determine part position and orientation in 6 dimensions: X-Y-Z, pitch-roll-yaw. FIG. 14D illustrates variations in roll angle and pitch angle in an identification matrix. Using the orientation vector 14600 as a reference, the matrix roll angle 14700 can be defined as the rotation angle around the orientation vector 14600. Matrix pitch angle 14800 can be defined as a rotation angle around a matrix axis normal to the pitch angle, wherein the axis is in the matrix plane. Both angles can be measured simultaneously with a single sensor view of the matrix. For example, the roll and pitch orientation of the matrix can be extracted by measurement of perspective distortion. Since the matrix can be known to have been manufactured in a precise rectangular form, any deviations from rectilinear perfection can be inferred to have been introduced by environmental deviations. These deviations can be measured quantitatively using well known machine-vision image analysis and pattern-recognition techniques. Perspective distortion can be primarily introduced by variations in the orientation and pose angle of the component part.

FIGS. 15A and 15B show a rectangular solid part 14010 that is labeled with six data matrices (three visible in each Figure), each matrix on a separate facet in two different poses. FIG. 15A shows the rectangular solid part in a first pose. FIG. 15B shows the rectangular solid part in a second pose. For example, the rectangular solid part can be additively manufactured (e.g., 3-D-printed) to embed a unique matrix into each of its rectangular facets. When the rectangular part is resting on a flat surface, one of the matrices will face an upwards direction (e.g., facet 14011 in FIG. 15A, facet 14012 in FIG. 15B). This allows quick visible identification of the part's posture when viewed from above. In FIG. 15A, the facet 14011 is facing up and is labeled with a first matrix 14000a. A facet 14012 is facing forward and is labeled with a second matrix 14000b, and a facet 14013 is facing right and is labeled with a third matrix 14000c. The other three facets are not visible in the in the first pose. Above each visible matrix 14000a-c an arrow identifies a reference orientation of the matrix. The orientation of the rectangular part can be determined by viewing any one of the matrices, such that additional information would be redundant in determining orientation. In FIG. 15B, the facet 14012 is facing up and is labeled with the second matrix 14000b. A facet 14016 is facing forward and is labeled with a fourth matrix 14000d, and a facet 14013 is facing right and is labeled with a third matrix 14000c. The other three facets are not visible in the in the second pose. Above each visible matrix 14000b-d an arrow identifies a reference orientation of the matrix. The orientation of the rectangular part can be determined by viewing any one of the matrices, such that additional information would be redundant in determining orientation. It can be determined from a comparison of the two FIGS. 15A and 15B that the FIG. 15B is the same rectangular part of the FIG. 15A rotated in a direction upwards.

As seen in the above example, any geometric motion or rotation of the rectangular part 14010 can be inferred and accurately computed from a single view of any one facet, if the viewer (e.g., imaging device) has partial knowledge of another pose of the rectangular part. In this way, a matrix can serve as a fiducial code that can identify the part's location and orientation, regardless of its posture. As long as the matrix is visible and readable, it is not necessary to see any other portion of the part. The examples above describe a rectangular part with six sides and six natural poses or resting positions on a flat surface. Parts that have fewer than, or more than, six resting positions can be accommodated by labeling one or more of their facets appropriately with viewable matrices. Not every facet requires labelling. As long as a matrix is visible, then the part can be identifiable in position and orientation. For example, a sheet of paper may require only two matrices for full discrimination. Parts with more facets or complex shapes may require a greater number of matrices. Alternatively, complex parts may be accommodated through the use of additional imaging device (e.g., cameras) in the work space.

From the above examples, a method is provided for identifying one or more component parts. The method may comprise detecting the presence of one or more parts, counting the number of visible parts, classifying the visible parts (e.g., serial number), localizing the part (e.g., measuring the location and/or orientation), and targeting a process (e.g., determining an approach path and a gripping point, etc.). For example, the part's location and/or orientation may be used to guide a robot, such as an automated constructor, to perform one or more processes.

Figure 16:
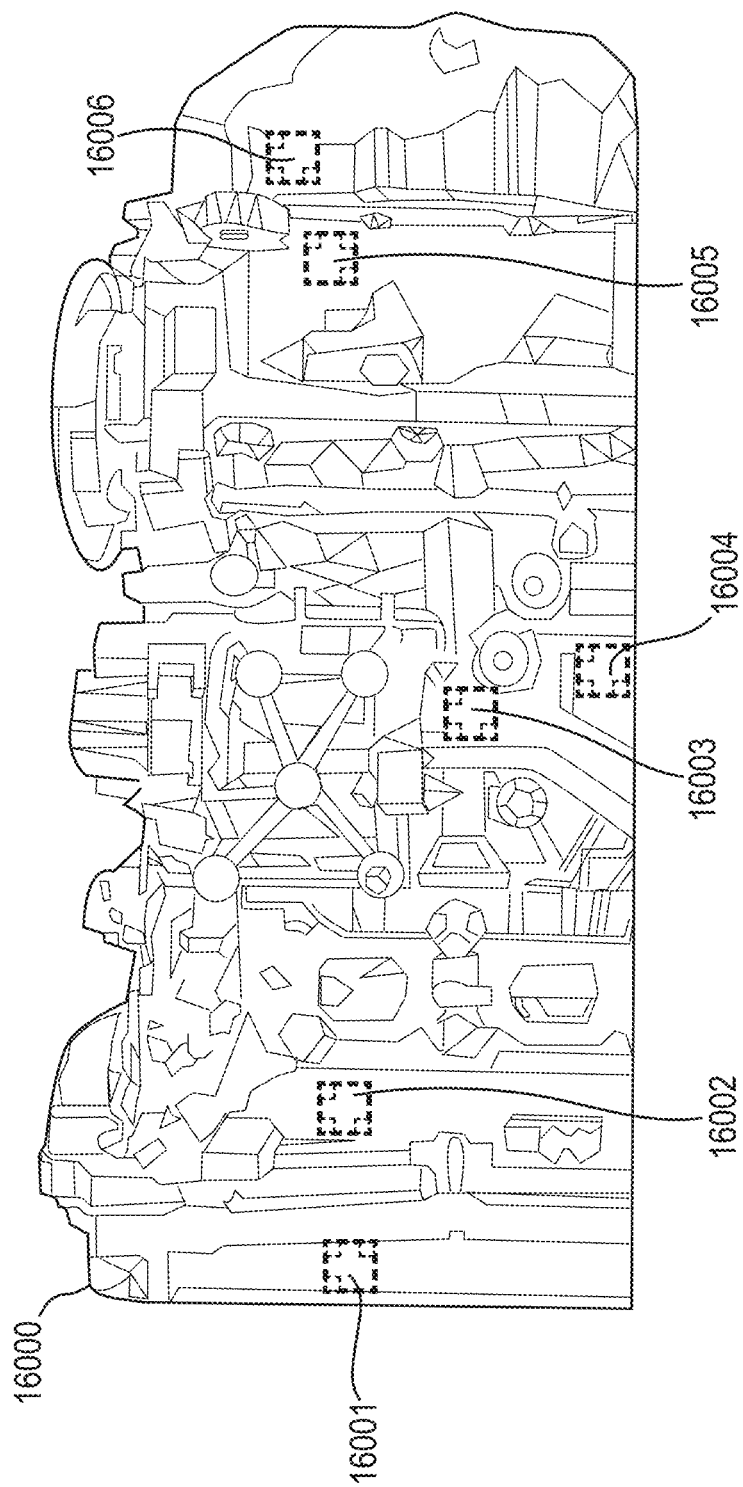
FIG. 16 shows an example of an assembly made up of six component parts.

FIG. 16 shows an example of an assembly 16000 made up of six component parts. Each of the six parts can be additively manufactured with an included unique identification matrix. The matrices 16001, 16002, 16003, 16004, 16005, and 16006 on each part can be manufactured onto a facet of their respective part. When the component parts are assembled together, the six matrices can all face in roughly the same common direction, permitting all six individual matrices to be read or captured photographically from one side of the assembly by an imaging device, such as in a single view and with a single illumination source. For example, a complete configuration inventory may be performed and completed by the imaging device with a single view and a single illumination source. In some instances, other facets of the six components may comprise similar matrices (e.g., visible from other viewing angles). Assemblies and/or parts of assemblies can be designed such that several facets of a part each comprise an identification matrix that can be visible from different viewing angles, such that a complete configuration inventory of the assembly may be taken from many, or all, sides of the assembly.

In some instances, matrices can be used to identify the presence of an assembly or subassembly, and to locate its position and orientation. This technique can be used beneficially during material handling and assembly of systems or subsystems. A system of matrix labelling can be used as a control basis to enable larger automation and robotic systems. The identification system may provide, during one or more processes such as manufacturing, upgrade, and repair, the identification, geometric matrix data, tracking, prepositioning, and inventory of one or more parts involved in the one or more processes.

Figure 17:
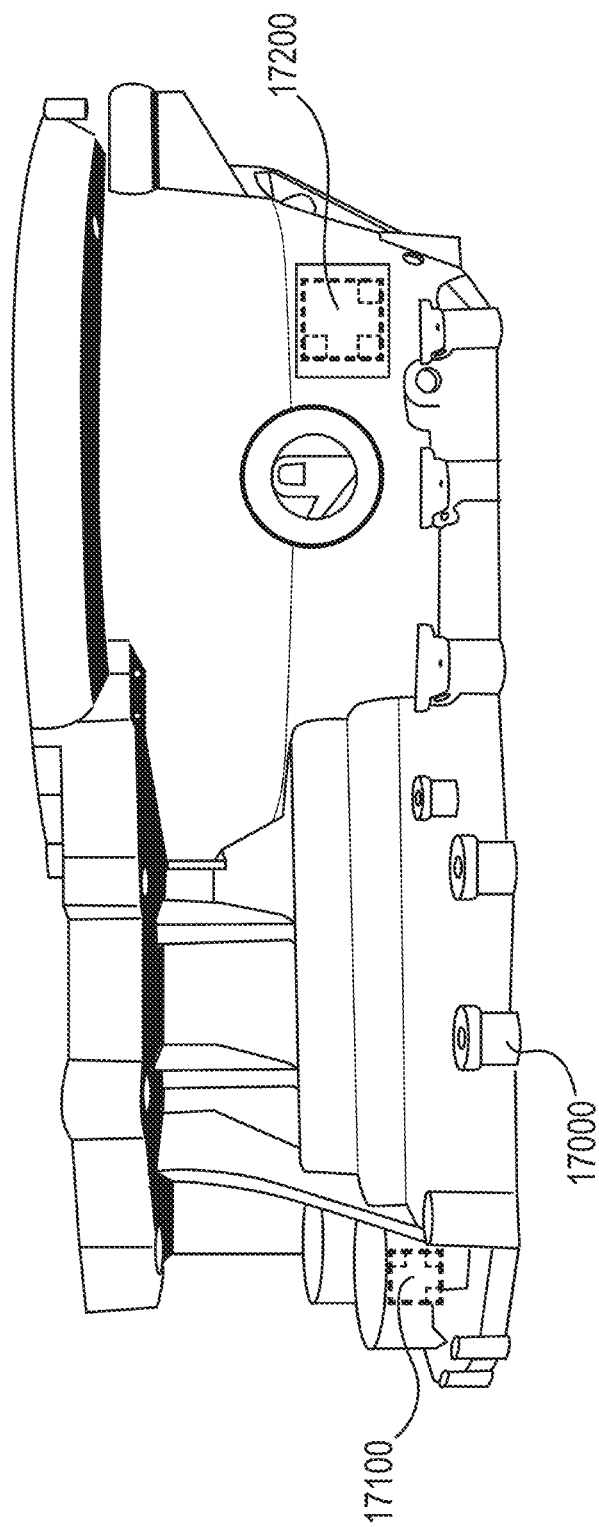
FIG. 17 shows an additively manufactured component with two spatially distributed matrices.
Figure 18:
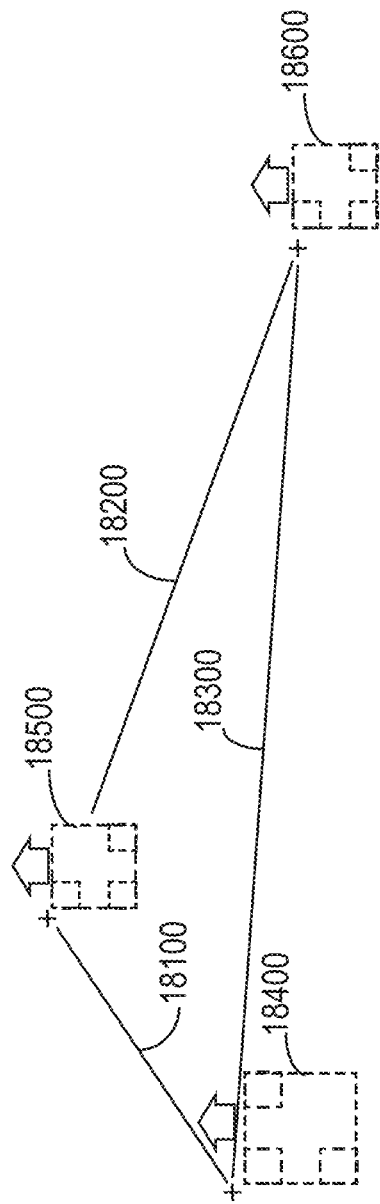
FIG. 18 shows an arrangement with three spatially distributed matrices.

FIG. 17 shows an additively manufactured component 17000 with two spatially distributed matrices 17100 and 17200. Both matrices may be permanently affixed to the component and their location can be stable relative to one another. When two or more matrices are visible on a component, because the XYZ position of each matrix on the component is known (e.g., from the 3-D model design of the component), each matrix may comprise a geometric endpoint, and a well-defined line may be drawn between the two geometric endpoints. The position of the line in space can be identified with high precision and accuracy. FIG. 18 shows an arrangement with three spatially distributed matrices 18400, 18500, and 18600. A third matrix can be added to provide complete dimensionality and additional precision. These three matrices define three lines, a first line 18100, a second line 18200, and a third line 18300 to form a triangle in a plane in three dimensional space. By the plane containing the triangle, the system may identify the precise location and orientation of the component containing the three matrices.

This triangulation technique can provide additional self-checking capabilities through the measurement of errors, such as in lengths and/or in angular correspondence within a component. When the accumulated errors between the measured (e.g., empirical) and modeled (e.g., theoretical) matrix XYZ locations are small, then precision and/or accuracy of the part's location and orientation can be deemed to be high, and vice versa. For example, the empirical and theoretical length of each line, between any two matrices, may be compared to produce an error estimate. In some instances, the theoretical measurement may be made for a CAD model. In another example, an orientation vector can be measured for each matrix, such as using the techniques disclosed earlier. The agreement or disagreement between pairs of matrix vectors, between any two matrices, may be used to calculate local distortions and errors. For example, in FIG. 18, all three matrices are shown to be located in a single plane, suggesting that theoretically all three orientation vectors for the three matrices should be parallel. But matrix measurements taken from actual physical models can generate nonparallel orientation vectors. The difference between the theoretical and empirical measurements can estimate the variance of a physical component from a computer model of the physical component.

Deviation of empirical measurements (e.g., of physical components) from theoretical predictions (e.g., of computer models) can result from any number of reasons, including measurement errors, miscalibration, lens aberration, numerical calculation and conversion errors, environmental and/or systematic errors, and other effects (e.g., fraud). A precision-manufactured model component may be used to test the reliability of a sensor measurement system. For example, a well-calibrated system can be expected to exhibit error signatures that span a relatively modest operating range. Random error behavior that is contained within a relatively modest range can be suggestive that the system is properly operational. In another example, calibration drift, or miscalibration, can significantly, and detectably, increase error ranges. The increase in error spread can beneficially provide a useful early warning and an indication of a system (e.g., sensor, 3-D printing) failure. For example, a sensor whose mounting point has been altered or shifted will introduce much larger errors.

In some instances, fraudulent or counterfeit parts can be detected by the signature of the error profile of the counterfeit parts when compared to the precision-manufactured model component. For example, a common mistake made by counterfeiters can be low precision of geometric registration with respect to distant features present on opposite sides of the counterfeited item. For example, in FIG. 15A, the positions and orientations of matrices 14000a-c of a counterfeited item may comprise a number of error symptoms. These symptoms can be useful to detect and diagnose manufacturing defects, environmental or temperature variations or damage, and fraudulent or counterfeit parts.

In some instances, sub-textual coding can be used to distinguish counterfeit products. Multiple matrices on a solid object can provide a mechanism for counterfeit resistance that enables rapid inspection and detection of fraudulent parts. This mechanism can be non-symbolic and non-digital. Additive manufacturing can allow for minute adjustments to be made in the dimensions of matrices. One such dimension can be the XY displacement of the matrix on its flat printed plane. For example, in FIG. 15A, the position and orientation of the first matrix 14000a can easily be offset within its printed plane without otherwise affecting the fit or function of the rectangular part. This offset can introduce a disturbance in the line lengths of the inscribed measured triangle, per FIG. 18, which in this can be the triangle formed by matrices 14000a-c. For example, an intentionally introduced offset may deliberately lengthen the length of the line between the two matrices 14000a and 14000b. The offset can be recorded in a computer model of the part, and be reflected in the manufactured part. Information about the offset can be hidden, such that a counterfeiter may not, or find it difficult to, detect or measure the introduced offset. In some instances, different offsets can be introduced to other similar parts, which can make it even more difficult for counterfeiters to learn about the offset by inspection of one or more matrices on the part, even after examining a large number of similarly marked parts. However, the specific offset can be readily apparent to a sensor native to the system and can be detected, such as during a routing configuration scan of the part.

This technique can 'hide' identity verification data by encoding it between geometric metadata items, thereby providing immediate verification to a system with knowledge of the geometric metadata, and providing resistance against fraudulent systems having no knowledge of the geometric data. This anti-counterfeiting mechanism can significantly make the detection of fraudulent parts simple, quick, and inexpensive for authorized users. It can erect a cost and complexity barrier for counterfeiters, thereby deterring fraud related to genuine manufactured products and replacement parts.

FIG. 21 shows an illustration of an exemplary laser cutting process. This process may occur, for example, in connection with laser cutting step 2200 process of FIG. 2. Automated constructors 2102 and 2104 are respectively equipped with effectors 2100a and 2100b. An exemplary COTS carbon fiber panel is provided from COTS receiving area 2209 or from COTS production area 2800 (FIG. 2) to the laser cutting station 2200. Automated constructors 2102, 2104 may receive instructions and specifications for cutting panel 2106 and may consequently install, if not already installed, effectors 2100a and 2100b for performing the cutting of the panel. The cut panel may thereupon be provided to chassis build lines 2300 (FIG. 2) or another suitable location for further processing.

Figure 22:
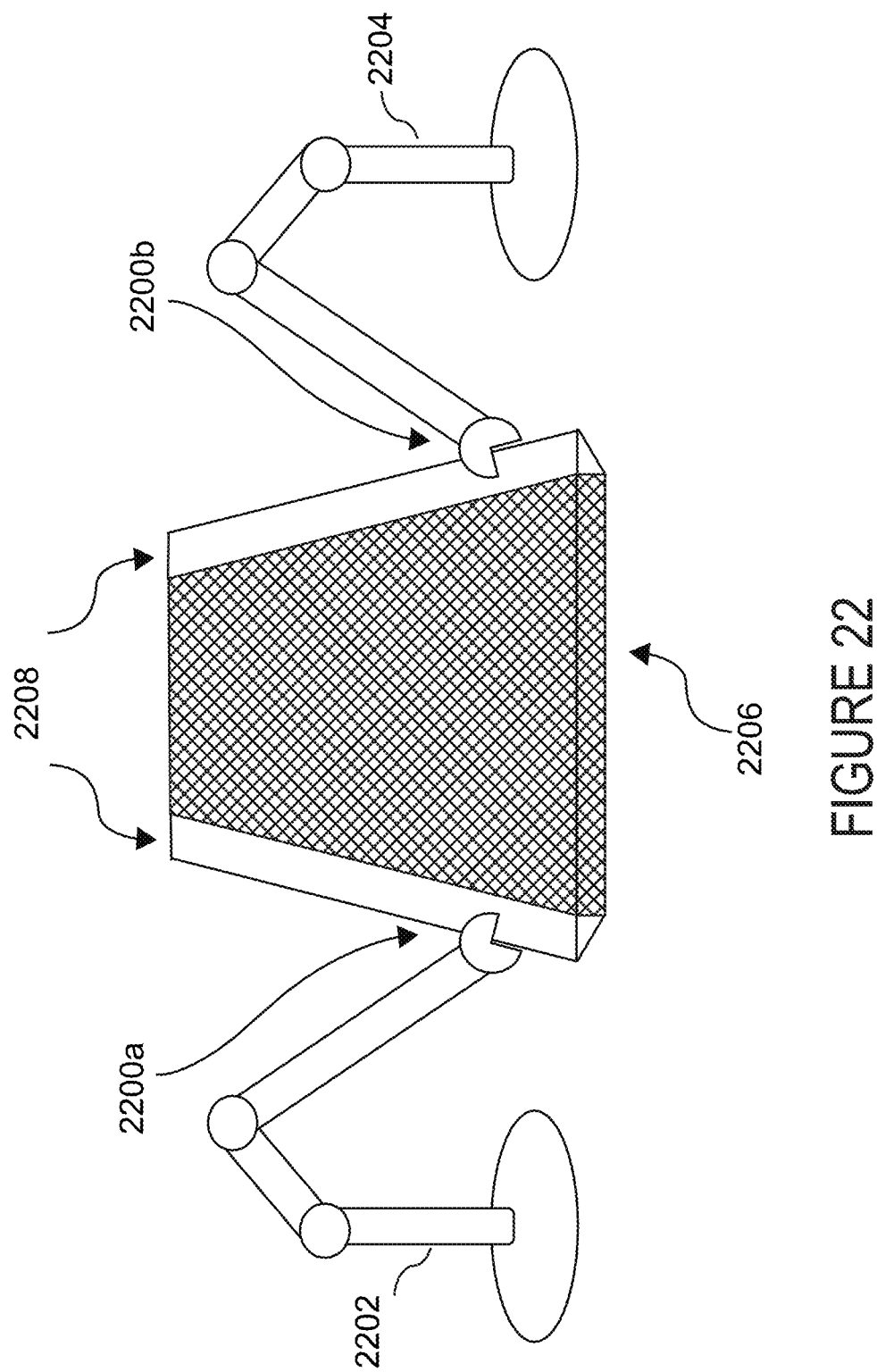
FIG. 22 shows an illustration an exemplary automated process for assembly of a panel with a node or extrusion.

FIG. 22 shows an illustration an exemplary automated process for assembly of a panel with a node or extrusion. This process may occur, for example, in body assembly areas 2600, 2650 (FIG. 2), general assembly 2500, or another suitable location. Here, automated constructors 2202, 2204 have equipped themselves with effectors for manipulating the COTS carbon fiber panel 2206 to assemble and/or install the panel having a node or extrusion. In this illustration, an end of the panel 2206 includes extrusion 2208. The automated constructors 2202, 2204 cooperate, using machine-learning, autonomous programs or direction from a control station, to assemble panel 2206 and insert extrusion 2208 in the appropriate location.

Figure 23:
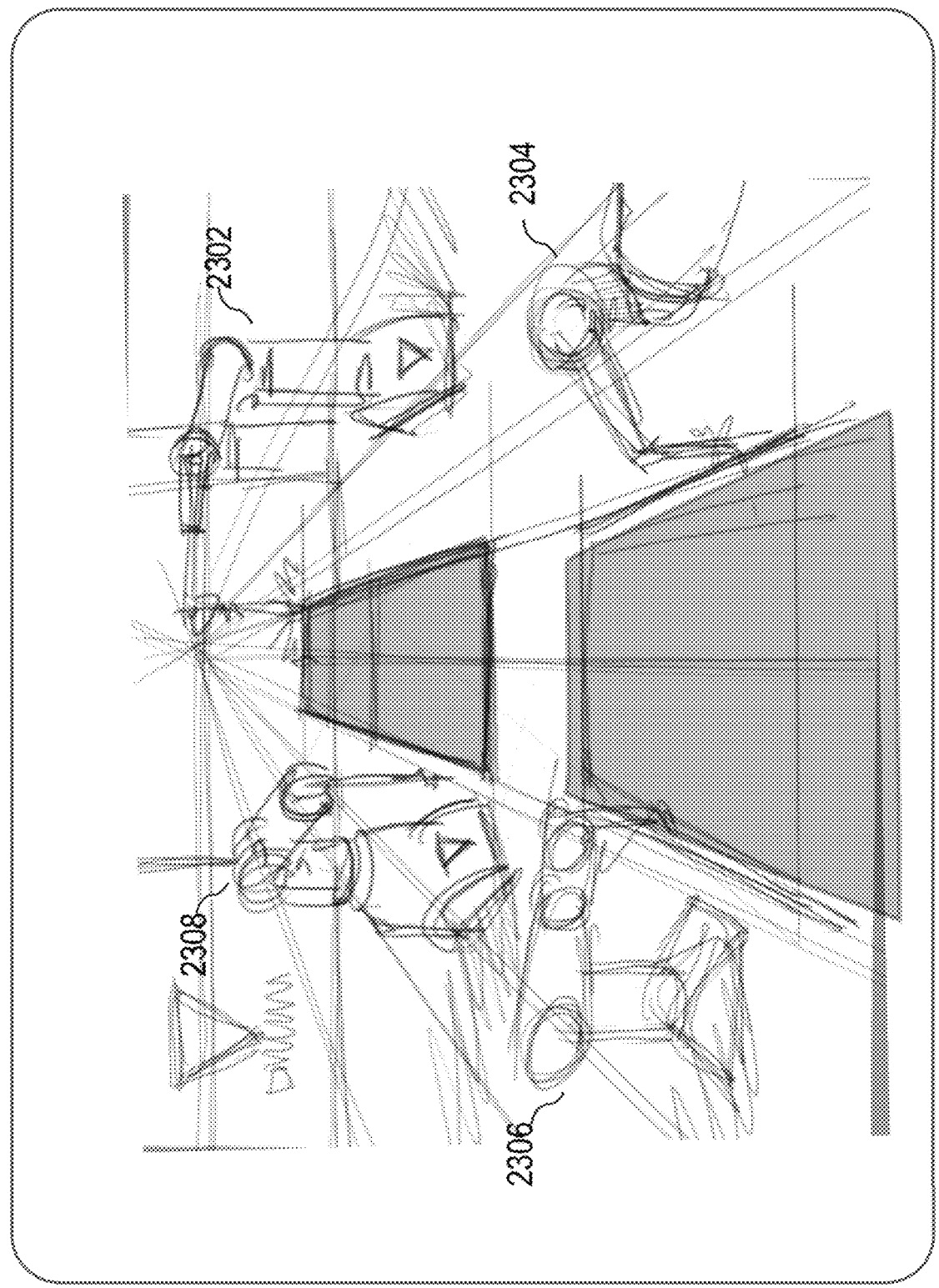
FIG. 23 shows an illustration of an exemplary laser cutting process being performed at an assembly station.

FIG. 23 shows an illustration of an exemplary laser cutting process being performed at an assembly station, similar to that of FIG. 21. FIG. 23 may include panels 2310a, 2310b on an assembly line being processed by automated constructors 2302, 2304, 2306, 2308. In an exemplary embodiment, panels 2310a, 2310b are being transported on a mobile assembly line, and the laser cutting process is occurring as the panel segments are being transported. In other embodiments, the panels 2310a, 2310b may arrive at the station by a mobile vehicle, automated constructors, manually or by other means.

Figure 24:
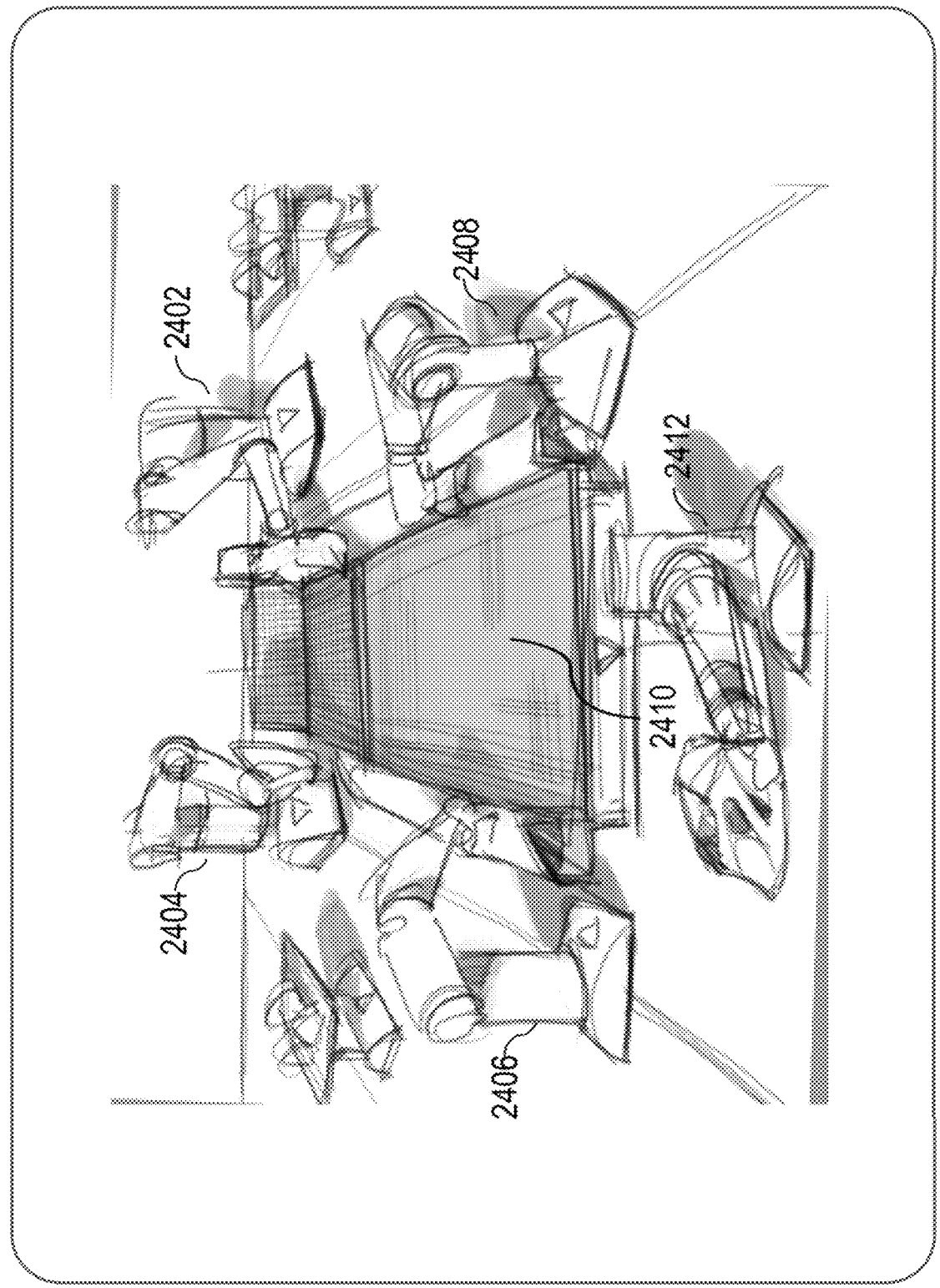
FIG. 24 shows an illustration of an exemplary process for adhesive application being performed at an assembly station.

FIG. 24 shows an illustration of an exemplary process for adhesive application being performed at an assembly station. FIG. 24 is an example of functions that may be performed at chassis build lines 2300 (FIG. 2). Automated constructors 2402, 2404, 2406, 2408 and 2412 are applying adhesive to carbon sheets 2410 for building nodes and assembling other parts. A division of labor among the automated constructors may be involved, for example, such that some automated constructors have effectors equipped to move and otherwise manipulate the carbon sheets and others have effectors equipped to apply the adhesive. In other embodiments, the carbon sheets or other material may be mobile on an automated assembly line. In one exemplary embodiment, the whole process may be automated.

Figure 25:
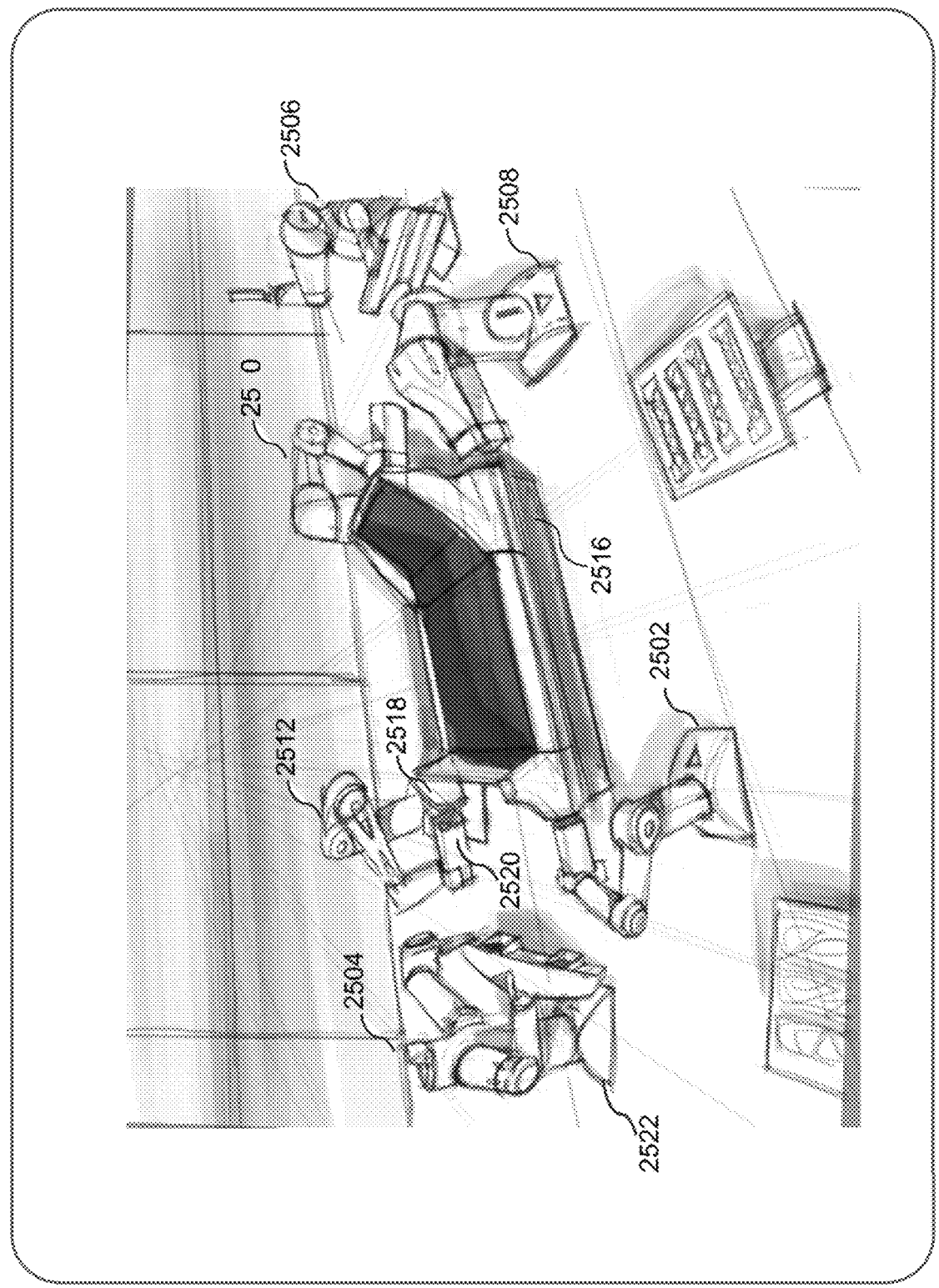
FIG. 25 shows an illustration of an exemplary process performed by a plurality of cooperating automated constructors for bonding and assembling extrusions to nodes.

FIG. 25 shows an illustration of an exemplary process performed by a plurality of cooperating automated constructors for bonding and assembling extrusions to nodes. A node, node assembly or node network 2516 is situated at a station where automated constructors 2502, 2508, 2510 and 2512 are applying extrusions to node 2516. For example, automated constructor 2512 is equipped with an effector for assembling extrusion 2520 to a section 2518 of node 2516. Automated constructors 2504, 2506, in turn, may apply panels 2522 or other components in sequence after the extrusions are assembled. This process may occur as part of a chassis build 2300, general assembly 2500 or other suitable area or station (FIG. 2).

Figure 26:
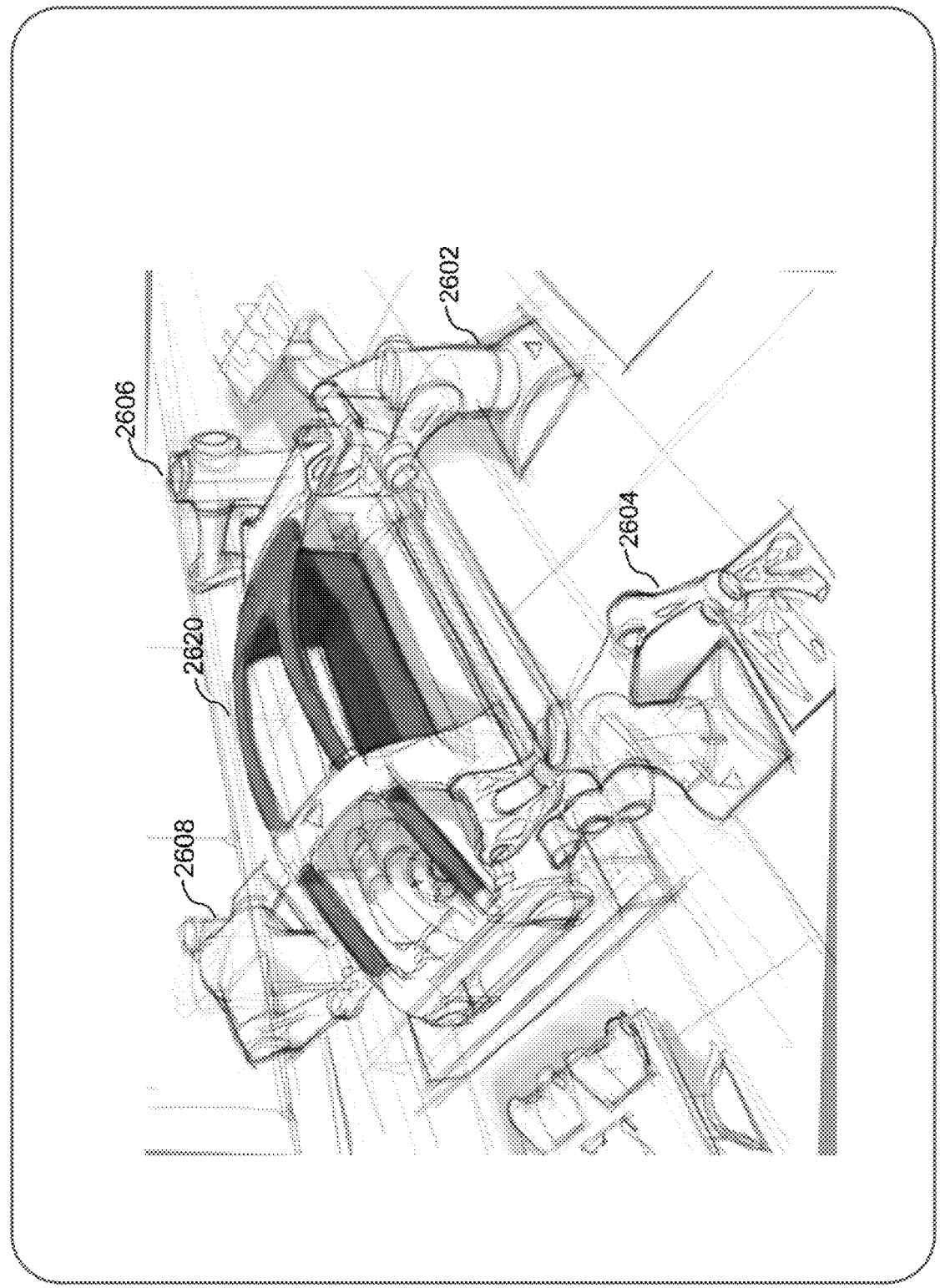
FIG. 26 shows an illustration of an exemplary process performed by a plurality of automated constructors for assembling the suspension of a vehicle to a chassis.

FIG. 26 shows an illustration of an exemplary process performed by a plurality of automated constructors 2602, 2604, 2606, 2608 for assembling the suspension of a vehicle to a chassis. This process may be performed, for example in chassis build lines 2300, general assembly 2500, body assembly 2600, 2650, or another suitable area (FIG. 2). With reference to FIG. 26, it can be appreciated that the plurality of automated constructors are cooperating to assemble a suspension system (partially obscured from view) onto chassis 2620.

Figure 27:
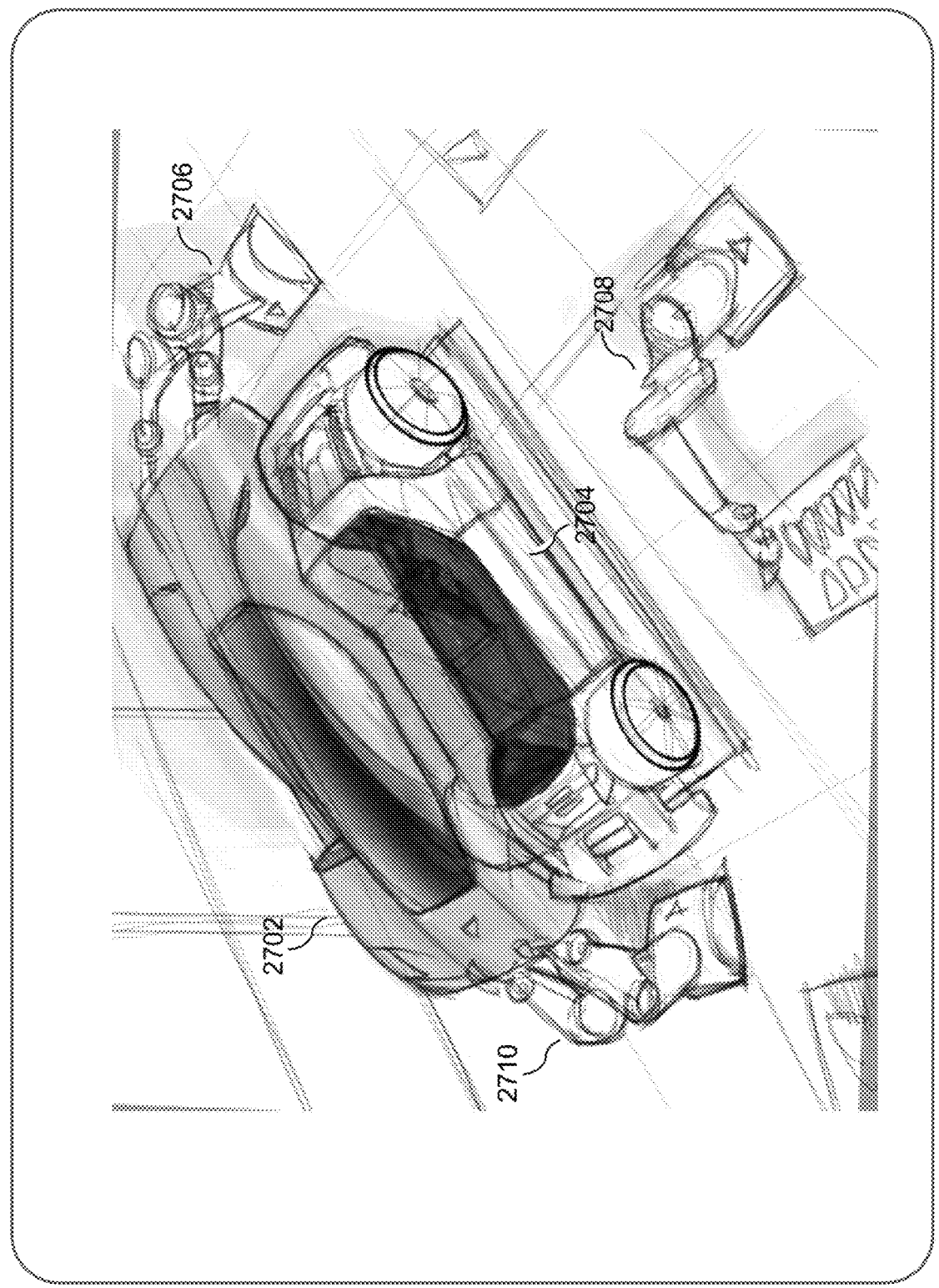
FIG. 27 shows an illustration of an exemplary process performed by a plurality of automated constructors in the process of dropping a body on a chassis.

FIG. 27 shows an illustration of an exemplary process performed by a plurality of automated constructors 2706, 2708, 2710 in the process of dropping body 2702 on chassis 2704. This process may occur in general assembly 2500, for example (FIG. 2). In this illustration, automated constructors 2706, 2710 are equipped with tools or effectors for handling the body 2702 for insertion onto the chassis 2704. Depending on the embodiment, the process may be partially or entirely automated.

The previous description is provided to enable any person skilled in the art to practice the various aspects described herein. Various modifications to these exemplary embodiments presented throughout this disclosure will be readily apparent to those skilled in the art, and the concepts disclosed herein may be applied to other techniques for 3-D printing of components for a transport structure. Thus, the claims are not intended to be limited to the exemplary embodiments presented throughout the disclosure, but are to be accorded the full scope consistent with the language claims. All structural and functional equivalents to the elements of the exemplary embodiments described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), or analogous law in applicable jurisdictions, unless the element is expressly recited using the phrase "means for" or, in the case of a method claim, the element is recited using the phrase "step for."

What is claimed is:

1. An automated assembly system for a transport structure, comprising:
 a three-dimensional (3-D) printer;
 a plurality of automated constructors including a first automated constructors positioned at a first robotic assembly station and a second automated constructor configured to travel to and from the first robotic assembly station such that a base of the second automated constructor is moving relative to an underlying surface; and
 one or more control systems configured to control the 3-D printer to print at least a portion of a component of the transport structure, to control the second automated constructor to transfer the component to the first robotic assembly station, and to control the first automated constructor to install the component during assembly of the transport structure.

2. The automated assembly system of claim 1, wherein at least the 3-D printer or one of the plurality of automated constructors comprises one or more sensors configured to respectively enable at least one of the plurality of automated constructors to adaptively perform one or more machine-learning functions.

3. The automated assembly system of claim 2, wherein the one or more machine-learning functions comprise at least optimizing printing movement patterns, enabling motion control of print heads, printing on-the-fly for materials development, structural optimization, or receiving tools automatically for vehicle assembly.

4. The automated assembly system of claim 1, wherein the 3-D printer comprises an automated robotic apparatus including a robotic arm with a robotic effector at a distal end of the robotic arm, the robotic effector being configured to transfer the component to the second automated constructor.

5. The automated assembly system of claim 1, wherein the second automated constructor comprises an automated robotic apparatus including a robotic arm with a robotic effector at a distal end of the robotic arm, the robotic effector being configured to transfer the component to the first robotic assembly station.

6. The automated assembly system of claim 1, further comprising a plurality of robotic assembly stations, wherein the second automated constructor is further configured to move to and from each of the plurality of robotic assembly stations during the assembly of the transport structure.

7. The automated assembly system of claim 6, wherein the 3-D printer is configured to move to and from two or more of the plurality of robotic assembly stations during the assembly of the transport structure.

8. The automated assembly system of claim 1, wherein the first automated constructor comprises an automated robotic apparatus including a robotic arm with a robotic effector at a distal end of the robotic arm, the robotic effector being configured for use during the assembly of the transport structure.

9. The automated assembly system of claim 8, wherein the first automated constructor is configured to automatedly exchange the robotic arm with another robotic arm during the assembly of the transport structure.

10. The automated assembly system of claim 8, wherein the first automated constructor is configured to automatedly exchange the robotic effector with another robotic effector during the assembly of the transport structure.

11. The automated assembly system of claim 1, wherein the 3-D printer is configured to print at least the portion of a component by printing a first portion of the component onto a non-printed second portion of the component.

12. The automated assembly system of claim 1, wherein the 3-D printer is configured to print at least the portion of a component by printing an interconnect configured to interconnect the component to another structure.

13. The automated assembly system of claim 1, wherein the component comprises a label that uniquely identifies the component.

14. The automated assembly system of claim 1, wherein the first automated constructor is configured to move and the second automated constructor is configured to move based on a movement of the first automated constructor.

15. The automated assembly system of claim 1, wherein each automated constructor of the plurality automated constructors may be configured to perform a plurality of different tasks at a plurality of locations.

16. The automated assembly system of claim 1, wherein the second automated constructor is configured to move between a plurality of robotic assembly stations based on a necessity for more or fewer automated constructors at each robotic assembly station of the plurality of robotic assembly stations.

17. The automated assembly system of claim 1, wherein a third automated constructor transfers the component to the second automated constructor.

18. The automated assembly system of claim 1, wherein the one or more control systems are further configured to control the 3-D printer to print at least a portion of a second component of the transport structure with the 3-D printer, to subsequently cause a third automated constructor to engage the second component, and to install the second component during the assembly of the transport structure.

19. The automated assembly system of claim 1, wherein the underlying surface includes a floor.

20. The automated assembly system of claim 19, wherein the base of the second automated constructor includes wheels configured to roll on the floor.

21. The automated assembly system of claim 1, wherein the second automated constructor is configured to transfer simultaneously a plurality of components to the first robotic assembly station.

22. The automated assembly system of claim 21, wherein the second automated constructor is configured to carry a structure on which the plurality of components is arranged.

23. The automated assembly system of claim 22, wherein the structure on which the plurality of components is arranged includes a tray.

24. The automated assembly system of claim 1, wherein the second automated constructor is further configured to directly provide the component to the first automated constructor.

25. The automated assembly system of claim 1, further comprising:
 a plurality of 3-D printers each configured to print one or more 3-D printed components of the transport structure, wherein the second automated constructor is further configured to gather the one or more 3-D printed components from the plurality of 3-D printers.

* * * * *